United States Patent [19]
Kuroyanagi et al.

[11] Patent Number: 6,072,610
[45] Date of Patent: Jun. 6, 2000

[54] OPTICAL TRANSMISSION SYSTEM

[75] Inventors: Satoshi Kuroyanagi; Kazuo Hironishi; Tetsuya Nishi; Takuji Maeda, all of Kawasaki, Japan

[73] Assignee: Fujitsu Limited, Kanagawa, Japan

[21] Appl. No.: 08/816,078

[22] Filed: Mar. 13, 1997

[30] Foreign Application Priority Data

Apr. 15, 1996 [JP] Japan .................................. 8-092592
Jul. 18, 1996 [JP] Japan .................................. 8-189160

[51] Int. Cl.[7] .......................... H04J 14/02; H04B 10/08
[52] U.S. Cl. ..................... 359/117; 359/110; 359/128; 359/139; 359/161
[58] Field of Search ................... 359/117, 128, 359/139, 110, 161

[56] References Cited

U.S. PATENT DOCUMENTS

| | | | |
|---|---|---|---|
| 5,663,820 | 9/1997 | Shiragaki | 359/128 |
| 5,724,167 | 3/1998 | Sabella | 359/128 |
| 5,739,935 | 4/1998 | Sabella | 359/128 |
| 5,805,320 | 9/1998 | Kuroyanagi et al. | 359/117 |
| 5,884,017 | 3/1999 | Fee | 395/182.02 |

*Primary Examiner*—Leslie Pascal
*Attorney, Agent, or Firm*—Helfgott & Karas, P.C.

[57] ABSTRACT

An optical transmission system includes an optical path cross-connect device and an electrical cross-connect device connected by a plurality of working and standby input/output interface links. Optical signals in the working and standby systems are entered from the optical path cross-connect device into the electrical cross-connect device via the working and standby interface links, respectively, and switching of working and standby transmission lines is performed electrically by the electrical cross-connect device without momentary disconnect.

29 Claims, 49 Drawing Sheets

TYPE S-1

TYPE S-2

TYPE S-3

TYPE S-4

FIG.26

| OPXC | OPTICAL PATH | EXC |||||||
|---|---|---|---|---|---|---|---|
| | | TRANSMITTING SIDE ||||  RECEIVING SIDE ||
| | | S-1 | S-2 | S-3 | S-4 | R-1 | S-2 |
| TYPE A | VWP | — | — | ○ | — | ○ | — |
| | WP | — | — | — | ○ | ○ | ○ |
| TYPE B | VWP | — | — | ○ | — | ○ | — |
| | WP | — | — | — | ○ | ○ | ○ |
| TYPE C | VWP | ○ | — | — | — | ○ | — |
| | WP | — | ○ | — | — | ○ | — |
| TYPE D | VWP | ○ | — | — | — | ○ | — |
| | WP | — | ○ | — | — | ○ | — |
| TYPE E | VWP | ○ | — | — | — | ○ | — |
| | WP | — | ○ | — | — | ○ | — |

WP OPXC (EXC TRANSMITTING SIDE : S4, RECEIVING SIDE : R1)

WP OPXC (EXC TRANSMITTING SIDE : S4, RECEIVING SIDE : R2)

VWP OPXC (EXC TRANSMITTING SIDE : S3, RECEIVING SIDE : R1)

WP OPXC (EXC TRANSMITTING SIDE : S4, RECEIVING SIDE : R1)

WP OPXC (EXC TRANSMITTING SIDE : S4, RECEIVING SIDE : R2)

VWP OPXC (EXC TRANSMITTING SIDE : S1, RECEIVING SIDE : R1)

WP OPXC (EXC TRANSMITTING SIDE : S2, RECEIVING SIDE : R1)

WP OPXC (EXC TRANSMITTING SIDE: S2, RECEIVING SIDE: R1)

VWP OPXC (EXC TRANSMITTING SIDE : S1, RECEIVING SIDE : R1)

WP OPXC (EXC TRANSMITTING SIDE : S2, RECEIVING SIDE : R1)

OPTICAL TRANSMISSION SYSTEM

BACKGROUND OF THE INVENTION

This invention relates to an optical transmission system comprising an optical path cross-connect device (OPXC) and an electrical cross-connect device (EXC). More particularly, the invention relates to an optical transmission system in which transmission lines can be switched without momentary disconnect.

Transmission systems using optical technology are expected to find use in the future as broad-band transmission systems as information is dealt with more rapidly and in greater quantities.

FIG. 46 is a diagram for describing an optical network, and FIG. 47 is a diagram showing the connections between an optical path cross-connect device (OPXC) and an electrical cross-connect device (EXC). The network includes optical path cross-connect devices (OPXC) 51, optical transmission lines 52 which transmit optical signals of wavelength $\lambda_0$, electrical cross-connect devices (EXC) 53, switches (SW) 54 and transmission lines 55 which transmit electrical or optical signals. Each optical path cross-connect device 51 accommodates a plurality of working optical transmission lines (k1), a plurality of standby optical transmission lines (k2) and a plurality of interface links (k3) which interface the electrical cross-connect device 53. The electrical cross-connect devices 53 and switches 54 perform switching in units of virtual paths VP and virtual channels VC, respectively.

Each optical cross-connect device 51 usually outputs optical signals upon switching over the outgoing lines of the optical signals that have entered from the optical transmission lines and interface links and branches optical transmission signals, which are addressed to its own node, to the electrical cross-connect device 53.

In such an optical network, there is a requirement for a function in which the path is switched over to the standby system in response to a transmission line fault, after which the path is switched back to the working system, without momentary disconnect, in response to fault recovery, and for a function in which the working path is switched over, without momentary disconnect, in dependence upon traffic. Further, this function for uninterrupted switching of transmission lines is required from the viewpoint of network maintenance and operational administration. The function for switching transmission lines without momentary disconnect has already been implemented in electrical cross-connect devices. Naturally, it is necessary to so arrange it that transmission lines can be switched without momentary disconnect, in the same manner as in electrical cross-connect devices, also in optical cross-connect devices which perform network routing of optical signals from the electrical cross-connect devices.

FIG. 48 is a diagram showing the architecture of a conventional optical path cross-connect device which takes into account the switching of transmission lines without momentary disconnect in an optical path. Shown in FIG. 48 are the optical path cross-connect device (OPXC) 51 and the electrical cross-connect device (EC) 53. The optical cross-connect device 51 accommodates working optical transmission lines $52a_1$, $52a_2$ and standby optical transmission lines $52b_1$, $52b_2$, as well as working interface links 55, 56 for interfacing the electrical cross-connect device 53. The optical path cross-connect device 51 has an optical space switch $51a$ and a number of optical phase adjusting buffers $51b$. The electrical cross-connect device 53 has an electrooptic converting function for converting an electric signal to an optical signal and sending the optical signal to the working interface link 55, and an optoelectric converting function for converting an optical signal, which enters from the optical path cross-connect device 51 via the interface link 56, to an electric signal and entering the electric signal into an ATM switch (not shown).

FIG. 49 is a diagram for describing the operation of transmission line switching without momentary disconnect according to the prior art. FIG. 49 illustrates a case where two units OA1 and OA2 having the architecture illustrated in FIG. 48 are provided and transmit data to each other. The first unit OA1, which comprises an electrical cross-connect device EXC1 and an optical path cross-connect device OPXC1, and the second unit OA2, which comprises an electrical cross-connect device EXC2 and an optical path cross-connect device OPXC2, are interconnected by a working optical transmission line $52a$ and a standby optical transmission line $52b$.

Each of the optical path cross-connect devices OPXC1, OPXC2 routes an optical signal that has entered from an optical transmission line to a desired output transmission line or to the electrical cross-connect devices EXC1, EXC2 and routes an optical signal from the electrical cross-connect devices EXC1, EXC2 to a desired output transmission line. For example, an input signal that has entered from the electrical cross-connect device EXC1 of the first unit OA1 via the input interface link 55 is branched in two directions by the optical path cross-connect device OPXC1 and outputted to the working optical transmission line $52a$ and standby optical transmission line $52b$ to reach the second unit OA2. The optical path cross-connect device OPXC2 of the second unit OA2 routes the optical signal that has entered from the working optical transmission line $52a$ to the output interface link 56 leading to the electrical cross-connect device EXC2. Thus, the optical signal from the electrical cross-connect device EXC1 of the first unit OA1 is transmitted to the electrical cross-connect device EXC2 of the second unit OA2.

If a signal flowing on the working transmission line $52a$ is switched over to the standby transmission line $52b$ under these conditions, the optical path cross-connect device OPXC2 implements the working/standby changeover and routes the optical signal that has entered from the standby optical transmission line $52b$ to the output interface link $52b$ leading to the electrical cross-connect device EXC2. As a result, the switching of the transmission lines is performed without a momentary disconnect and the signal from the electrical cross-connect device EXC1 is transmitted to the electrical cross-connect device EXC2 without interruption.

It is necessary that the optical path length between the two systems before switching between working/standby be made equal to the optical path length between the two systems after switching between working/standby. To achieve this, the practice in the prior art is to adjust phase by the optical phase adjusting buffers $51b$, which are provided in the optical path cross-connect device OPXC2, in such a manner that the optical paths are equalized, and switch between working/standby synchronously in the sending and receiving optical path cross-connect devices. With this conventional method of switch optical transmission lines, however, it is required that the optical signal phase adjustment be performed in the form of light in the optical path cross-connect device OPXC, and that the optical signal be switched at a high speed but to a degree that will not produce a bit error. This is very difficult to realize.

SUMMARY OF THE INVENTION

Accordingly, an object of the present invention is to provide an optical transmission system in which it is unnecessary to adjust phase in the form of an optical signal.

A second object of the present invention is to provide an optical transmission system in which optical transmission lines can be switched by electrical processing without causing momentary disconnect.

A third object of the present invention is to provide an optical transmission system in which an optical phase adjustment and a high-speed switching operation are unnecessary in an optical path cross-connect device in order to achieve switching of optical transmission lines without momentary disconnect.

A fourth object of the present invention is to provide an optical transmission system in which switching of optical transmission lines without momentary disconnect can be performed by electrical processing, and in which an optical phase adjustment and a high-speed switching operation are unnecessary in an optical path cross-connect device, even in a case where wavelength-division multiplexing is performed on the transmission lines.

In accordance with the present invention, the first through third objects are attained by providing an optical transmission system comprising an optical path cross-connect device (OPXC) and an electrical cross-connect device (EXC), wherein the optical path cross-connect device and the electrical cross-connect device are connected by a plurality of input/output interface links in working and standby systems, optical signals of respective working and standby systems are entered from the optical path cross-connect device to the electrical cross-connect device via output interface links of the working and standby systems, uninterrupted switching of working and standby transmission lines is performed electrically after these optical signals are converted to the electric signals by the electrical cross-connect device, optical signals of working and standby systems are generated using the electric signals obtained by switching, and the optical signals of the working and standby systems are entered into the optical path cross-connect device via input interface links of the working and standby systems. In this case, the electrical cross-connect device comprises (1) an opto-electric converter for converting an optical signal of a working system and an optical signal of a standby system that enter via the output interface links to respective electric signals, (2) a phase adjuster for performing a phase adjustment electrically in such a manner that signal phases of the working and standby systems will coincide, (3) switching means for selecting one of a phase-adjusted signal of the working system and a phase-adjusted signal of the standby system and switching between the working system and the standby system, and (4) means for generating optical signals of the working and standby systems from the signal that has been selected.

In accordance with the present invention, the fourth object is attained by providing an optical transmission system comprising an optical path cross-connect device and an electrical cross-connect device, wherein (1) the optical path cross-connect device includes a demultiplexer for demultiplexing wavelength-division-multiplexed optical signals into optical signals of individual wavelengths, an optical space switch for switching each of the demultiplexed optical signals to a prescribed outgoing line or link, and a multiplexer for multiplexing optical signals directed to the same outgoing line or link, and the optical path cross-connect device further accommodates a plurality of working optical transmission lines for input/output of wavelength-division-multiplexed optical signals, a plurality of standby optical transmission lines for input/output of wavelength-division-multiplexed optical signals, a plurality of working interface links provided between the optical path cross-connect device and the electrical cross-connect device for input/output of wavelength-division-multiplexed optical signals, and a plurality of standby interface links provided between the optical path cross-connect device and the electrical cross-connect device for input/output of wavelength-division-multiplexed optical signals, and (2) the electrical cross-connect device includes a demultiplexer for demultiplexing wavelength-division-multiplexed optical signals, which enter from the optical path cross-connect device via the working and standby output interface links, into optical signals of individual wavelengths, a plurality of opto-electric converters for converting each optical signal to an electric signal, a phase adjuster for performing a phase adjustment electrically in such a manner that signal phases of the working and standby systems will coincide, working/standby switching means for selecting one of phase-adjusted signals of the working system and phase-adjusted signals of the standby system and switching between the working system and the standby system, a plurality of electro-optic converters for converting the electric signals obtained by switching to optical signals, and a multiplexer for multiplexing the optical signals outputted by each of the electro-optic converters and sending them to the optical path cross-connect device via the working and standby input interface links.

Other features and advantages of the present invention will be apparent from the following description taken in conjunction with the accompanying drawings.

BRIEF DESCRIPTION OF THE DRAWINGS

FIG. 26 is a table for describing the relationship among types A~E of an optical path cross-connect device OPXC, optical paths (WP-type/VWP-type) and transmission types S-1~S-4 and reception types R-1~R-2 in an electrical cross-connect device EXC;

DESCRIPTION OF THE PREFERRED EMBODIMENTS (A) Overview of the invention (a) Description of overview of first aspect FIG. 1 is a diagram for describing an overview of a first aspect of the invention. Numerals 1 and 2 denote optical transmission systems having respective optical path cross-connect devices 10 (OPXC1, OPXC2) and electrical cross-connect devices 20 (EXC1, EXC2). The optical path cross-connect devices 10 (OPXC1, OPXC2) are each constituted by a 1:1 optical space switch or 1:N optical space switch and each accommodates input and output working optical transmission lines 13, 15, respectively, input and output standby optical transmission lines 14 and 16, respectively, input and output working interface links 21a, 22a, respectively, and input and output standby interface links 21b, 22b, respectively.

Figure 1:
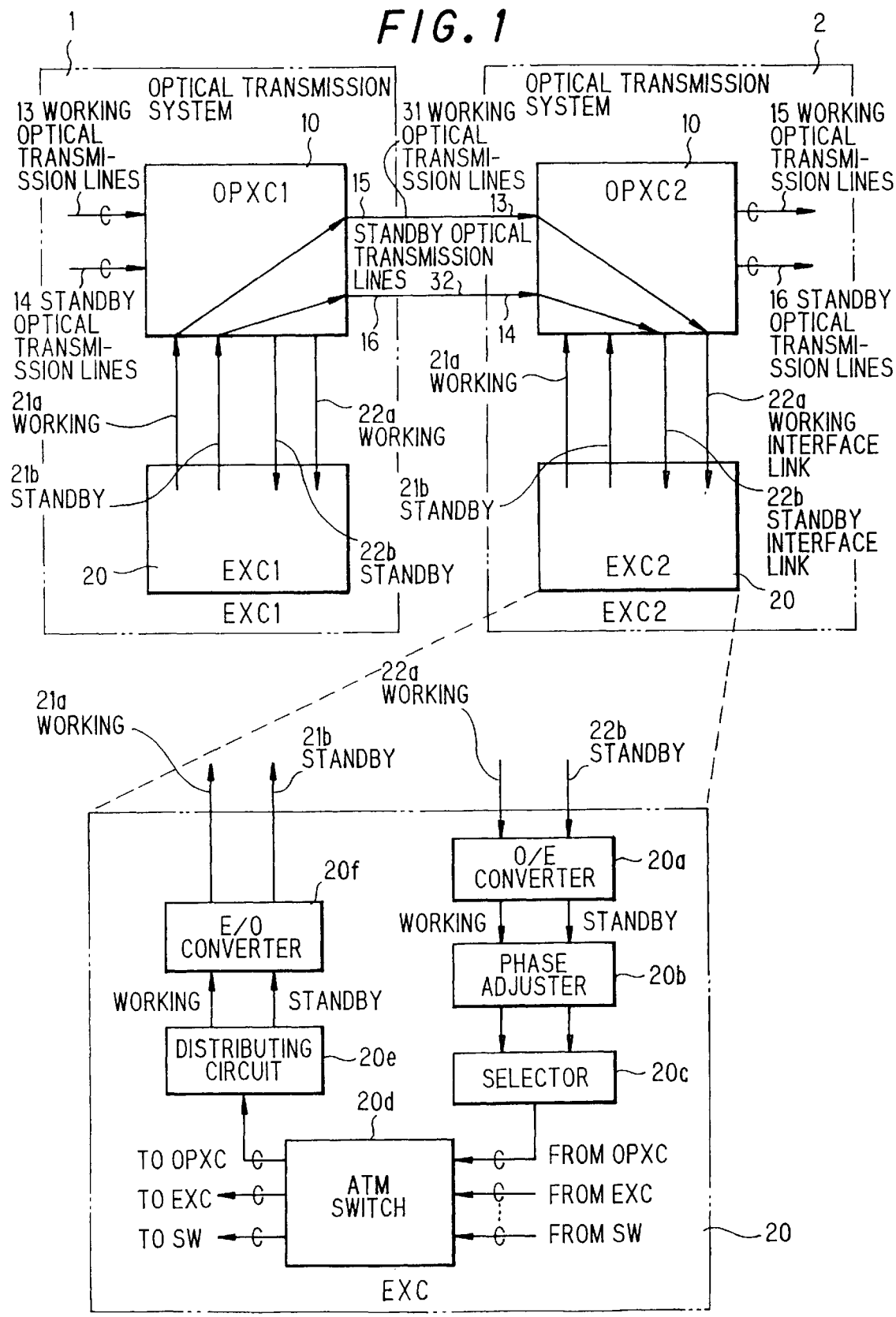
FIG. 1 is a diagram for describing an overview of a first aspect of the invention.

Each of the electrical cross-connect devices 20 (EXC1, EXC2) has an opto-electric converter (O/E converter) 20a for converting optical signals that enter from the working and standby interface links 22a, 22b to respective electric signals, a phase adjuster 20b for detecting a difference in lag times between the two paths of the working and standby systems and adjusting the phases of the electric signals, which are outputted by the opto-electric converter 20a, in such a manner that the signal phases will coincide, a selector 20c for selecting the electric signal of the working system or standby system, an ATM switch 20d for routing an ATM cell, which enters from the optical path cross-connect device (OPXC) 10, from another electrical cross-connect device (EXC) and from a switch (SW), to a prescribed outgoing line, a distributing circuit 20e for distributing electric signals, which are transmitted to the optical path cross-connect device, to the working/standby systems, and an electro-optic converter (O/E converter) 20f for converting the electric signals of the working and standby systems to optical signals and outputting these optical signals to the working and standby interface links 21a, 21b.

In a case where a signal is transmitted from the electrical cross-connect device (EXC1) of the first optical transmission system 1 to the electrical cross-connect device (EXC2) of the second optical transmission system 2, the electrical cross-connect device (EXC1) distributes the working/standby optical signals to the working/standby interface links 21a, 21b, the optical path cross-connect device OPXC1 routes the optical signal, which has entered from the working interface link 21a, to the working optical transmission line 31 and routes the optical signal, which has entered from the standby interface link 21b, to the standby optical transmission line 32. The optical path cross-connect device OPXC2 of the second optical transmission system 2 routes the optical signal, which has entered from the working optical transmission line 31, to the working interface link 22a and routes the optical signal, which has entered from the standby optical transmission line 32, to the standby interface link 22b, thereby entering these optical signals into the electrical cross-connect device EXC2. The electrical cross-connect device EXC2 selects the signal that has entered from the working interface link 22a and routes the signal to the desired outgoing line by way of the ATM switch 20d.

If a signal flowing through the working optical transmission line 31 is switched to a signal in the standby system and a signal flowing through the standby optical transmission line 32 is switched to a signal in the working system under these conditions, then, on the basis of a switching command, the electrical cross-connect device EXC2 of the second optical transmission system 2 selects the signal that has entered from the standby interface link 22b and routes this signal to a desired outgoing line by way of the ATM switch 20d. In this case, a phase adjustment is carried out in the phase adjuster 20b in such a manner that the signal phases in the working and standby systems coincide at all times. As a result, it is possible to switch between the working and standby systems without momentary disconnect and without loss of cells.

FIG. 1 is for a case in which the electrical cross-connect device EXC1 of one of the adjacent optical transmission systems transmits a signal to the electrical cross-connect device EXC2 of the other optical transmission system. However, even if the arrangement is one in which another optical transmission system is interposed between the first and second optical transmission systems 1 and 2, the phase adjuster 20b of the electrical cross-connect device on the signal receiving side always performs the phase adjustment in such a manner that the signal phases of the working and standby systems will coincide. Accordingly, regardless of the optical transmission lines switched between working and standby, the working/standby changeover can be performed in the manner described above without momentary disconnect and loss of cells.

Thus, the optical path cross-connect device 10 is not required to perform uninterrupted switching but need only establish working and standby paths in such a manner that the electrical cross-connect device 20 can perform switching without momentary disconnect. As a result, it is unnecessary for the optical path cross-connect device to have an optical phase adjusting function and to perform a high-speed switching operation.

Further, if the optical path cross-connect device is constructed using an optical space switch and this optical switch is divided into working and standby systems, the number of switches within the optical path cross-connect device can be reduced.

FIG. 1 illustrates a case in which the electrical cross-connect device 20 produces optical signals for the working and standby systems of the optical path cross-connect device 10 and distributes these signals to the working and standby interface links 21a 21b. However, an arrangement may be adopted in which, rather than the optical signals being distributed to the working and standby systems via the electrical cross-connect device 10, the interface links are provided with optical distributors or optical distribution switches (not shown) whereby optical signals are distributed to the working and standby interface links 21a, 21b.

Alternatively, an arrangement may be adopted in which, rather than the optical signals being distributed to the working and standby systems via the electrical cross-connect device 20 as shown in FIG. 1, the optical path cross-connect device 10 is constructed by an optical space switch having a distribution function so that optical signals which have entered from the electrical cross-connect device 20 may be routed to the working and standby optical transmission lines 31, 32 simultaneously by means of the distributing function of this optical space switch.

(b) Description of overview of second aspect

Figure 2:
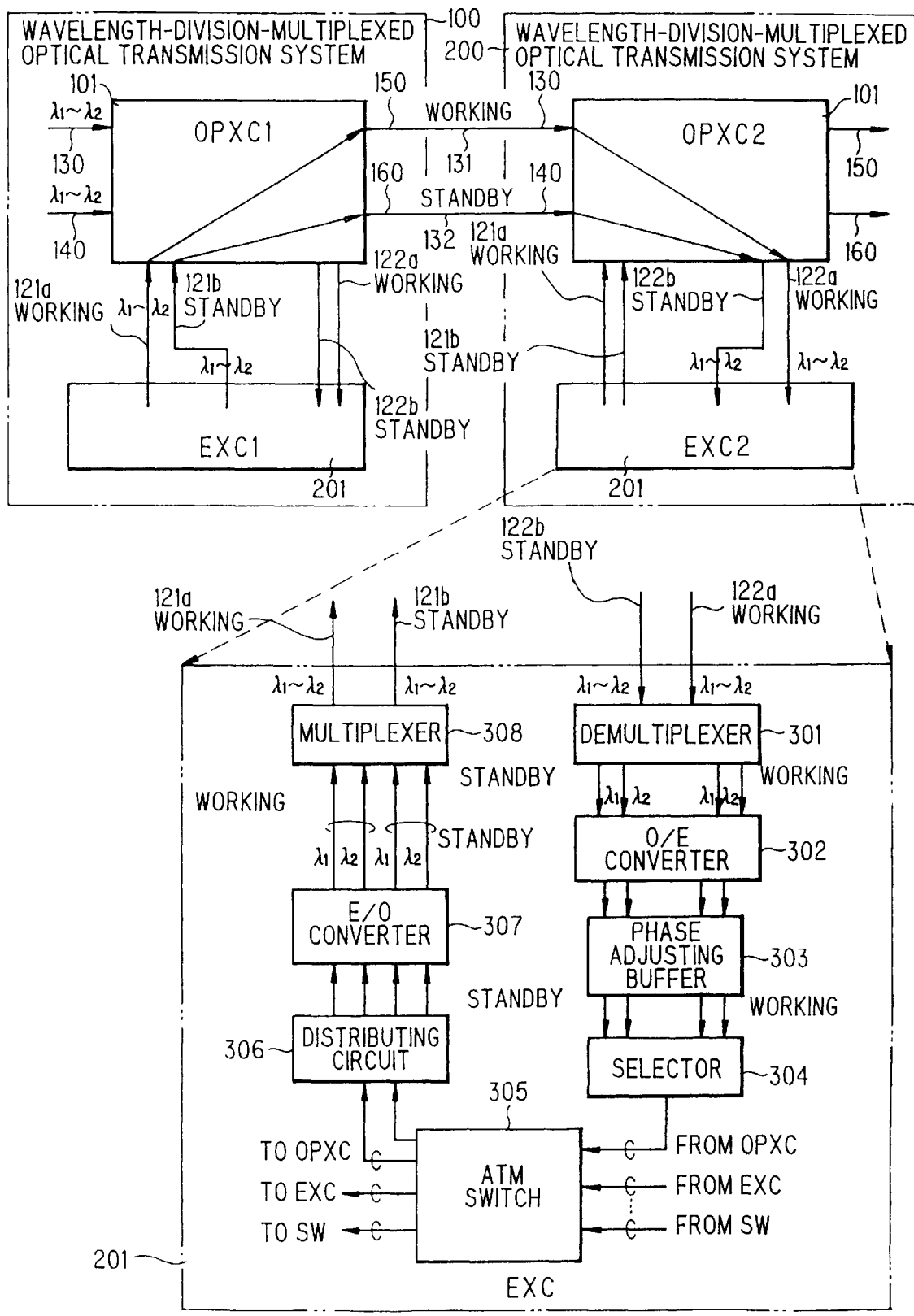
FIG. 2 is a diagram for describing an overview of a second aspect of the invention.

FIG. 2 is a diagram for describing an overview of a second aspect of the invention. Numerals 100, 200 denote wavelength-division multiplexing optical transmission systems having respective optical path cross-connect devices 101 (OPXC1, OPXC2) and electrical cross-connect devices 201 (EXC1, EXC2) and being interconnected by working and standby optical transmission lines 131, 132.

Though not illustrated, each of the optical path cross-connect devices 101 (OPXC1, OPXC2) has a demultiplexer for demultiplexing wavelength-division-multiplexed optical signals $\lambda_1 \sim \lambda_n$ (n=2 in FIG. 2) into optical signals $\lambda_1$, $\lambda 2$ of individual wavelengths, an optical space switch for switching each of the demultiplexed optical signals to a prescribed outgoing line, a wavelength converter for converting the wavelengths of the switched optical signals to predetermined wavelengths, and a multiplexer for multiplexing optical signals directed to the same outgoing line. Furthermore, the optical path cross-connect device 101 accommodates a plurality of working optical transmission lines 130, 150 for wavelength-division-multiplexed optical signal input/output, a plurality of input and output standby optical transmission lines 140, 160 for wavelength-division-multiplexed optical signals, a plurality of working interface links 121a, 122a provided between the optical path cross-connect device and the electrical cross-connect device for wavelength-division-multiplexed optical signal input/output, and a plurality of standby interface links 121b, 122b provided between the optical path cross-connect device and the electrical cross-connect device for wavelength-division-multiplexed optical signal input/output.

Each electrical cross-connect device 201 includes a demultiplexer 301 for demultiplexing wavelength-division-multiplexed optical signals, which enter from the working and standby interface links 122a, 122b, into optical signals of individual wavelengths $\lambda_1$, $\lambda_2$, a plurality of opto-electric converters 302 for converting each optical signal to an electric signal, a phase adjusting buffer 303 for performing a phase adjustment electrically in such a manner that signal phases of the working and standby systems will coincide, a selector 304 for switching between the signals of the working and standby systems, an ATM switch 305 for routing an ATM cell, which enters from the optical path cross-connect device (OPXC), from another electrical cross-connect device (EXC) and from a switch (SW), to a prescribed outgoing line, a distributing circuit 306 for distributing electric signals, which are transmitted to the optical path cross-connect device, to the working/standby systems, a plurality of electro-optic converters 307, of fixed output wavelength, for converting the electric signals of the working and standby systems to optical signals $\lambda_1$~$\lambda_2$, and a multiplexer 308 for multiplexing the optical signals outputted by each of the working electro-optic converters and the optical signals outputted by each of the standby electro-optic converters and sending them to the working and standby interface links 121a, 121b, respectively.

The optical path cross-connect device 101 performs demultiplexing, switching, wavelength conversion and multiplexing, 1) routes wavelength-division-multiplexed optical signals that have entered from the working optical transmission line 130 to the working optical transmission line 150 or working interface link 122a wavelength by wavelength, 2) routes wavelength-division-multiplexed optical signals that have entered from the standby optical transmission line 140 to the standby optical transmission line 160 or standby interface link 122b wavelength by wavelength, 3) routes wavelength-division-multiplexed optical signals that have entered from the working interface link 121a to the working optical transmission line 150 wavelength by wavelength, and 4) routes wavelength-division-multiplexed optical signals that have entered from the standby interface link 121b to the standby optical transmission line 160 wavelength by wavelength. On the basis of a switching command, the electrical cross-connect device 201 switches the working and standby transmission lines by the selector 304 without momentary disconnect.

For example, in a case where wavelength-division-multiplexed optical signals are transmitted from the electrical cross-connect device (EXC1) of the first optical transmission system 100 to the electrical cross-connect device (EXC2) of the second optical transmission system 200, the electrical cross-connect device (EXC1) distributes the wavelength-division-multiplexed optical signals of the working and standby systems to the working/standby interface links 121a, 121b, the optical path cross-connect device OPXC1 routes the optical signals, which have entered from the working interface link 121a, to the working optical transmission line 131 and routes the optical signals, which have entered from the standby interface link 121b, to the standby optical transmission line 132. The optical path cross-connect device OPXC2 of the second optical transmission system 200 routes the optical signals, which have entered from the working optical transmission line 131, to the working interface link 122a and routes the optical signals, which have entered from the standby optical transmission line 132, to the standby interface link 122b, thereby entering these optical signals into the electrical cross-connect device EXC2. The electrical cross-connect device EXC2 selects the wavelength-division-multiplexed signals that have entered from the working interface link 122a and routes the signals to the desired outgoing line by way of the ATM switch 305.

If signals flowing through the working optical transmission line 131 are switched to signals in the standby system and signals flowing through the standby optical transmission line 132 are switched to signals in the working system under these conditions, then the electrical cross-connect device EXC2 of the second optical transmission system 200 selects the wavelength-division-multiplexed signals that have entered from the standby interface link 122b and routes these signals to a desired outgoing line by way of the ATM switch 305. In this case, a phase adjustment is carried out in the phase adjusting buffer 303 in such a manner that the signal phases in the working and standby systems coincide at all times. As a result, it is possible to switch between the working and standby systems without momentary disconnect and without loss of cells.

Thus, even though wavelength-division-multiplexed optical signals are transmitted, the optical path cross-connect device 101 need only establish working and standby paths in such a manner that the electrical cross-connect device 201 can perform switching without momentary disconnect. As a result, it is unnecessary for the optical path cross-connect device to have an optical phase adjusting function and to perform a high-speed switching operation.

Further, if the optical path cross-connect device 101 is divided into working and standby systems, then the number of switches constructing the optical space switch within the optical path cross-connect device can be reduced.

In FIG. 2 the optical path cross-connect device 101 is constructed employing a VWP (virtual wavelength path) scheme in which wavelength conversion is performed when required. However, it is possible to adopt a WP (wavelength path) scheme in which the input optical signal is not subjected to wavelength conversion. In the WP scheme, the wavelength at which a transmission is made depends upon the status of the network at the particular time, and therefore it is so arranged that the wavelength conversion can be performed on the transmitting side of the electrical cross-connect device 201. To this end, the electro-optic converter 307 is constructed using an electro-optic converter whose output wavelength is variable.

Further, there are cases where the wavelengths of the optical signals in the working and standby systems sent from the optical path cross-connect device 101 to the working and standby interface links 122a, 122b leading to the electrical cross-connect device 201 differ. Accordingly, the standby interface link 122b is provided with a optical brancher and a variable-wavelength filter, which extracts an optical signal of a prescribed wavelength from each branched output, instead of the demultiplexer 301. If such an arrangement is adopted, an optical signal on the standby system is converted to an electric signal correctly by the optoelectric converter and blocking is prevented.

FIG. 2 illustrates a case in which the electrical cross-connect device 201 produces wavelength-division-multiplexed optical signals for the working and standby systems of the optical path cross-connect device 101 and distributes these signals to the working and standby interface links 121a, 121b. However, an arrangement may be adopted in which, rather than the wavelength-division-multiplexed optical signals being distributed to the working and standby systems via the electrical cross-connect device 201, the interface links are provided with optical distributors or optical distribution switches (not shown), whereby wavelength-division-multiplexed optical signals are distributed to the working and standby interface links 121a, 121b.

Alternatively, an arrangement may be adopted in which, rather than the wavelength-division-multiplexed optical signals being distributed to the working and standby systems via the electrical cross-connect device 201 as shown in FIG. 2, the optical path cross-connect device 101 is constructed by an optical space switch having a distribution function so that wavelength-division-multiplexed optical signals which have entered from the electrical cross-connect device 201 may be routed to the working and standby optical transmission lines simultaneously by means of the distributing function of this optical space switch.

(B) First embodiment (a) Optical transmission system

Figure 3:
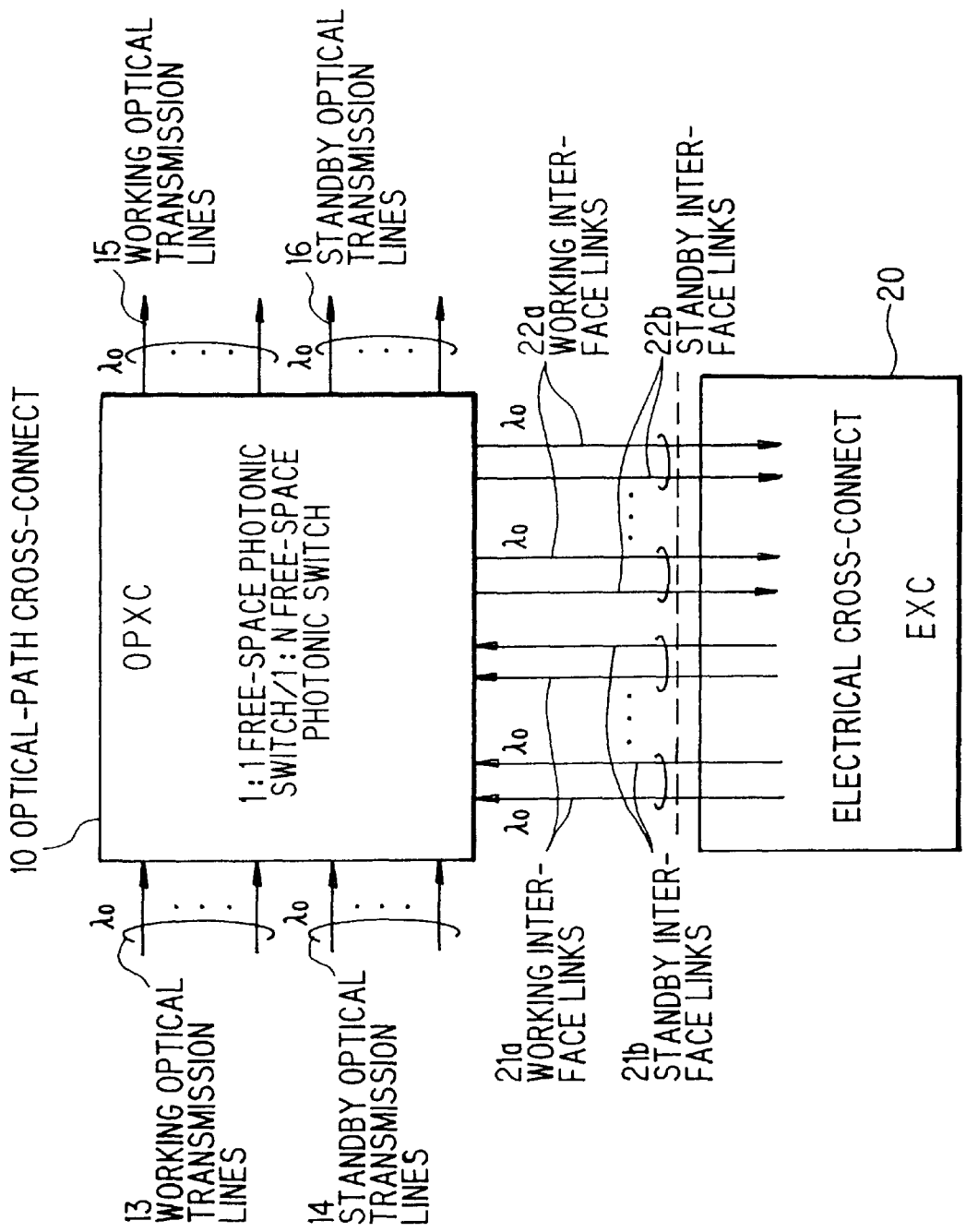
FIG. 3 is a diagram showing the configuration of an optical transmission system according to a first embodiment of the present invention.

FIG. 3 is a diagram showing the configuration of an optical transmission system according to a first embodiment of the present invention. Shown in FIG. 3 are the optical path cross-connect device (OPXC) 10 and the electrical cross-connect device (EC) 29. The optical path cross-connect device 10 is constituted by a 1:1 optical space switch or 1:N optical space switch and accommodates input and output working optical transmission lines 13, 15, respectively, input and output standby optical transmission lines 14 and 16, respectively, input and output working interface links 21a, 22a, respectively, and input and output standby interface links 21b, 22b, respectively. The wavelengths of all of the optical signals are $\lambda_1$.

The optical path cross-connect device 10 (1) routes optical signals that have entered from the working optical transmission line 13 to the working optical transmission line 15 or working output interface link 22a, (2) similarly routes optical signals that have entered from the standby optical transmission line 14 to the standby optical transmission line 16 or standby output interface link 122b wavelength by wavelength, (3) routes optical signals that have entered from the working interface link 21a to the working output optical transmission line 15, and (4) routes optical signals that have entered from the standby interface link 21b to the standby optical transmission line 16.

(b) Optical space switch

Figure 4:
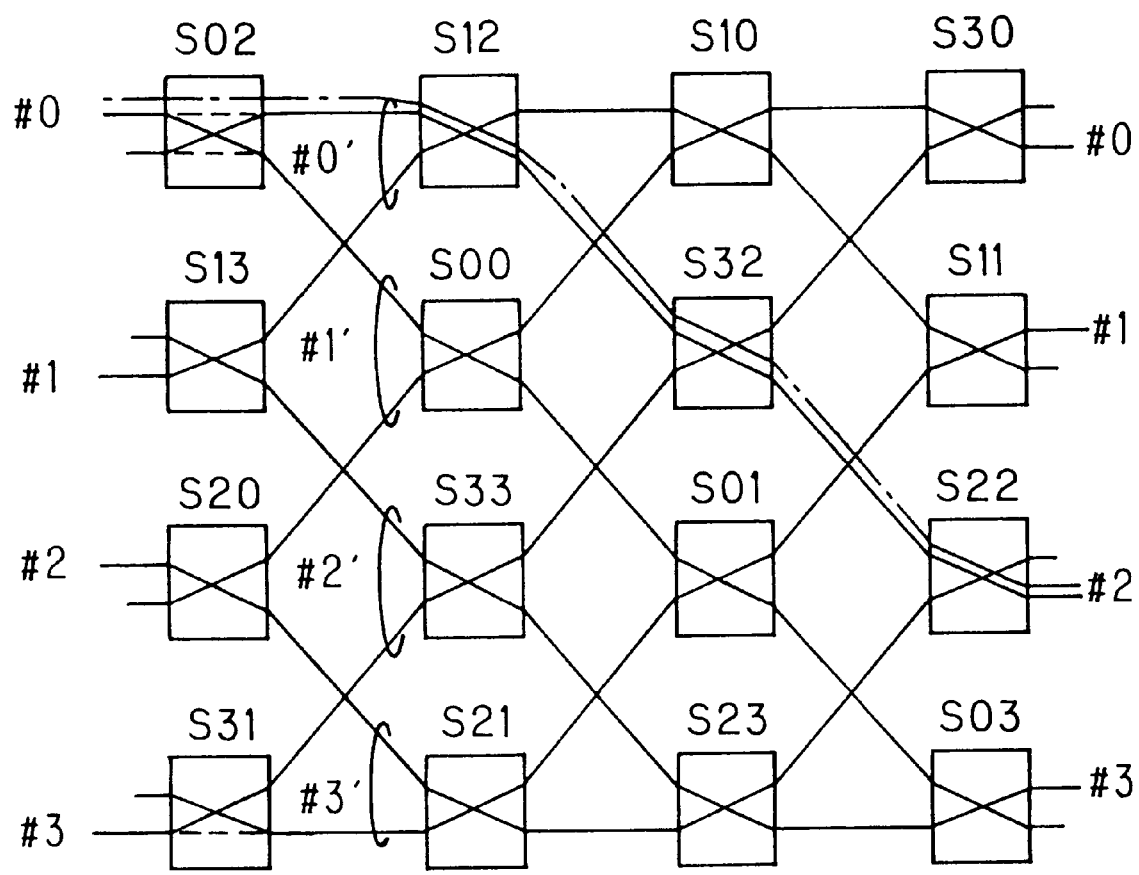
FIG. 4 is a diagram showing the architecture of a 1:1 optical space switch.

FIG. 4 is a diagram showing the architecture of a 1:1 optical space switch constructing the optical path cross-connect device 10. The arrangement illustrated is that for m inputs and m outputs (m=4). The switch includes crossbar-type optical switch elements S00~S33 in a 4×4 array. Each optical switch element is in the crossed state under ordinary conditions. If an optical path is to be switched, a predetermined one of the optical switch elements is controlled to establish the thru state. For example, in a case where optical information from an input optical path #i is outputted from an output optical path #j, the optical switch element Sij is controlled to establish the thru state. In the example of FIG. 4, a case is shown in which optical information from an input optical path #0 is outputted from an output optical path #2. The switch element S02 is controlled to establish the thru state, as indicated by the dashed line, so that the optical information is outputted to the output optical path #2 through the path indicated by the one-dot chain line.

Figure 5:
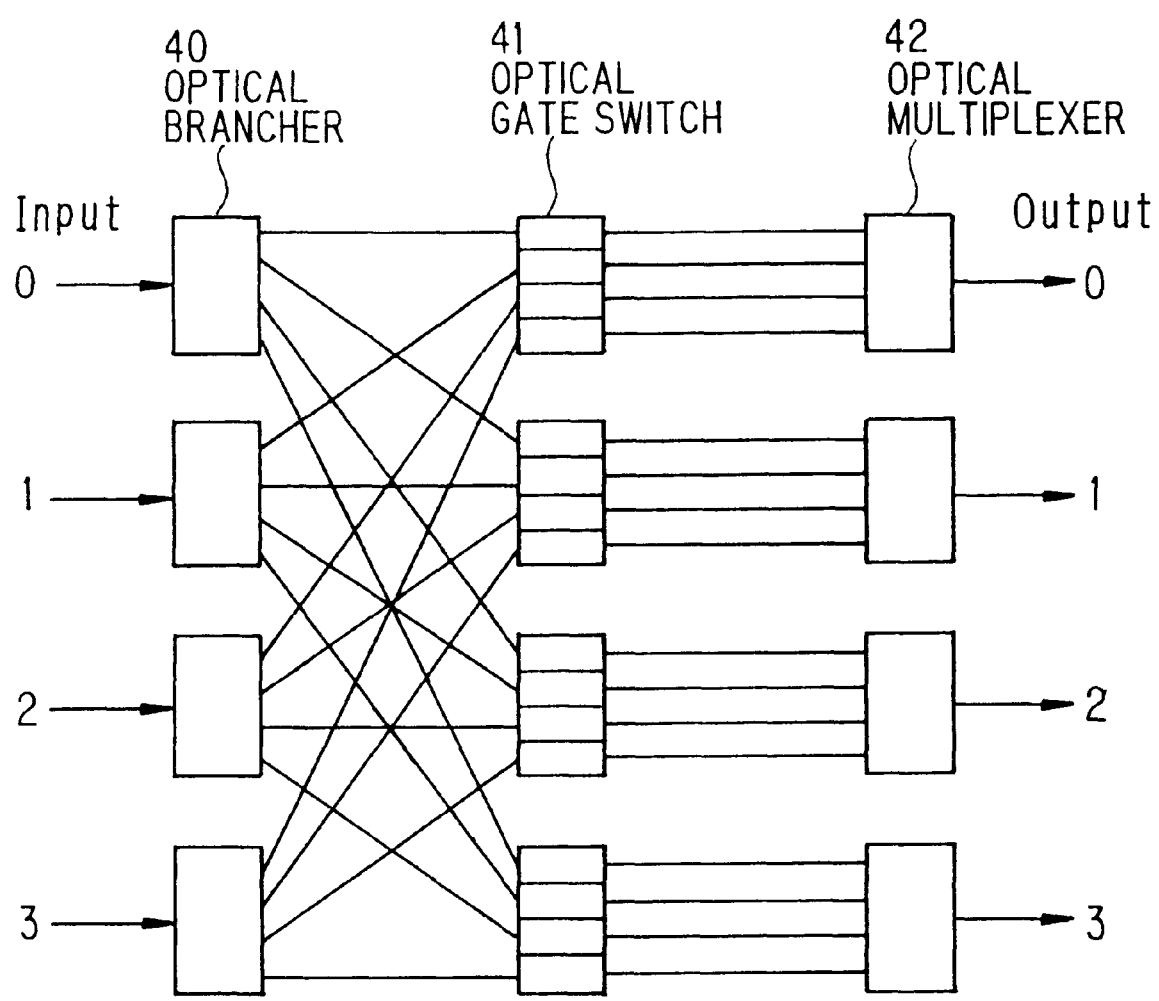
FIG. 5 is a diagram showing the architecture of a 1:N optical space switch.

FIG. 5 is a diagram showing the architecture of a 1:N optical space switch constructing the optical path cross-connect device 10. The optical switch includes optical branchers 40, optical gate switches 41 and optical multiplexers 42. Each optical brancher 40 branches an optical signal, which has entered from a corresponding input optical path (channel), in four directions so that the signal enters each one of the optical gate switches 41. Each optical gate switch 41 performs switch control so as to always output only one signal in a certain period of time and send the optical signal to the corresponding output optical path via the optical multiplexer 42.

(c) Architecture of electrical cross-connect device

Figure 6:
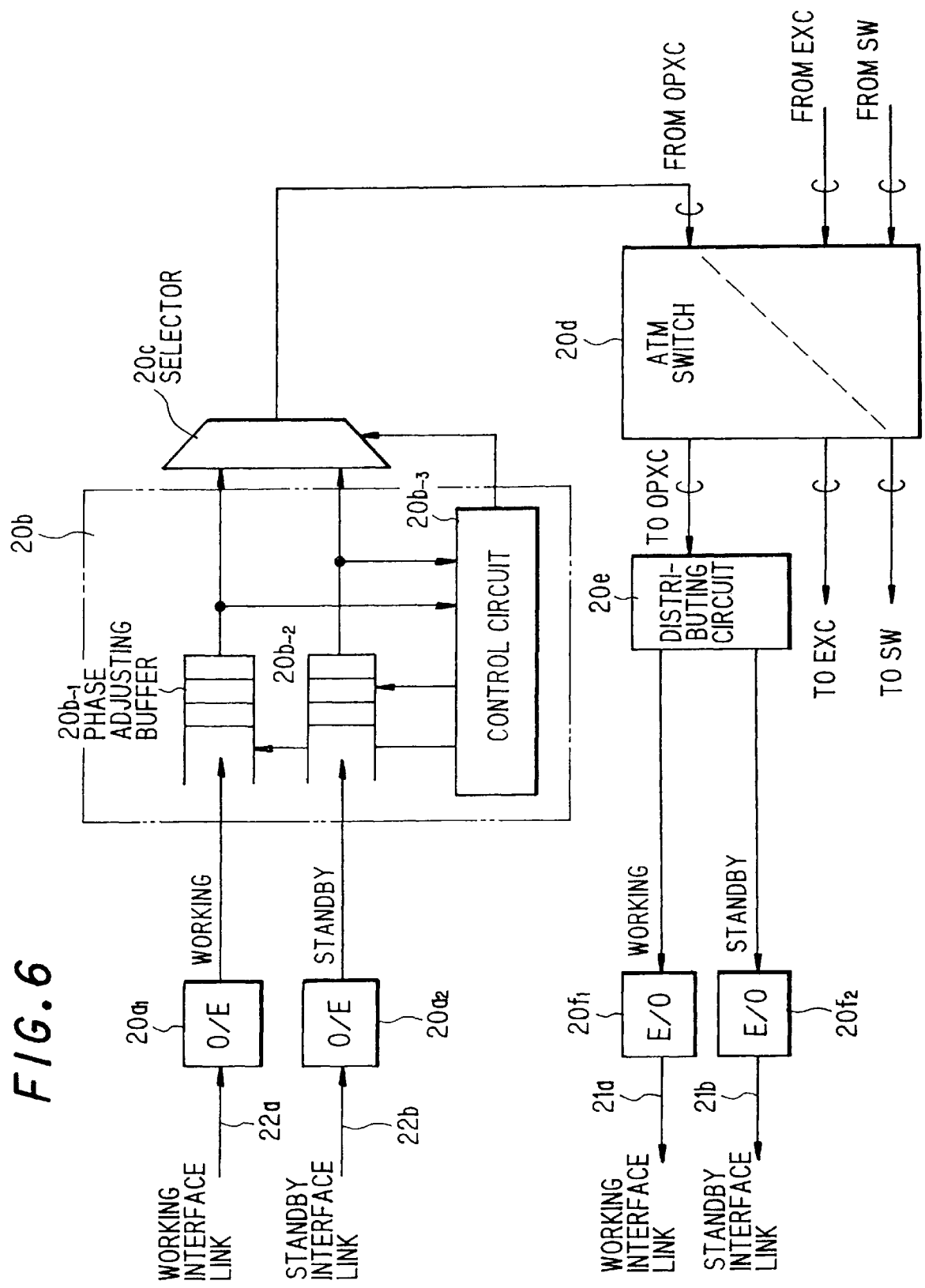
FIG. 6 is a diagram showing the architecture of an electrical cross-connect device.

FIG. 6 is a diagram showing the architecture of the electrical cross-connect device. Opto-electric converters (O/E converters) $20a_1$, $20a_2$ convert optical signals on the working and standby systems, which enter from the working and standby interface links 22a, 22b, respectively, to electric signals, the phase adjuster 20b detects a difference in lag times between the two paths of the working and standby systems and adjusts the phases of the electric signals of the working and standby systems in such a manner that the signal phases will coincide, and the selector 20c selects the electric signal of the working system or standby system. The phase adjuster 20b is composed of a working phase shifting buffer 20b-1, a standby phase shifting buffer 20b-2 and a controller 20b-3. The controller 20b-3 compares the phases of the phase shifting buffers 20b-1, 20b-2, controls the readout timing of the buffer in such a manner that the two phases will agree and instructs the selector 20c to make the switch at the moment the phases come into agreement. As a result, the selector 20c performs high-speed switching to such a degree that will not cause bit error. The ATM switch 20d routes an ATM cell, which enters from the optical path cross-connect device (OPXC) 10, from another electrical cross-connect device (EXC) and from the switch (SW), to a prescribed outgoing line. The distributing circuit 20e distributes electric signals, which are transmitted to the optical path cross-connect device, to the working/standby systems. Electro-optic converters (E/O converters) $20f_1$, $20f_2$ convert the electric signals of the working and standby systems to optical signals and output these optical signals to the working and standby interface links 21a, 21b.

(d) Transmission line switching operation

Figure 7:
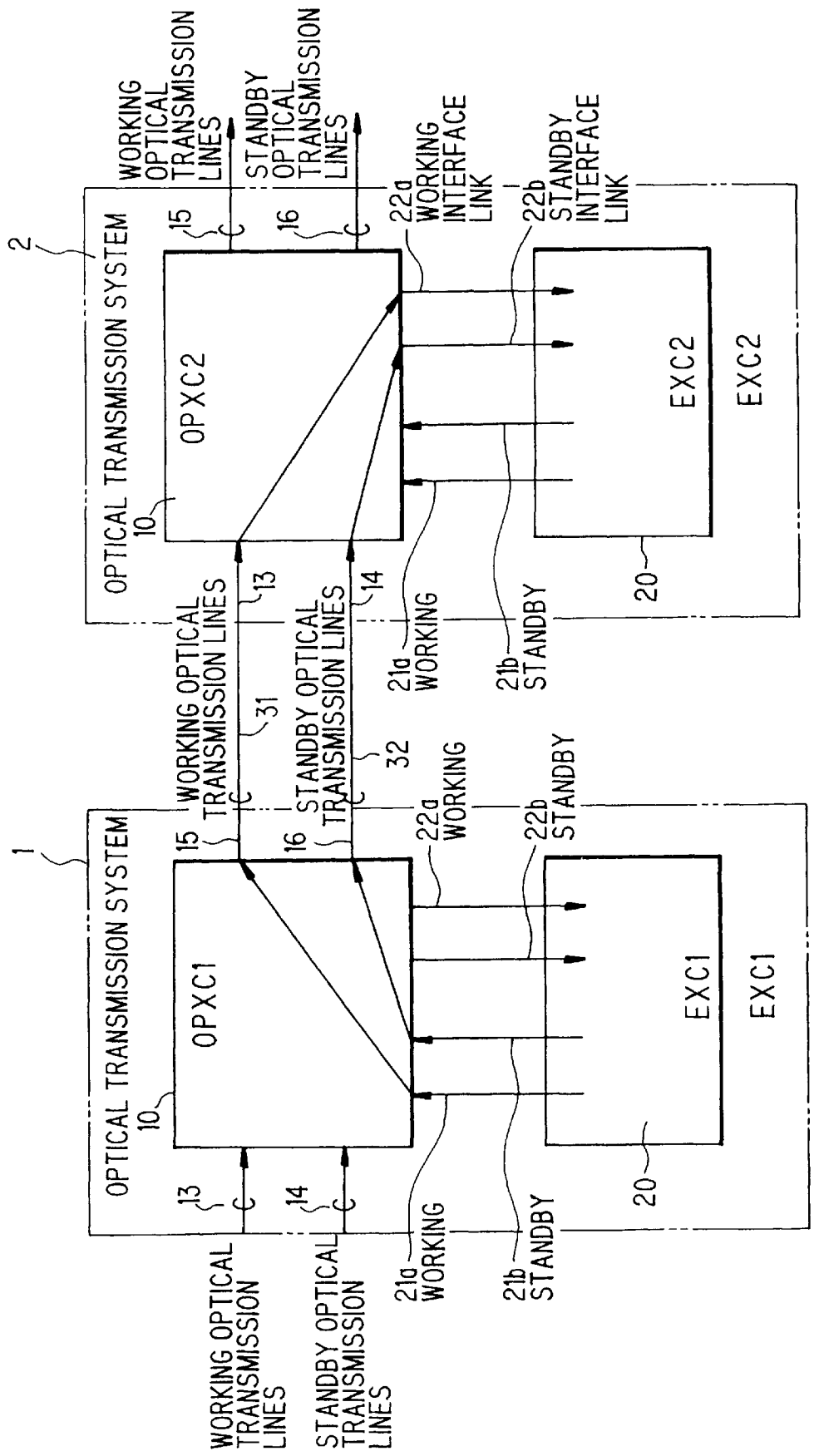
FIG. 7 is a diagram for describing a transmission line switching operation in the first embodiment of the invention.

FIG. 7 is a diagram for describing a transmission line switching operation in the first embodiment of the invention. Numerals 1 and 2 denote the optical transmission systems having the respective optical path cross-connect devices 10 (OPXC1, OPXC2) and electrical cross-connect devices 20 (EXC1, EXC2). The optical path cross-connect devices OPXC1, OPXC2 of the optical transmission systems 1, 2 are connected by the working and standby optical transmission lines 31 and 32.

Ordinary operation

A case will be described in which a signal is transmitted from the electrical cross-connect device (EXC1) of the first optical transmission system to the electrical cross-connect device (EXC2) of the second optical transmission system. It should be noted that the paths of the working and standby systems have already been established and fixed by connection control.

The electrical cross-connect device (EXC1) distributes the working and standby optical signals to the working/standby interface links 21a, 21b, and the optical path cross-connect device OPXC1 routes the optical signal that has entered from the working interface link 21a to the working optical transmission line 31 and routes the optical signal that has entered from the standby interface link 21b to the standby optical transmission line 32.

The optical path cross-connect device OPXC2 of the second optical transmission system routes the optical signal from the electrical cross-connect device EXC1 that has entered from the working optical transmission line 31 to the working interface link 22a and routes the optical signal from the electrical cross-connect device EXC1 that has entered from the standby optical transmission line 32 to the standby interface link 22b, whereby these signals are entered into the electrical cross-connect device EXC2.

The electrical cross-connect device EXC2 selects the working signal, which has entered from the working interface link 22a (see FIG. 6), and routes this signal to the desired outgoing line by the ATM switch 20d.

Switching operation

If a signal flowing through the working optical transmission line 31 is switched to a signal in the standby system and a signal flowing through the standby optical transmission line 32 is switched to a signal in the working system under these conditions, then, on the basis of the switching command, the electrical cross-connect device EXC2 of the second optical transmission system 2 selects the standby signal that has entered from the standby interface link 22b and routes this signal to a desired outgoing line by way of the ATM switch 20d. In this case, a phase adjustment is carried out in the phase adjuster 20b in such a manner that the signal phases in the working and standby systems coincide at all times. As a result, it is possible to switch between the working and standby systems without momentary disconnect and without loss of cells.

FIG. 7 is for a case in which the electrical cross-connect device EXC1 of one of the adjacent optical transmission systems 1 and 2 transmits a signal to the electrical cross-connect device EXC2 of the other optical transmission system. However, even if the arrangement is one in which another optical transmission system is interposed between the first and second optical transmission systems 1 and 2, the phase adjuster 20b of the electrical cross-connect device on the signal receiving side always performs the phase adjustment in such a manner that the signal phases of the working and standby systems will coincide. Accordingly, regardless of the optical transmission lines switched between working and standby, the working/standby changeover can be performed in the manner described above without momentary disconnect and loss of cells.

In accordance with the first embodiment, the optical path cross-connect device 10 is not required to perform uninterrupted switching but need only establish working and standby paths in such a manner that the electrical cross-connect device 20 can perform switching without momentary disconnect. As a result, it is unnecessary for the optical path cross-connect device to have an optical phase adjusting function and to perform a high-speed switching operation.

(e) Modification (e-1) First modification

Figure 8:
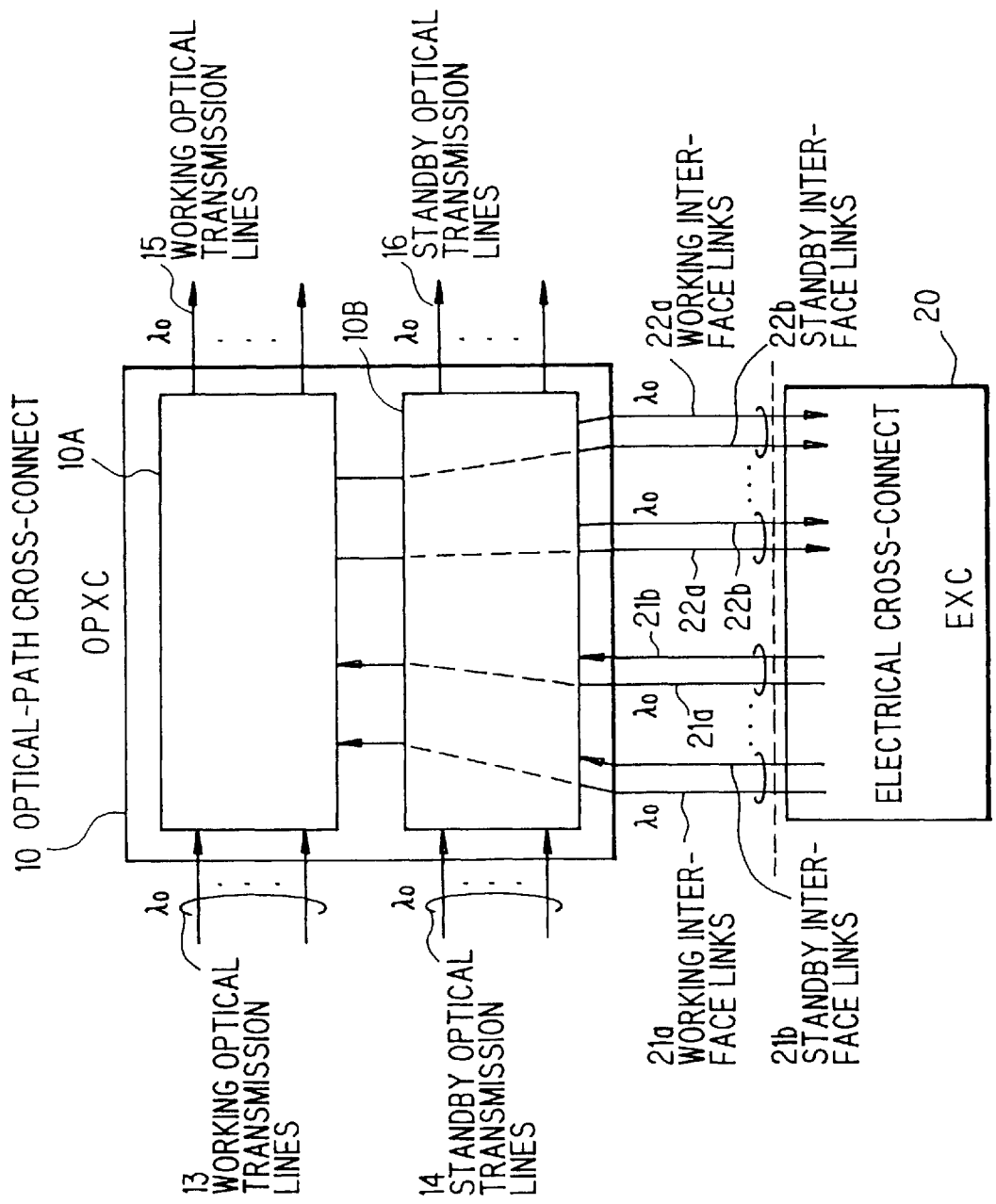
FIG. 8 is a diagram showing the configuration of an optical transmission system according to a first modification.

FIG. 8 shows a first modification of the optical transmission system according to the present invention. Elements in FIG. 8 identical with those shown in FIG. 3 are designated by like reference characters. In the optical transmission system shown in FIG. 8, the optical switch of the optical path cross-connect device 10 is divided into a working optical switch 10A and a standby optical switch 10B, the working optical signal is switched to the optical switch 10A and the standby optical signal is switched to the optical switch 10B.

The optical path cross-connect device 10 routes an optical signal that has entered from the working optical transmission line 13 to the working optical transmission line 15 and working interface link 22a by the optical switch 10A. By way of example, a 1:1 optical space switch or 1:N optical space switch is used as the optical switch 10A. Similarly, the optical path cross-connect device 10 routes an optical signal that has entered from the standby optical transmission line 14 to the standby optical transmission line 16 and standby interface link 22b by the optical switch 10B. Further, the optical path cross-connect device 10 routes an optical signal, which has entered from the working interface link 21a, to the working optical transmission line 15 by the optical switch 10A, and routes an optical signal, which has entered from the standby interface link 21b, to the standby optical transmission line 16 by the optical switch 10B.

In accordance with the first modification, the number of elements in the optical switch can be reduced. For example, if the optical switch in the first embodiment illustrated in FIG. 3 has 12 inputs and 12 outputs, the number of optical switch elements will be 12×12=144. In the case of this modification, however, the number of optical switch elements required is 6×6×2=72. Thus, the number of optical switch elements is reduced.

Figure 9:
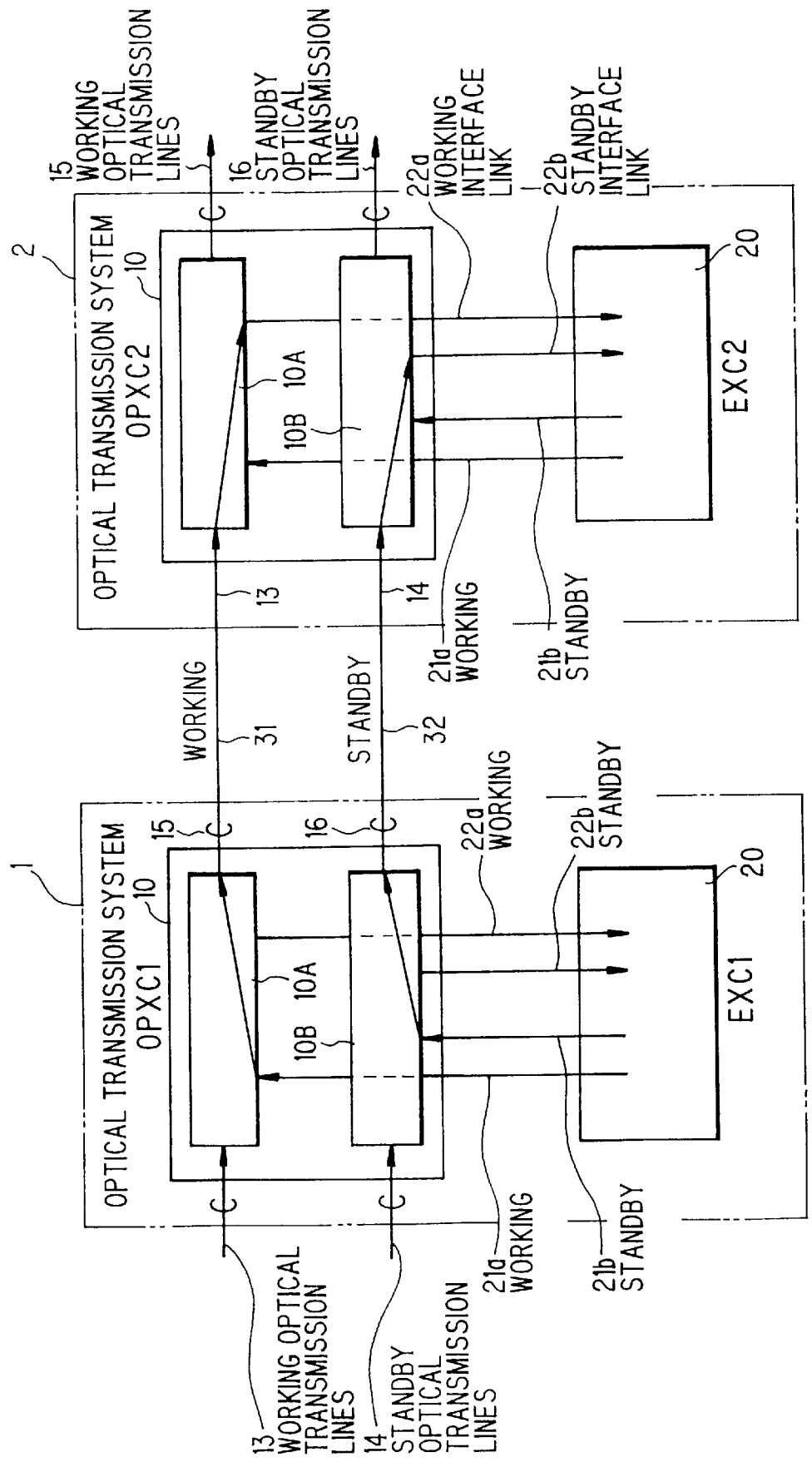
FIG. 9 is a diagram for describing the operation of the first modification.

FIG. 9 is a diagram for describing the operation of the first modification. Numerals 1 and 2 denote the optical transmission systems having the architecture shown in FIG. 8. Each includes the optical path cross-connect devices 10 (OPXC1, OPXC2) and electrical cross-connect devices 20 (EXC1, EXC2). The optical path cross-connect devices OPXC1, OPXC2 of the optical transmission systems 1, 2 are connected by the working and standby optical transmission lines 31 and 32.

In the system shown in FIG. 9, the paths of the working and standby signals transmitted from one electrical cross-connect device EXC1 to the other electrical cross-connect device EXC2 have already been established and fixed by connection control. If the selector 20c (see FIG. 6) of the electrical cross-connect device EXC2 on the signal receiving side switches between the working and standby systems on the basis of a switching command under these conditions, in a manner similar to that of the first embodiment, the working and standby systems are switched at the output side of the ATM switch 20d so that the working and standby systems can be switched without momentary disconnect.

(e-2) Second modification

In the first embodiment of FIG. 3, the electrical cross-connect device 20 produces optical signals for the working and standby systems of the optical path cross-connect device 10 and distributes these signals to the working and standby interface links 21a, 21b. However, an arrangement may be adopted in which, rather than the optical signals being distributed to the working and standby systems via the electrical cross-connect device 20, the interface links are provided with optical distributors or optical distribution switches, whereby optical signals are distributed to the working and standby interface links 21a, 21b.

Figure 10:
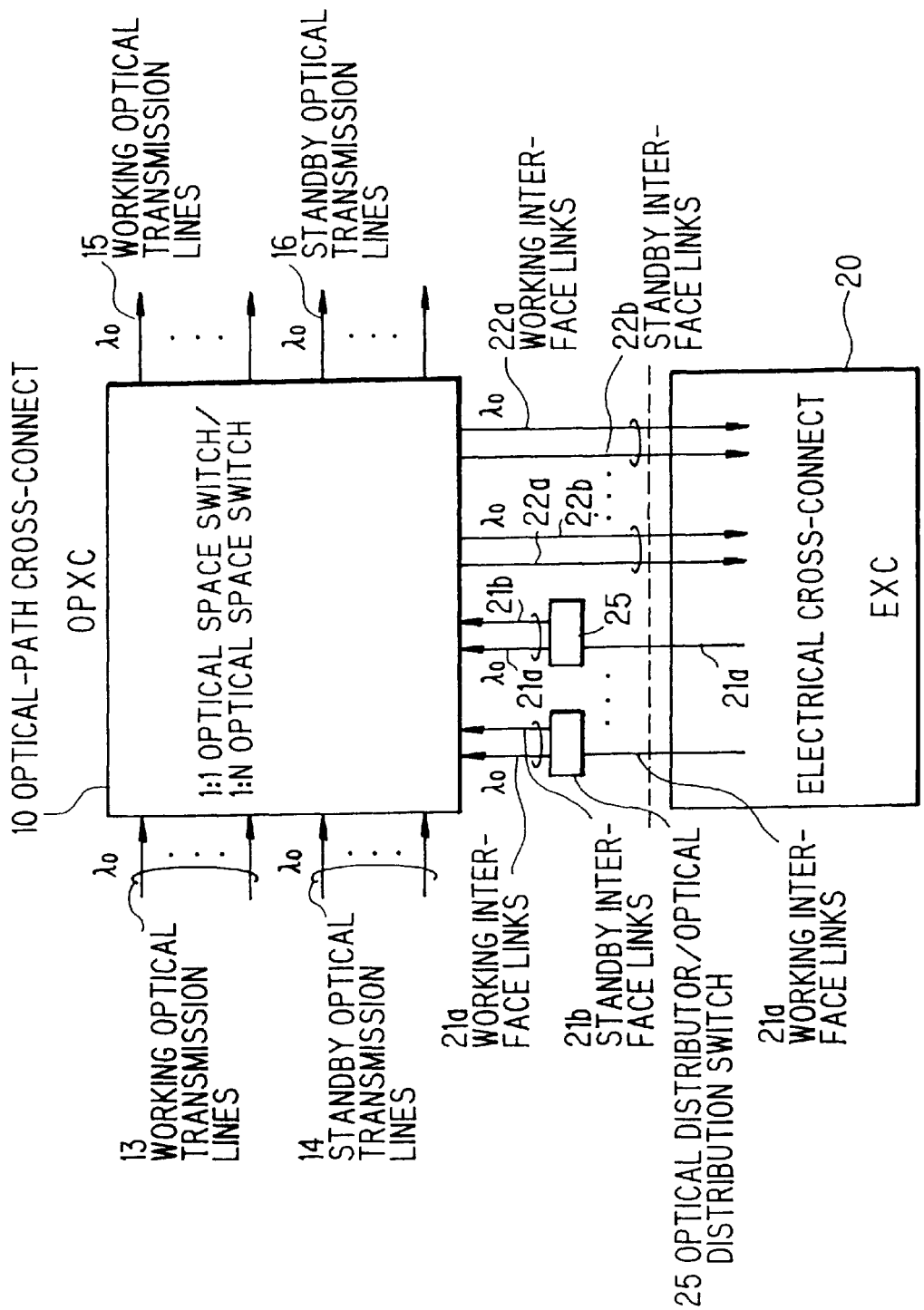
FIG. 10 is a diagram showing the configuration of an optical transmission system according to a second embodiment of the present invention.

FIG. 10 shows a second modification of the optical transmission system according to the present invention. Elements in FIG. 10 identical with those shown in FIG. 3 are designated by like reference characters. In FIG. 10, the working interface link 21a connected to the electrical cross-connect device 20 is provided with an optical distributor or optical distributing switch 25 for distributing an optical signal from the electrical cross-connect device 20 to the working and standby interface links 21a, 21b. In the second modification, the interface links from the optical path cross-connect device 10 to the electrical cross-connect device 20 are connected in pairs of the working and standby lines in the same manner as in the first embodiment.

Figure 11:
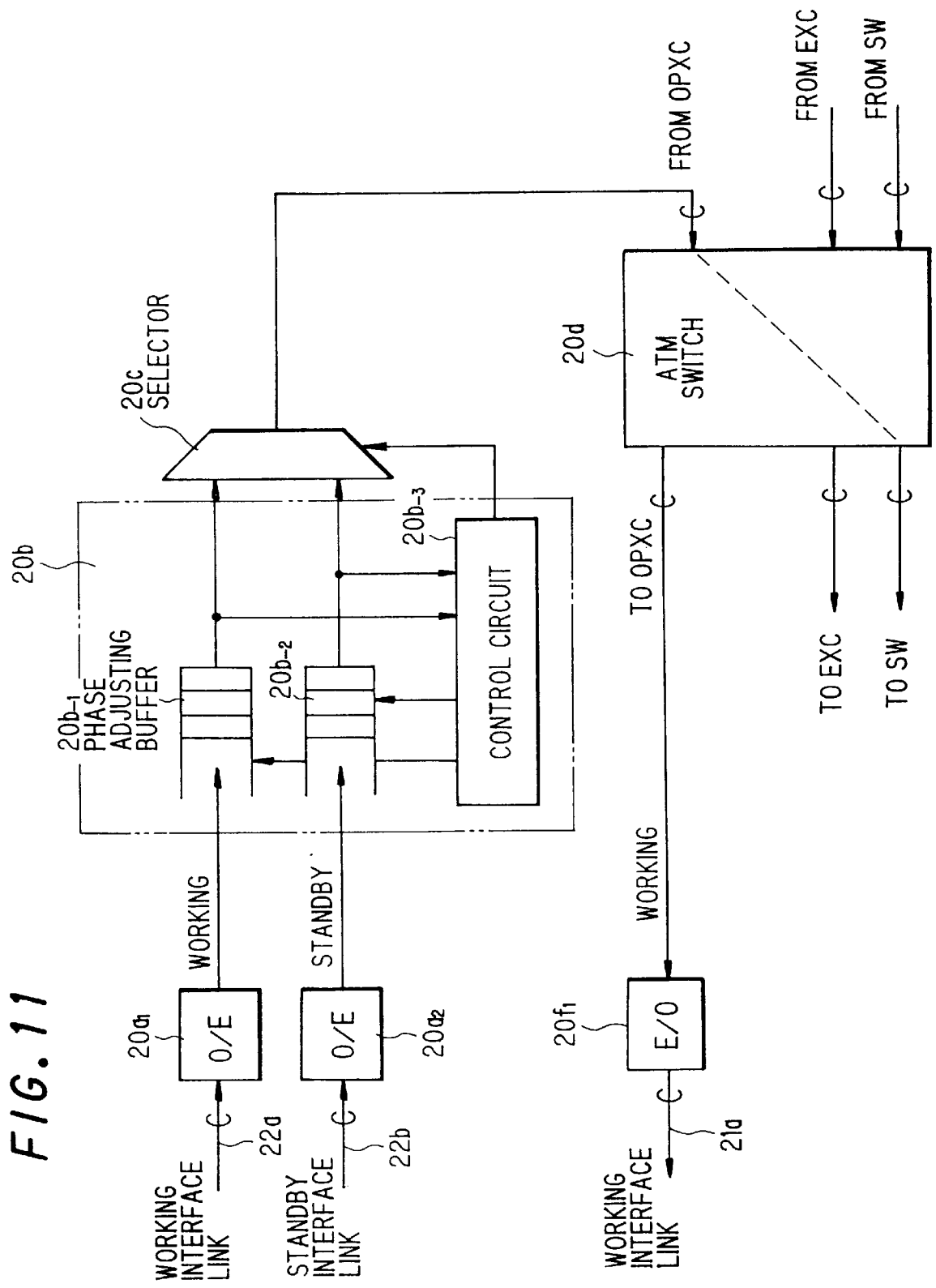
FIG. 11 is a diagram showing the architecture of an electrical cross-connect device.

FIG. 11 is a diagram showing the architecture of the electrical cross-connect device 20 in the second modification. Elements in FIG. 11 identical with those shown in FIG. 6 are designated by like reference characters. This arrangement differs from that of FIG. 6 in that the distributing circuit 20e and standby electro-optic converter (E/O) 20f2 are deleted.

The optical path cross-connect device 10 (1) routes optical signals that have entered from the working optical transmission line 13 to the working optical transmission line 15 or working output interface link 22a and (2) routes optical signals that have entered from the standby optical transmission line 14 to the standby optical transmission line 16 or standby output interface link 122b wavelength by wavelength, this being performed in a manner similar to that of the first embodiment. Further, the optical path cross-connect device 10 (3) routes optical signals distributed by the optical distributing switches 25 and entrant from the working interface links 21a to the working and standby optical transmission lines 15, and (4) routes optical signals that have entered from the standby interface links 21b to the standby optical transmission lines 16.

Figure 12:
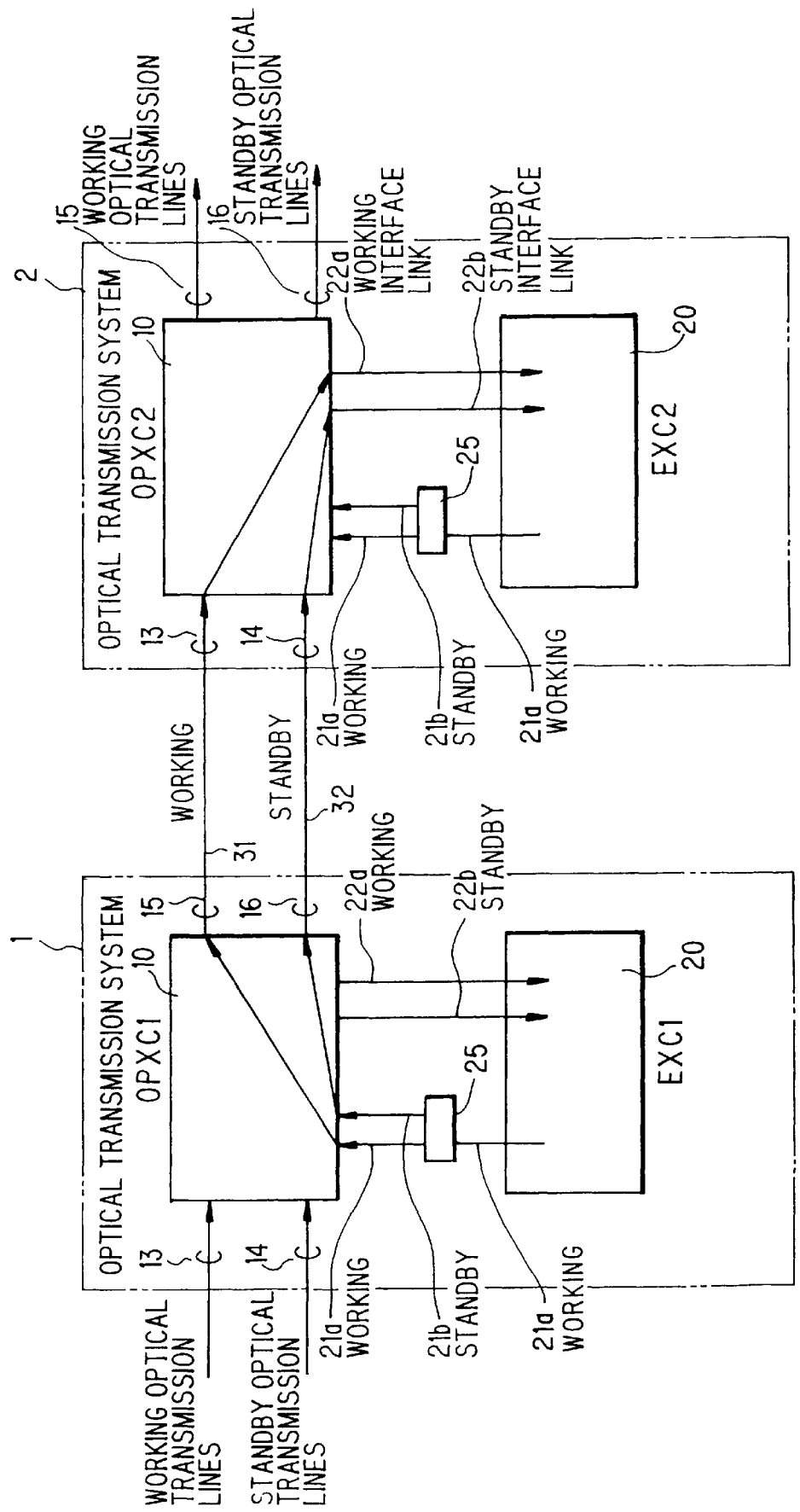
FIG. 12 is a diagram for describing the operation of a second modification.

FIG. 12 is a diagram for describing the operation of the second modification. Numerals 1 and 2 denote the optical transmission systems having the architecture shown in FIG. 10. Each includes the optical path cross-connect devices 10 (OPXC1, OPXC2) and electrical cross-connect devices 20 (EXC1, EXC2). The optical path cross-connect devices OPXC1, OPXC2 of the optical transmission systems 1, 2 are connected by the working and standby optical transmission lines 31 and 32.

In the system shown in FIG. 12, the paths of the working and standby signals transmitted from one electrical cross-connect device EXC1 to the other electrical cross-connect device EXC2 have already been established and fixed by connection control. If the selector 20c (see FIG. 11) of the electrical cross-connect device EXC2 on the signal receiving side switches between the working and standby systems on the basis of a switching command under these conditions, in a manner similar to that of the first embodiment, the working and standby systems are switched at the output side of the ATM switch 20d so that the working and standby systems can be switched without momentary disconnect.

(e-3) Third modification

Figure 13:
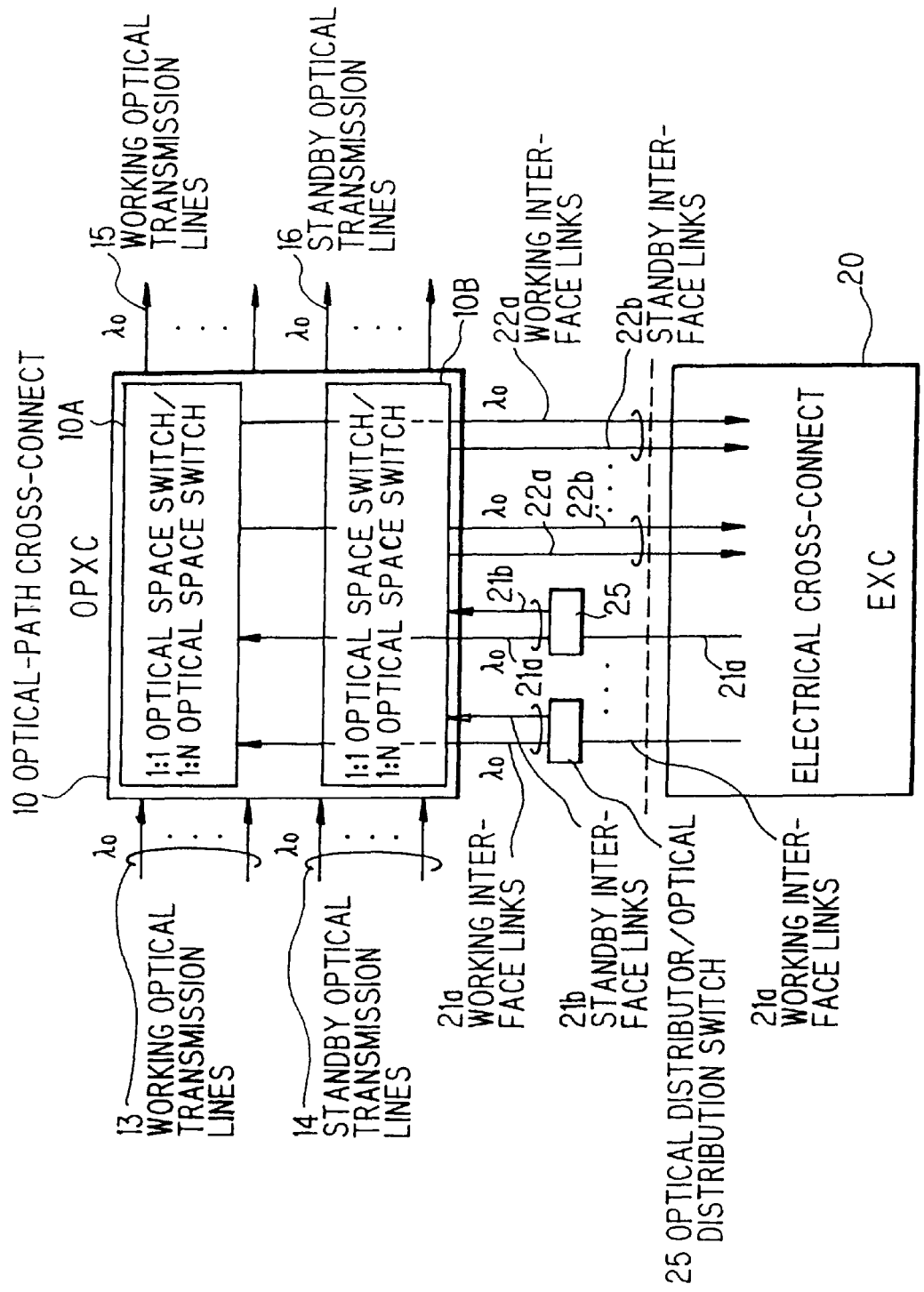
FIG. 13 is a diagram showing the configuration of an optical transmission system according to a third modification.

FIG. 13 shows a third modification of the optical transmission system according to the present invention. Elements in FIG. 13 identical with those of the second modification shown in FIG. 10 are designated by like reference characters. In the optical transmission system of the third modification shown in FIG. 13, the optical switch of the optical path cross-connect device is divided into a working optical switch 10A and a standby optical switch 10B, the working optical signal is switch to the optical switch 10A and the standby optical signal is switched to the optical switch 10B.

The optical path cross-connect device 10 routes an optical signal that has entered from the working optical transmission line 13 to the working optical transmission line 15 and working interface link 22a by the optical switch 10A. A 1:1 optical space switch or 1:N optical space switch is used as the optical switch 10A. Similarly, the optical path cross-connect device 10 routes an optical signal that has entered from the standby optical transmission line 14 to the standby optical transmission line 16 and standby interface link 22b by the optical switch 10B. Further, the optical path cross-connect device 10 routes an optical signal, which has been distributed by the optical distributor 25 and entered from the working interface link 21a, to the working optical transmission line 15 by the optical switch 10A, and routes an optical signal, which has entered from the standby interface link 21b, to the standby optical transmission line 16 by the optical switch 10B.

In accordance with the third modification, the number of elements in the optical switch can be reduced. For example, if the optical switch in the second modification illustrated in FIG. 10 has 12 inputs and 12 outputs, the number of optical switch elements will be 12×12=144. In the case of the third modification, however, the number of optical switch elements required is 6×6×2=72. Thus, the number of optical switch elements is reduced.

Figure 14:
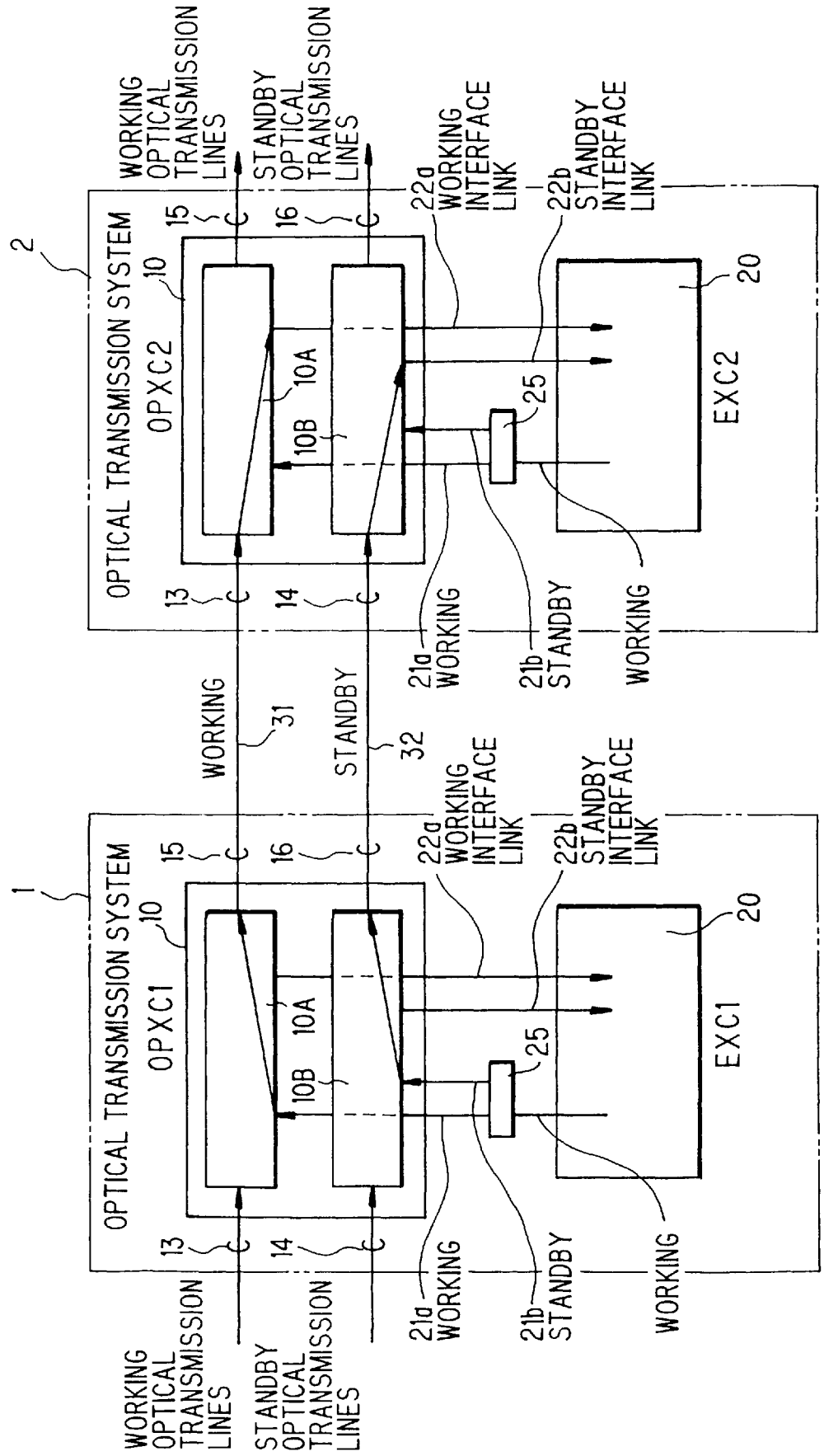
FIG. 14 is a diagram for describing the operation of a third modification.

FIG. 14 is a diagram for describing the operation of the third modification. Numerals 1 and 2 denote the optical transmission systems having the architecture shown in FIG. 13. Each includes the optical path cross-connect devices 10 (OPXC1, OPXC2) and electrical cross-connect devices 20 (EXC1, EXC2). The optical path cross-connect devices OPXC1, OPXC2 of the optical transmission systems 1, 2 are connected by the working and standby optical transmission lines 31 and 32.

In the system shown in FIG. 14, the paths of the working and standby signals transmitted from one electrical cross-connect device EXC1 to the other electrical cross-connect device EXC2 have already been established and fixed by connection control. If the selector 20c (see FIG. 11) of the electrical cross-air connect device EXC2 on the signal receiving side switches between the working and standby systems on the basis of a switching command under these conditions, in a manner similar to that of the first embodiment, the working and standby systems are switched at the output side of the ATM switch 20d so that the working and standby systems can be switched without momentary disconnect.

(e-4) Fourth modification

In the first embodiment of FIG. 3, the electrical cross-connect device 20 produces optical signals for the working and standby systems of the optical path cross-connect device 10 and distributes these signals to the working and standby interface links 21a, 21b. However, an arrangement may be adopted in which, rather than the optical signals being distributed to the working and standby systems via the electrical cross-connect device 20, the optical path cross-connect device 10 is constructed by an optical space switch having a distribution function so that optical signals which have entered from the electrical cross-connect device 20 may be routed to the working and standby optical transmission lines simultaneously by means of the distributing function of this optical space switch.

Figure 15:
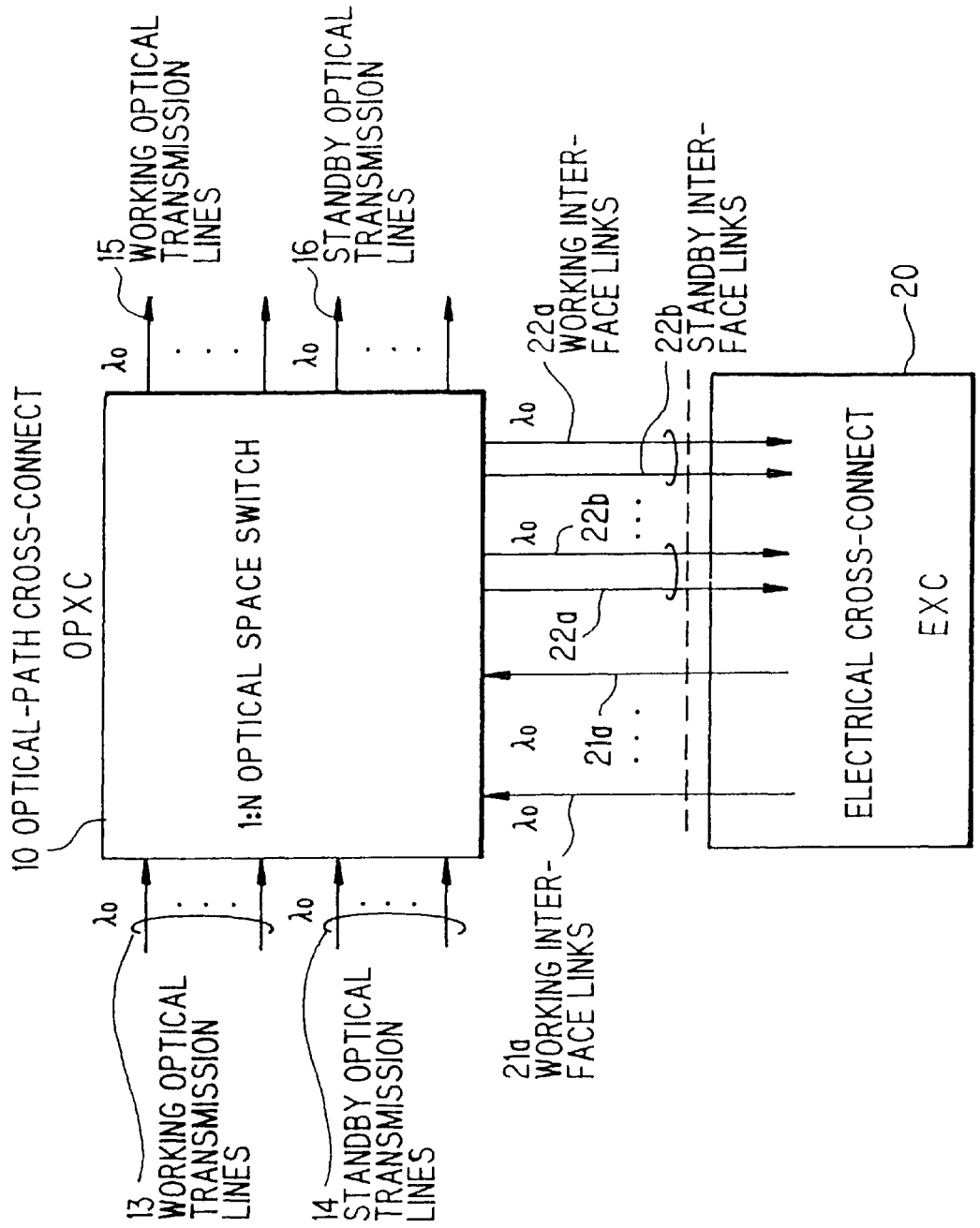
FIG. 15 is a diagram showing the configuration of an optical transmission system according to a fourth modification.

FIG. 15 is a diagram showing the fourth modification, in which elements identical with those of the first embodiment shown in FIG. 3 are designated by like reference characters. This arrangement differs from that of the first embodiment in that (1) the standby interface link 21b from the electrical cross-connect device 20 to the optical path cross-connect device 10 is deleted, (2) the optical path cross-connect device 10 is constructed by an optical space switch having a distribution function, and (3) the electrical cross-connect device 20 has the architecture shown in FIG. 11.

The interface link which enters an optical signal from the electrical cross-connect device 20 to the optical path cross-connect device 10 is solely the working interface link 21a. Interface links which enter optical signals from the optical path cross-connect device 10 to the electrical cross-connect device 20 is the pair of working and standby interface links 22a and 22b.

The optical path cross-connect device 10 routes the optical signal, which has entered from the working optical transmission line 13, to the working optical transmission line 15 or working interface link 22a. Similarly, the optical path cross-connect device 10 routes the optical signal, which has entered from the standby optical transmission line 14, to the standby optical transmission line 16 or standby output interface link 22b. Further, an optical signal that has entered from the working interface link 21a is routed to the working optical transmission line 15 and standby optical transmission line 16 by the distributing function.

Figure 16:
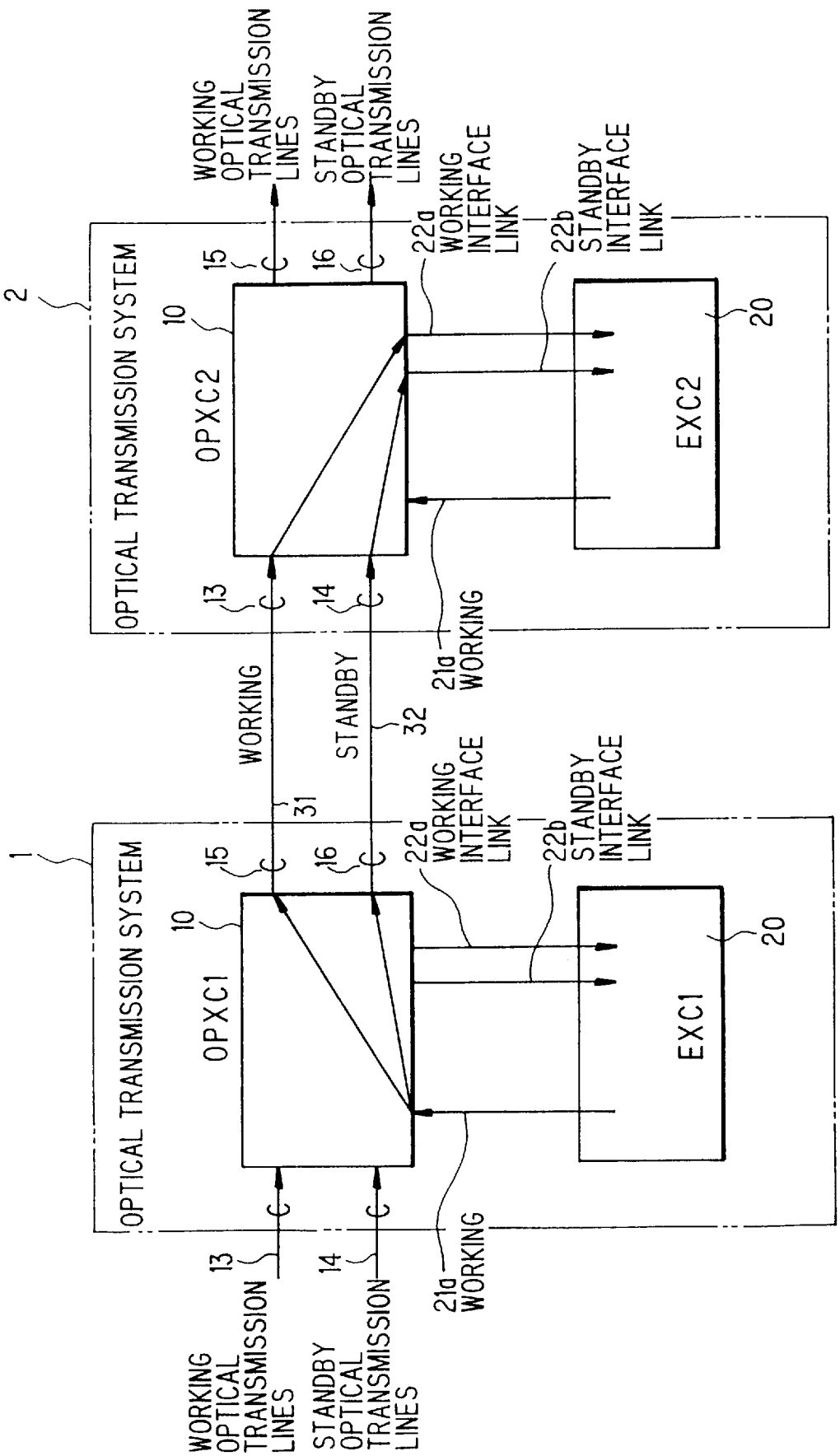
FIG. 16 is a diagram for describing the operation of a fourth modification.

FIG. 16 is a diagram for describing the operation of the fourth modification. Numerals 1 and 2 denote the optical transmission systems having the architecture shown in FIG. 15. Each includes the optical path cross-connect devices 10 (OPXC1, OPXC2) and electrical cross-connect devices 20 (EXC1, EXC2). The optical path cross-connect devices OPXC1, OPXC2 of the optical transmission systems 1, 2 are connected by the working and standby optical transmission lines 31 and 32.

In the system shown in FIG. 16, the paths of the working and standby signals transmitted from one electrical cross-connect device EXC1 to the other electrical cross-connect device EXC2 have already been established and fixed by connection control. If the selector 20c (see FIG. 11) of the electrical cross-connect device EXC2 on the signal receiving side switches between the working and standby systems on the basis of a switching command under these conditions, in a manner similar to that of the first embodiment, the working and standby systems are switched at the output side of the ATM switch 20d so that the working and standby systems can be switched without momentary disconnect.

(C) Second embodiment (a) General configuration

In the optical transmission systems of the first embodiment and the first through fourth modifications thereof, the wavelengths of optical signals are not multiplexed; the single wavelength So is used. In the second embodiment, uninterrupted switching of transmission lines is performed in a case where the transmission lines are wavelength-division multiplexed. Basically, the architecture is similar to that of the first embodiment and the first through fourth modifications thereof but the optical path cross-connect device and electrical cross-connect device are so adapted as to be capable of dealing with wavelength-division multiplexing.

FIGS. 17 through 21 are diagrams showing configurations of wavelength-division-multiplexed optical transmission systems according to the second embodiment of present invention. These correspond to the optical transmission systems of the first embodiment and first through fourth modifications thereof, respectively.

(a-1) Type A

Figure 17:
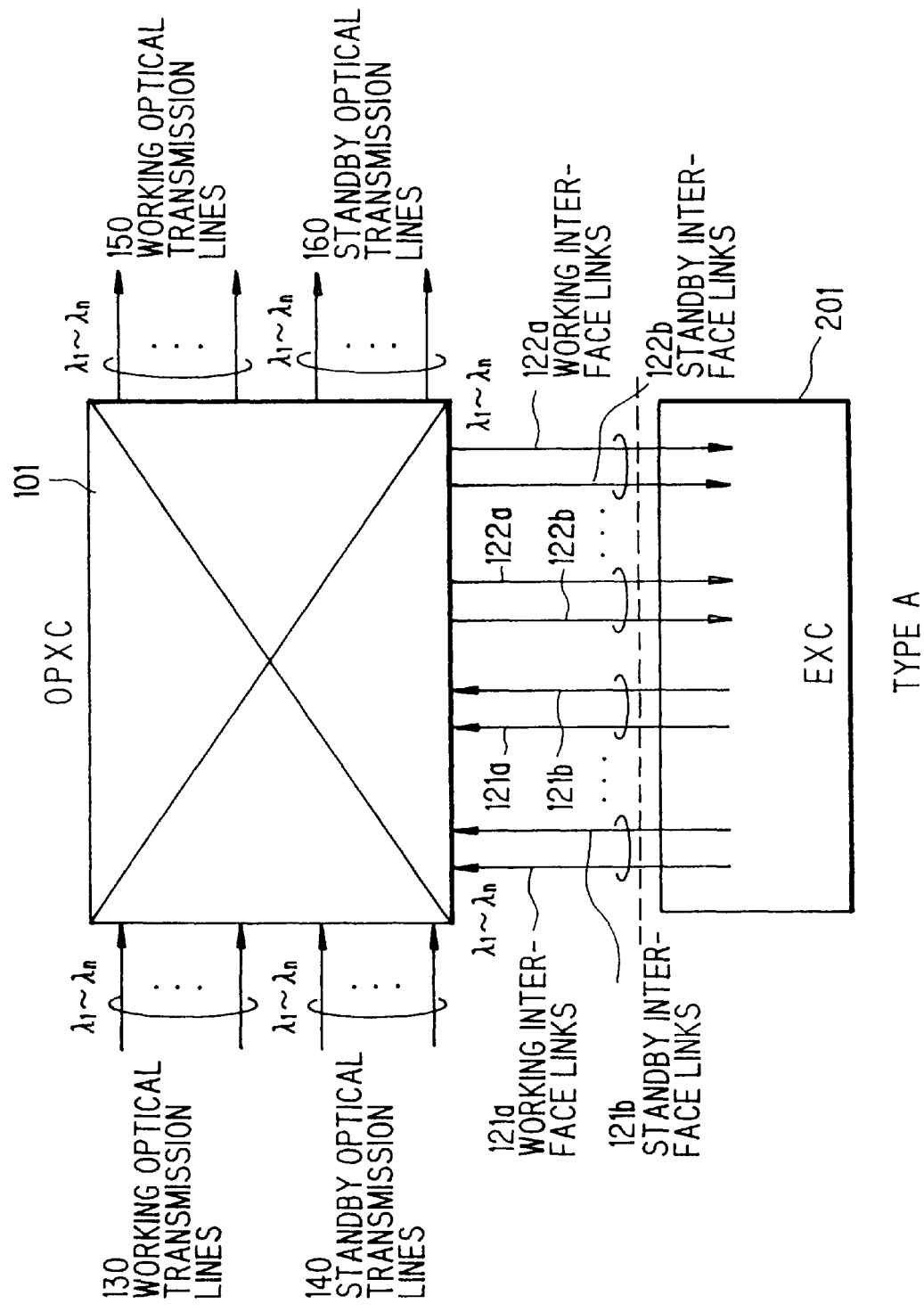
FIG. 17 is a diagram showing a first wavelength-division-multiplexed optical transmission system according to the present invention.

The wavelength-division-multiplexed optical transmission system of Type A shown in FIG. 17 corresponds to the first embodiment of FIG. 3. The interface links from the electrical cross-connect device EXC to the optical path cross-connect device OPXC and the interface links from the optical path cross-connect device OPXC to the electrical cross-connect device EXC are pairs of links each having a working link and a standby link interconnecting the devices EXC and OPXC.

In FIG. 17, numerals 101 and 201 denote the optical path cross-connect device (OPXC) and electrical cross-connect device (EXC), respectively. The optical path cross-connect device 101 (OPXC) accommodates the plurality of working optical transmission lines 130, 150 for wavelength-division-multiplexed optical signal input/output, the plurality of input and output standby optical transmission lines 140, 160 for wavelength-division-multiplexed optical signals, the plurality of working interface links 121a, 122a provided between the optical path cross-connect device and the electrical cross-connect device for wavelength-division-multiplexed optical signal input/output, and the plurality of standby interface links 121b, 122b provided between the optical path cross-connect device and the electrical cross-connect device for wavelength-division-multiplexed optical signal input/output. The optical path cross-connect device 101 (1) routes wavelength-division-multiplexed optical signals of wavelengths $\lambda_1 \sim \lambda_n$ that have entered from the working optical transmission lines 130 to the working optical transmission lines 150 or working interface links 122a wavelength by wavelength, (2) routes wavelength-division-multiplexed optical signals of wavelengths $\lambda_1 \sim \lambda_n$ that have entered from the standby optical transmission lines 140 to the standby optical transmission lines 160 or standby interface links 122b wavelength by wavelength, (3) routes wavelength-division-multiplexed optical signals that have entered from the working interface links 121a to the working optical transmission lines 150 wavelength by wavelength, and (4) routes wavelength-division-multiplexed optical signals that have entered from the standby interface links 121b to the standby optical transmission lines 160 wavelength by wavelength.

(a-2) Type B

Figure 18:
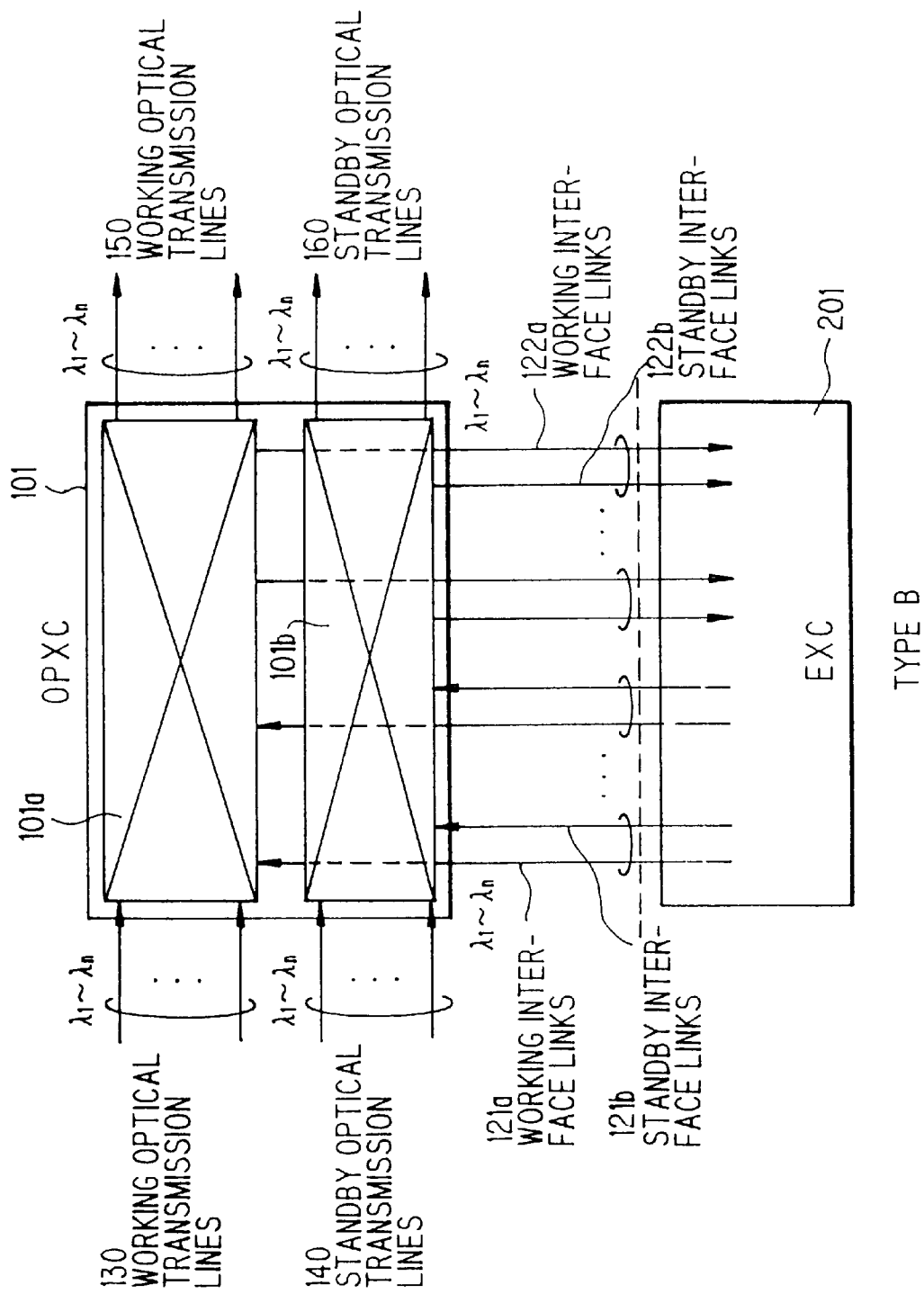
FIG. 18 is a diagram showing a second wavelength division-multiplexed optical transmission system according to the present invention.

The wavelength-division-multiplexed optical transmission system of Type B shown in FIG. 18 corresponds to the first modification of FIG. 8. Elements identical with those of the arrangement of Type A in FIG. 17 are designated by like reference characters.

In the wavelength-division-multiplexed optical transmission system of Type B, the optical path cross-connect device 101 is divided into a working system 101a and a standby system 101b, the wavelength-division-multiplexed signals of the working system are switched to the working optical path cross-connect device 101a and the wavelength-division-multiplexed signals of the standby system are switched to the working optical path cross-connect device 101b.

The optical path cross-connect device 101a routes wavelength-division-multiplexed optical signals that have entered from the working optical transmission lines 130 to the working optical transmission lines 150 or working interface links 122a wavelength by wavelength and routes wavelength-division-multiplexed optical signals that have entered from the working interface links 121a to the working optical transmission lines 150 wavelength by wavelength. The standby optical path cross-connect device 101b routes wavelength-division-multiplexed optical signals that have entered from the working optical transmission lines 140 to the standby optical transmission lines 160 or standby interface links 122b wavelength by wavelength and routes wavelength-division-multiplexed optical signals that have entered from the standby interface links 121b to the standby optical transmission lines 160 wavelength by wavelength.

In accordance with the wavelength-division-multiplexed optical transmission system of Type B, the number of elements in the optical space switch constituting the optical path cross-connect device can be reduced.

(a-3) Type C

Figure 19:
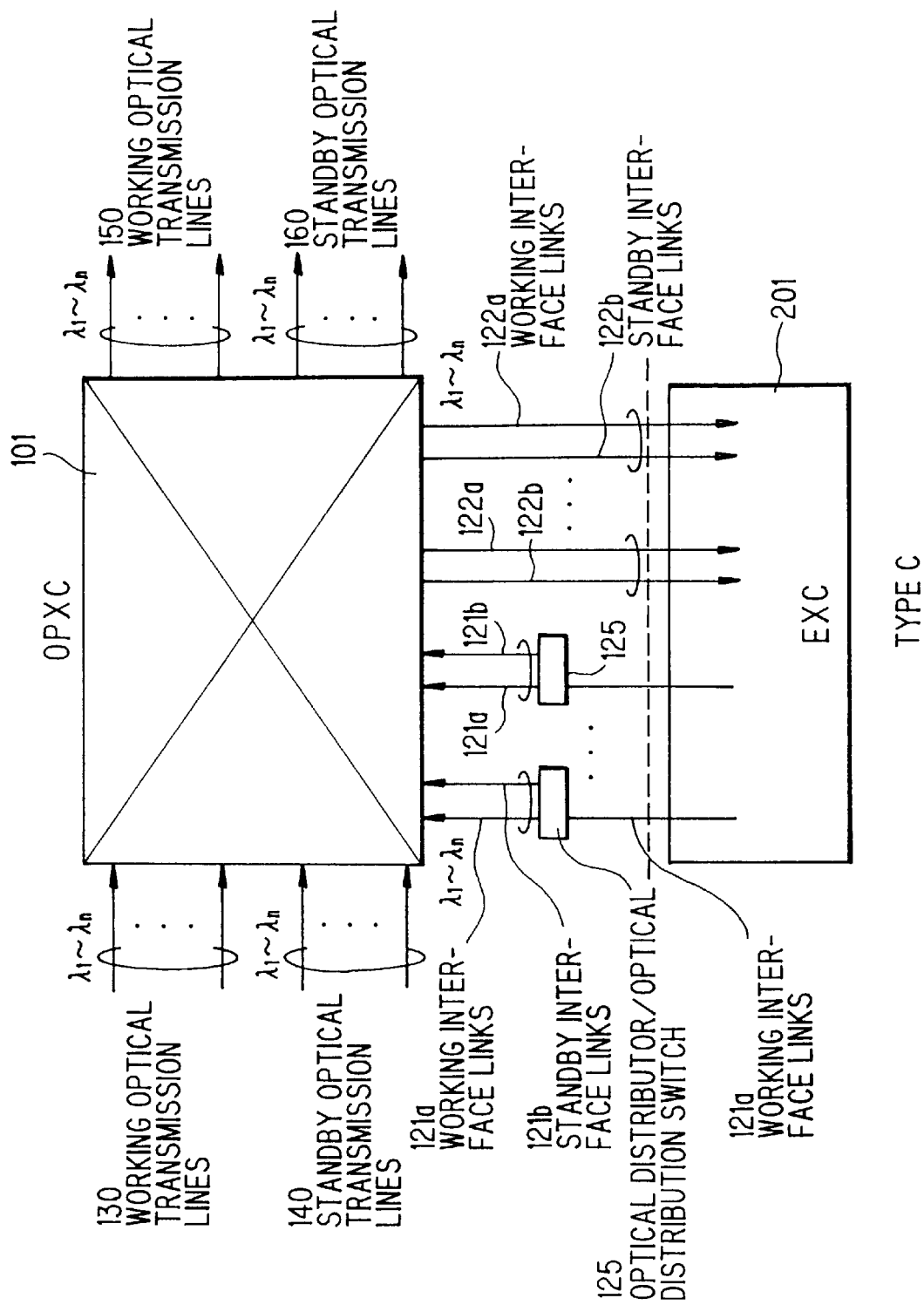
FIG. 19 is a diagram showing a third wavelength division-multiplexed optical transmission system according to the present invention.

The wavelength-division-multiplexed optical transmission system of Type C shown in FIG. 19 corresponds to the second modification of FIG. 10. Elements identical with those of the arrangement of Type A in FIG. 17 are designated by like reference characters.

In the wavelength-division-multiplexed optical transmission system of Type A of FIG. 17, the electrical cross-connect device 201 produces wavelength-divisionmultiplexed optical signals for the working and standby systems of the optical path cross-connect device 101 and distributes these signals to the working and standby interface links 121a, 121b. However, an arrangement may be adopted in which, rather than the wavelength-division-multiplexed optical signals being distributed to the working and standby systems via the electrical cross-connect device 201, the interface links 121a are provided with optical distributors or optical distribution switches, whereby wavelength-division-multiplexed optical signals are distributed to the working and standby interface links 121a, 121b. In other aspects the architecture is the same as that of Type A.

The optical path cross-connect device 101 (1) routes wavelength-division-multiplexed optical signals that have entered from the working optical transmission lines 130 to the working optical transmission lines 150 or working interface links 122a wavelength by wavelength, (2) routes wavelength-division-multiplexed optical signals that have entered from the standby optical transmission lines 140 to the standby optical transmission lines 160 or standby interface links 122b wavelength by wavelength, (3) routes wavelength-division-multiplexed optical signals that have entered from the working interface links 121a via the optical distributors 125 to the working optical transmission lines 150 wavelength by wavelength, and (4) routes wavelength-division-multiplexed optical signals that have entered from the standby interface links 121b via the optical distributors 125 to the standby optical transmission lines 160 wavelength by wavelength.

(a-4) Type D

Figure 20:
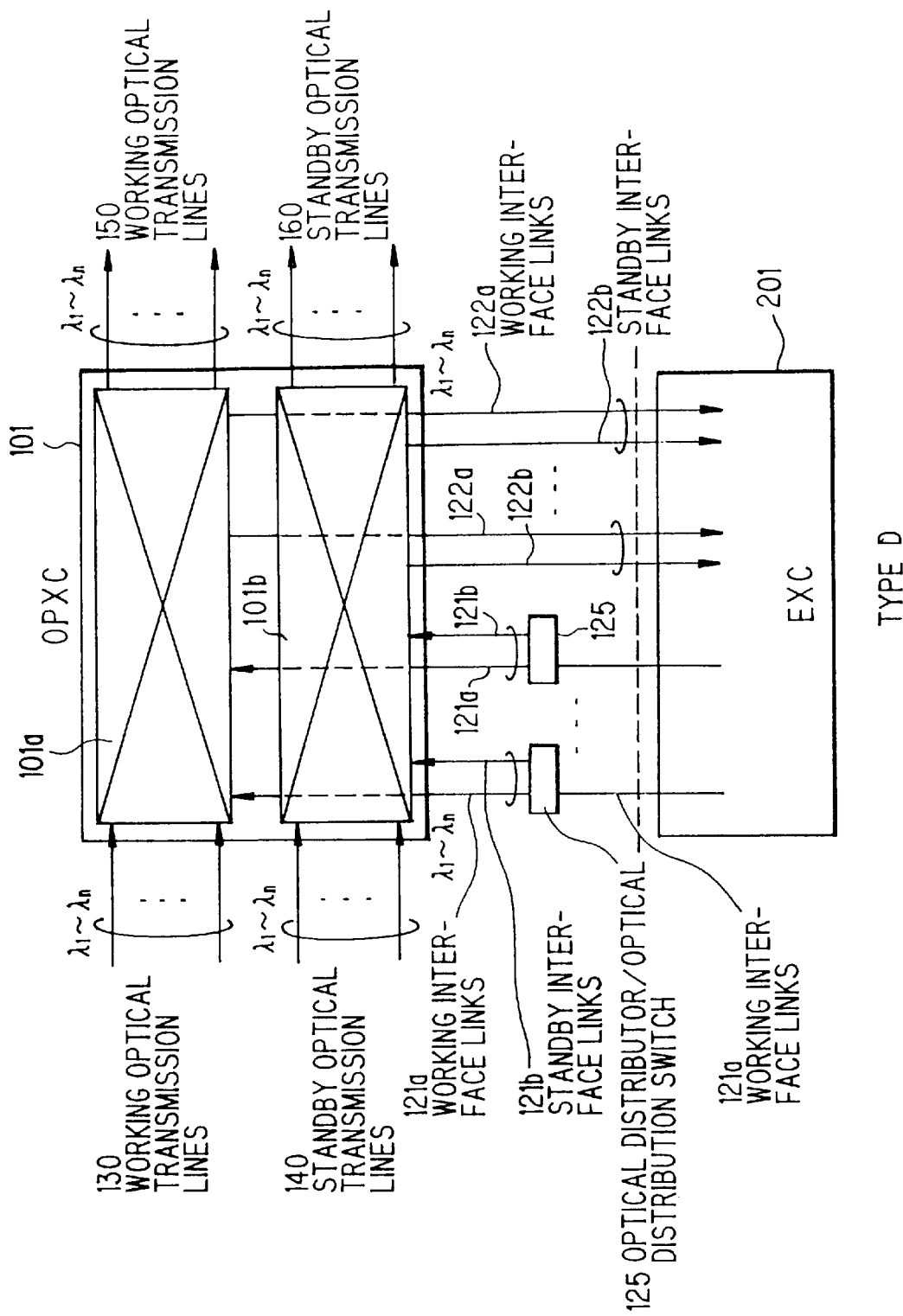
FIG. 20 is a diagram showing a fourth wavelength division-multiplexed optical transmission system according to the present invention.

The wavelength-division-multiplexed optical transmission system of Type D shown in FIG. 20 corresponds to the third modification of FIG. 13. Elements identical with those of the arrangement of FIG. 19 are designated by like reference characters.

In the wavelength-division-multiplexed optical transmission system of Type D shown in FIG. 20, the optical path cross-connect device 101 is divided into the working system 101a and the standby system 101b, the wavelength-division-multiplexed signals of the working system are switched to the working optical path cross-connect device 101a and the wavelength-division-multiplexed signals of the standby system are switched to the working optical path cross-connect device 101b.

The optical path cross-connect device 101a routes wavelength-division-multiplexed optical signals that have entered from the working optical transmission lines 130 to the working optical transmission lines 150 or working interface links 122a wavelength by wavelength and routes wavelength-division-multiplexed optical signals that have entered from the working interface links 121a via the optical distributors 125 to the working optical transmission lines 150 wavelength by wavelength. The standby optical path cross-connect device 101b routes wavelength-division-multiplexed optical signals that have entered from the standby optical transmission lines 140 to the standby optical transmission lines 160 or standby interface links 122b wavelength by wavelength and routes wavelength-division-multiplexed optical signals that have entered from the standby interface links 121b via the optical distributors 125 to the standby optical transmission lines 160 wavelength by wavelength.

In accordance with the wavelength-division-multiplexed optical transmission system of Type D, the number of elements in the optical space switch constituting the optical path cross-connect device can be reduced.

(a-5) Type E

Figure 21:
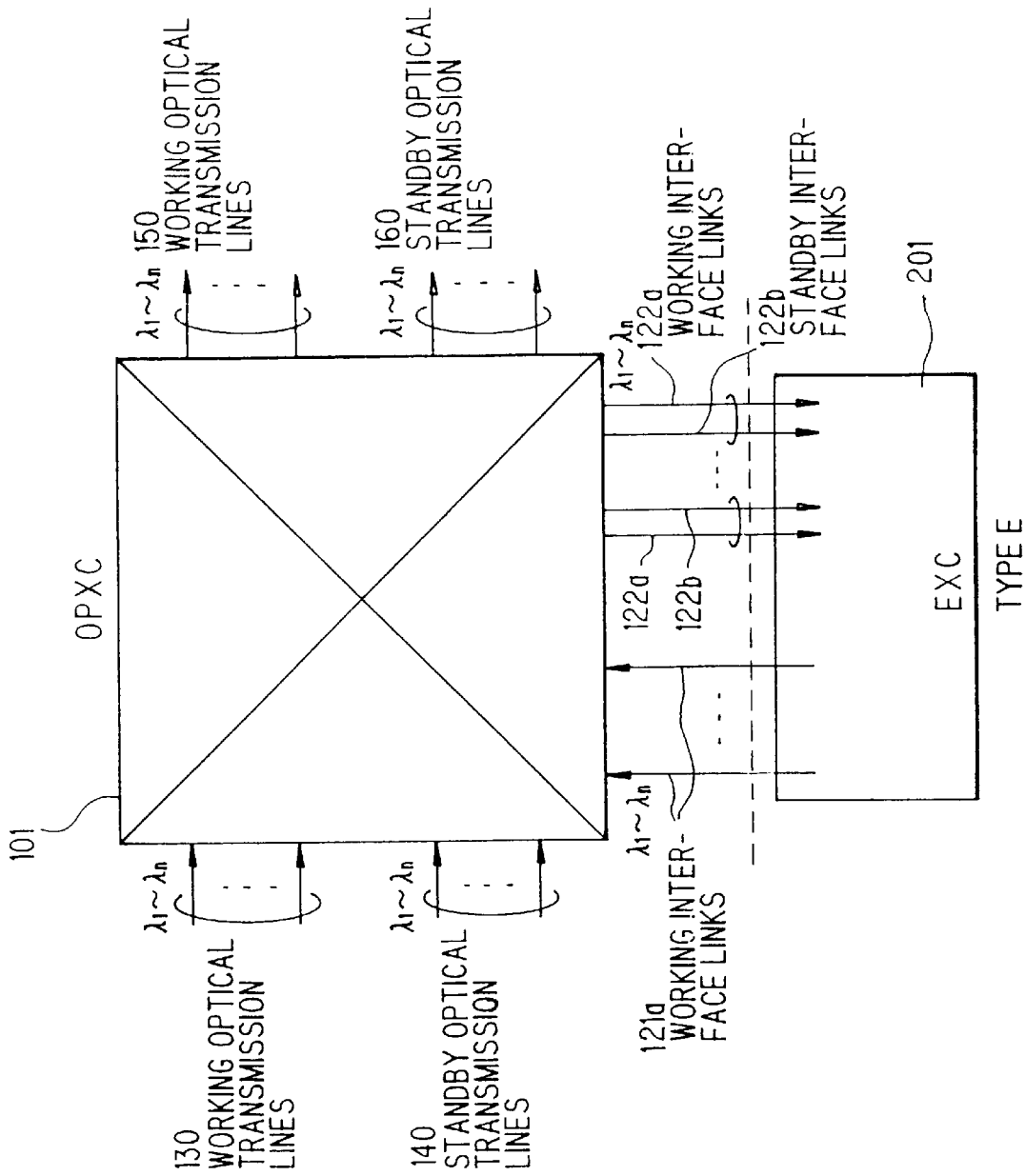
FIG. 21 is a diagram showing a fifth wavelength division-multiplexed optical transmission system according to the present invention.

The wavelength-division-multiplexed optical transmission system of Type E shown in FIG. 21 corresponds to the fourth modification of FIG. 15. Elements identical with those of the arrangement of Type A in FIG. 17 are designated by like reference characters.

In the wavelength-division-multiplexed optical transmission system of Type A, the electrical cross-connect device 201 produces wavelength-division-multiplexed optical signals for the working and standby systems of the optical path cross-connect device 101 and distributes these signals to the working and standby interface links 121a, 121b. However, an arrangement may be adopted in which, rather than the wavelength-division-multiplexed optical signals being distributed to the working and standby systems via the electrical cross-connect device 201, the optical path cross-connect device 101 is constructed by an optical space switch having a distribution function so that wavelength-division-multiplexed optical signals which have entered from the electrical cross-connect device 201 may be routed to the working and standby optical transmission lines simultaneously by means of the distributing function of this optical space switch.

The arrangement of FIG. 21 differs from that of Type A of FIG. 17 in that (1) the standby interface links 121b from the electrical cross-connect device 201 to the optical path cross-connect device 101 are deleted, and (2) the optical path cross-connect device 101 is constructed by an optical space switch having a distribution function. More specifically, the interface links which enter wavelength-division-multiplexed optical signals from the electrical cross-connect device 201 to the optical path cross-connect device 101 are solely the working interface links 121a. Interface links which enter wavelength-division-multiplexed optical signals from the optical path cross-connect device 101 to the electrical cross-connect device 201 are the pairs of working and standby interface links 122a and 122b.

The optical path cross-connect device 101 (1) routes wavelength-division-multiplexed optical signals that have entered from the working optical transmission lines 130 to the working optical transmission lines 150 or working interface links 122a wavelength by wavelength, (2) routes wavelength-division-multiplexed optical signals that have entered from the standby optical transmission lines 140 to the standby optical transmission lines 160 or standby interface links 122b wavelength by wavelength, and (3) routes wavelength-division-multiplexed optical signals that have entered from the working interface links 121a to the working optical transmission lines 150 and standby optical transmission lines 160 by the distribution function.

(b) Architecture of optical path cross-connect device

The optical path cross-connect device (OPXC) can be configured in two ways. The first is by a WP (wavelength path) scheme in which the input optical signal is not subjected to wavelength conversion. The other is by a VWP (virtual wavelength path) scheme in wavelength conversion is performed as needed.

(b-1) Optical path cross-connect device according to WP scheme

Figure 22:
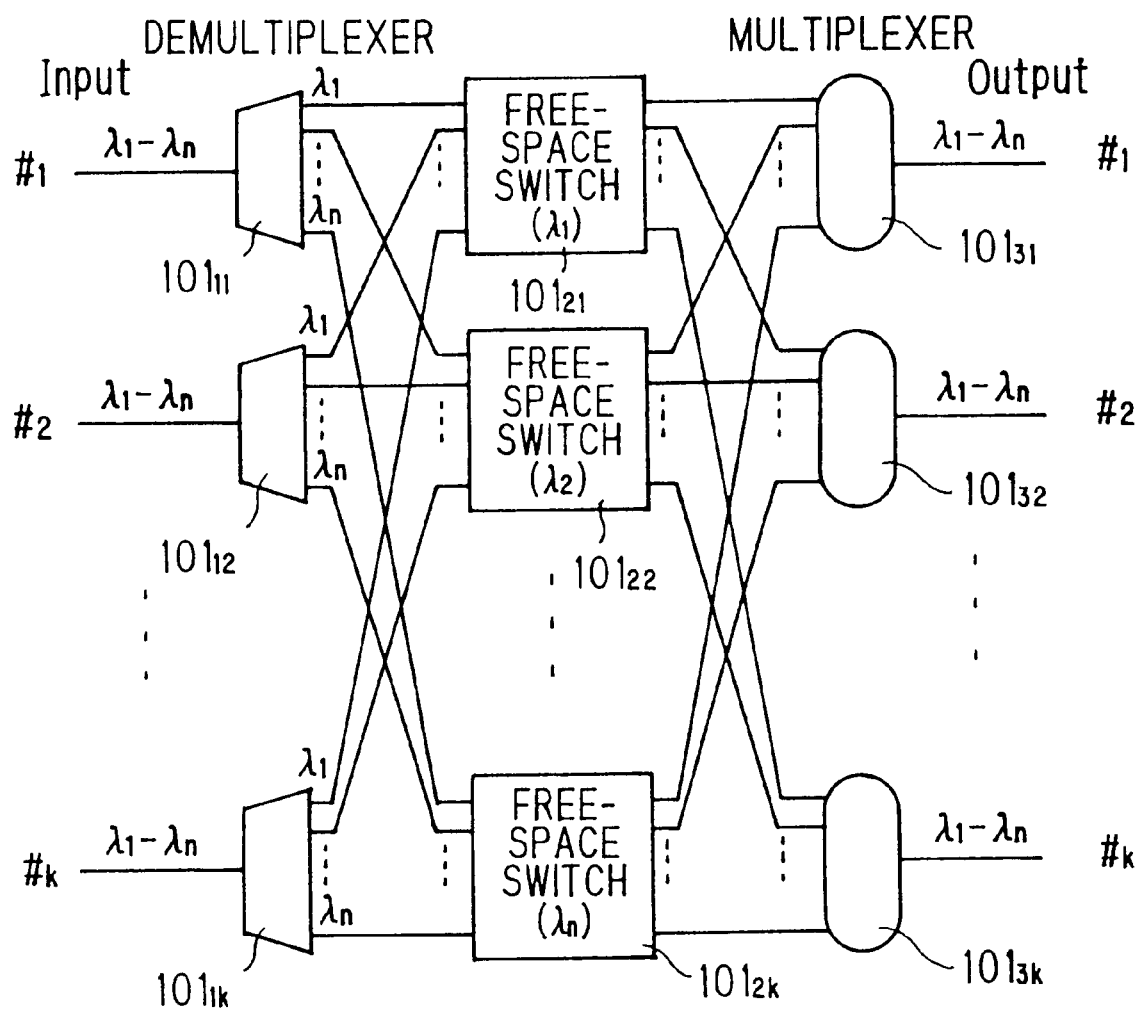
FIG. 22 is a diagram showing the architecture of an optical path cross-connect device (WP-type)

FIG. 22 is a diagram showing the architecture of the optical path cross-connect device OPXC according to the WP scheme. The optical path cross-connect device includes demultiplexers $101_{11}$~$101_{1k}$ for demultiplexing wavelength-division-multiplexed optical signals, which enter from respective ones of a plurality of optical transmission lines #1~#k, to optical signals of individual wavelengths $\lambda_1$~$\lambda_n$, optical space switches $101_{21}$~$101_{2k}$ for switching the demultiplexed signals of wavelengths $\lambda_1$~$\lambda_n$ to prescribed outgoing lines, and multiplexers $101_{31}$~$101_{3k}$ for multiplexing optical signals of wavelengths $\lambda_1$~$\lambda_n$ directed to the same outgoing line and sending the multiplexed optical signals to optical transmission lines $\#_1$~$\#_k$.

Optical signals of wavelength $\lambda_1$ enter the optical space switch $101_{21}$ from respective ones of the demultiplexers $101_{11}$~$101_{1k}$ and these optical signals are switched by the optical space switch $101_{21}$ so as to enter each of the multiplexers. Further, optical signals of wavelength $\lambda_2$ enter the optical space switch $101_{22}$ from respective ones of the demultiplexers $101_{11}$ $101_{1k}$ and these optical signals are switched by the optical space switch $101_{22}$ so as to enter each of the multiplexers. The same operation holds for the other optical switches as well. The multiplexer $101_{31}$ multiplexes optical signals of wavelengths A1 which have entered from the free-spaced optical switches $101_{21}$~$101_{2k}$, and sends the multiplexed optical signals to the optical transmission line #1, and the multiplexer $101_{32}$ multiplexes optical signals of wavelengths $\lambda_1$~$\lambda_n$, which have entered from the free-spaced optical switches $101_{21}$~$101_{2k}$, and sends the multiplexed optical signals to the optical transmission line #2. Similarly, the multiplexer $101_{3k}$ multiplexes optical signals of wavelengths $\lambda_1$~$\lambda_n$, which have entered from the free-spaced optical switches $101_{21}$~$101_{2k}$, and sends the multiplexed optical signals to the optical transmission line #k.

(b-2) Optical path cross-connect device according to VWP scheme

Figure 23:
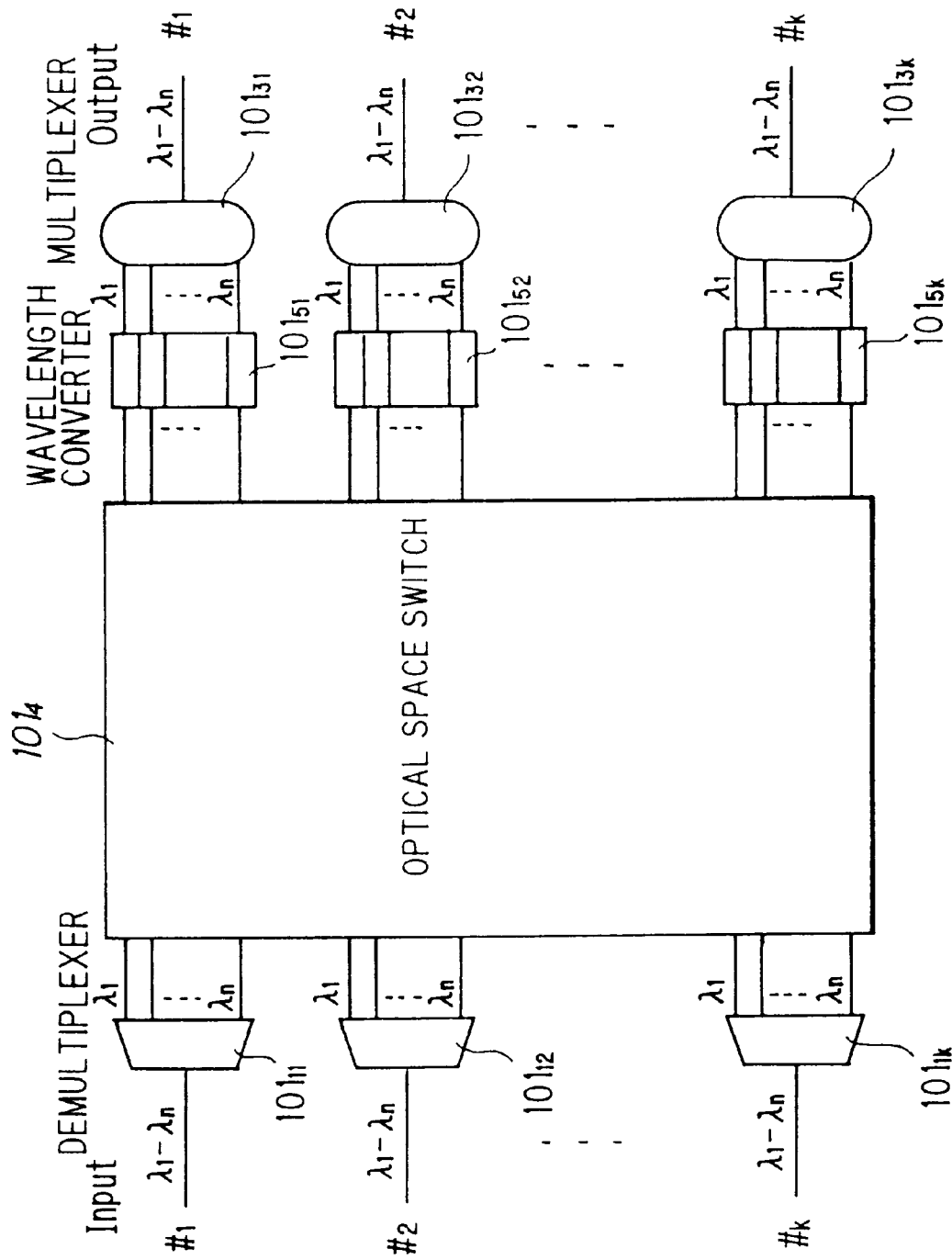
FIG. 23 is a diagram showing the architecture of an optical path cross-connect device (VWP-type)
Figure 24A:
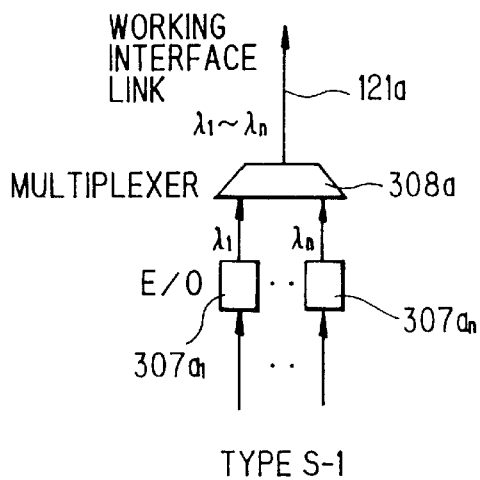
FIGS. 24A, 24B, 24C and 24D are diagrams showing the architecture on the transmitting side of an electrical cross-connect device.
Figure 24B:
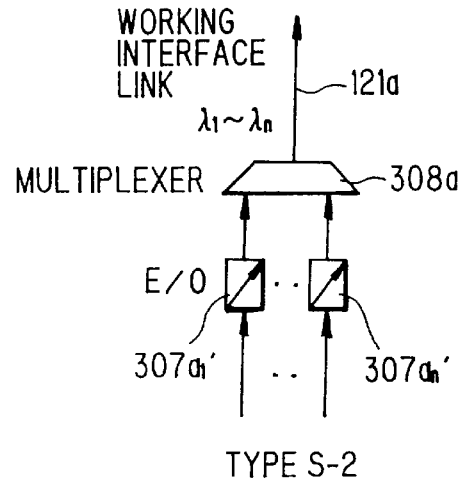
Figure 24C:
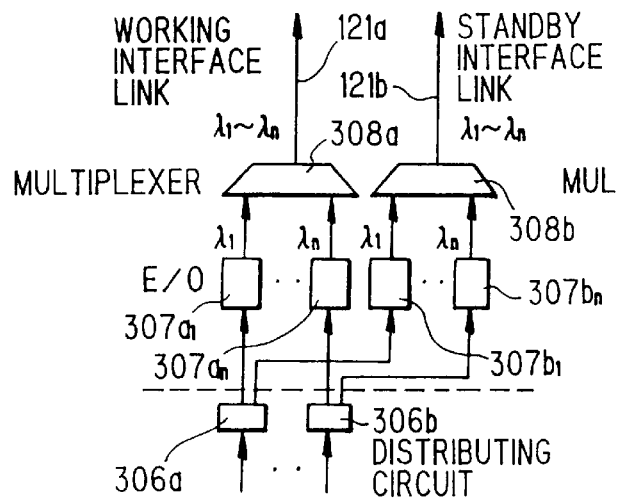
Figure 24D:
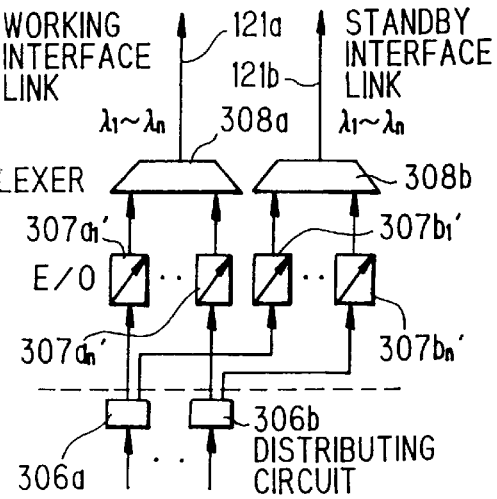

FIG. 23 is a diagram showing the architecture of the optical path cross-connect device OPXC according to the VWP scheme. The optical path cross-connect device includes the demultiplexers $101_{11}$~$101_{1k}$ for demultiplexing wavelength-division-multiplexed optical signals, which enter from respective ones of the plurality of optical transmission lines #1~#k, to optical signals of individual wavelengths $\lambda_1$~$\lambda_n$, an optical space switch $101_4$ for switching the signals of wavelengths $\lambda_1$~$\lambda_n$, which have been demultiplexed by each of the demultiplexers, to prescribed outgoing lines, wavelength converters $101_{51}$~$101_{5k}$ for converting the wavelengths of the switched optical signals to prescribed wavelengths, and multiplexers $101_{31}$~$101_{3k}$ for multiplexing optical signals of wavelengths $\lambda_1$~$\lambda_n$ directed to the same outgoing line and sending the multiplexed optical signals to optical transmission lines #1~#k.

The 1:1 optical space switch and the 1:N optical space switch having the distribution function, which are illustrated in FIGS. 4 and 5, respectively, can be used as the VW- and VWP-type optical space switches. In this case, the wavelength-division-multiplexed optical transmission systems of Types A through D (FIGS. 17 through 20) are capable of using either of these optical space switches. In the wavelength-division-multiplexed optical transmission system of Type E, however, the optical path cross-connect device 101 is required to have the distribution function. Accordingly, it is necessary to use the 1:N optical space switch having the distribution function.

(c) Architecture of electrical cross-connect device on transmitting side

The transmitting side of the electrical cross-connect device 201 is additionally provided with a function for processing wavelength-division-multiplexed optical signals.

FIGS. 24A, 24B, 24C and 24D are diagrams showing the architecture on the transmitting side of the electrical cross-connect device 201. FIGS. 24A, 24B, 24C and 24D show four transmission types S-1 through S-4. First and second transmission types S-1 and S-2 are applicable to the wavelength-division-multiplexed optical transmission systems of types C through E (FIGS. 19 through 21, respectively). Third and fourth transmission types S-3 and S-4 are applicable to the wavelength-division-multiplexed optical transmission systems of types A and B (FIGS. 17 and 18, respectively).

(c-1) First transmission type S-1

The first transmission type S-1 has fixed-output-wavelength electro-optic converters (E/O converters) $307a_1$~$307a_n$, for converting individual electric signals outputted by an ATM switch (not shown) and directed to the optical path cross-connect device 101 to wavelengths $\lambda_1$~$\lambda_n$, respectively, and an optical multiplexer 308a for multiplexing the optical signals of wavelengths $\lambda_1$~$\lambda_n$ outputted by the respective E/O converters and sending the multiplexed signals to the working interface link 121a.

The first transmission type S-1 cannot alter the wavelengths to the optical path cross-connect device 101 at will. Accordingly, the first transmission type S-1 is applicable to wavelength-division-multiplexed optical transmission systems of types C through E, which are wavelength-division-multiplexed optical transmission systems wherein the optical path cross-connect device OPXC is constituted by an optical space switch according to the VWP scheme.

(c-2) Second transmission type S-2

The second transmission type S-2 has variable output-wavelength electro-optic converters (E/O converters) $307a_1'$~$307a_n'$ for converting individual electric signals outputted by an ATM switch (not shown) and directed to the optical path cross-connect device 101 to wavelengths $\lambda_1$~$\lambda_n$, respectively, and an optical multiplexer 308a for multiplexing the optical signals of wavelengths $\lambda_1$~$\lambda_n$ outputted by the respective E/O converters and sending the multiplexed signals to the working interface link 121a.

The second transmission type S-2 is capable of altering the wavelengths to the optical path cross-connect device 101 at will. Accordingly, the second transmission type S-2 is applicable to wavelength-division-multiplexed optical transmission systems of types C through E, which are wavelength-division-multiplexed optical transmission systems wherein the optical path cross-connect device OPXC is constituted by an optical space switch according to the WP scheme.

(c-3) First transmission type S-3

The third transmission type S-3 has distributing circuits 306a, 306b for distributing individual electric signals outputted by an ATM switch (not shown) and directed to the optical path cross-connect device 101 to the working and standby systems, fixed-output-wavelength electro-optic converters (E/O converters) $307a_1$~$307a_n$ for converting individual electric signals of the working system to wavelengths $\lambda_1$~$\lambda_n$, respectively, fixed-output-wavelength electro-optic converters (E/O converters) $307b_1$~$307b_n$ for converting individual electric signals of the standby system to wavelengths $\lambda_1$~$\lambda_n$, respectively, an optical multiplexer 308a for multiplexing the optical signals of wavelengths $\lambda_1$~$\lambda_n$ outputted by the respective E/O converters of the working system and sending the multiplexed signals to the working interface link 121a, and an optical multiplexer 308b for multiplexing the optical signals of wavelengths $\lambda_1$~$\lambda_n$ outputted by the respective E/O converters of the standby system and sending the multiplexed signals to the working interface link 121b.

The third transmission type S-3 cannot alter the wavelengths to the optical path cross-connect device 101 at will.

Accordingly, the first transmission type S-3 is applicable to wavelength-division-multiplexed optical transmission systems of types A and B, which are wavelength-division-multiplexed optical transmission systems wherein the optical path cross-connect device OPXC is constituted by an optical space switch according to the VWP scheme.

(c-4) Fourth transmission type S-4

The fourth transmission type S-4 has distributing circuits $306a$, $306b$ for distributing individual electric signals outputted by an ATM switch (not shown) and directed to the optical path cross-connect device 101 to the working and standby systems, variable output-wavelength electro-optic converters (E/O converters) $307a_1'$~$307a_n'$ for converting individual electric signals of the working system to wavelengths $\lambda_1$~$\lambda_n$, respectively, variable output-wavelength electro-optic converters (E/O converters) $307b_1'$~$307b_n'$ for converting individual electric signals of the standby system to wavelengths $\lambda_1$~$\lambda_n$, respectively, an optical multiplexer $308a$ for multiplexing the optical signals of wavelengths $\lambda_1$~$\lambda_n$ outputted by the respective E/O converters of the working system and sending the multiplexed signals to the working interface link $121a$, and an optical multiplexer $308b$ for multiplexing the optical signals of wavelengths $\lambda_1$~$\lambda_n$ outputted by the respective E/O converters of the standby system and sending the multiplexed signals to the working interface link $121b$.

The fourth transmission type S-4 is capable of altering the wavelengths to the optical path cross-connect device 101 at will. Accordingly, the first transmission type S-4 is applicable to wavelength-division-multiplexed optical transmission systems of types A and B, which are wavelength-division-multiplexed optical transmission systems wherein the optical path cross-connect device OPXC is constituted by an optical space switch according to the WP scheme.

It should be noted that all of the transmission types are disposed between an electrical cross-connect device and an optical path cross-connect device with a plurality of these links.

(d) Architecture of electrical cross-connect device on receiving side

The receiving side of the electrical cross-connect device 201 is additionally provided with a function for processing wavelength-division-multiplexed optical signals.

Figure 25B:
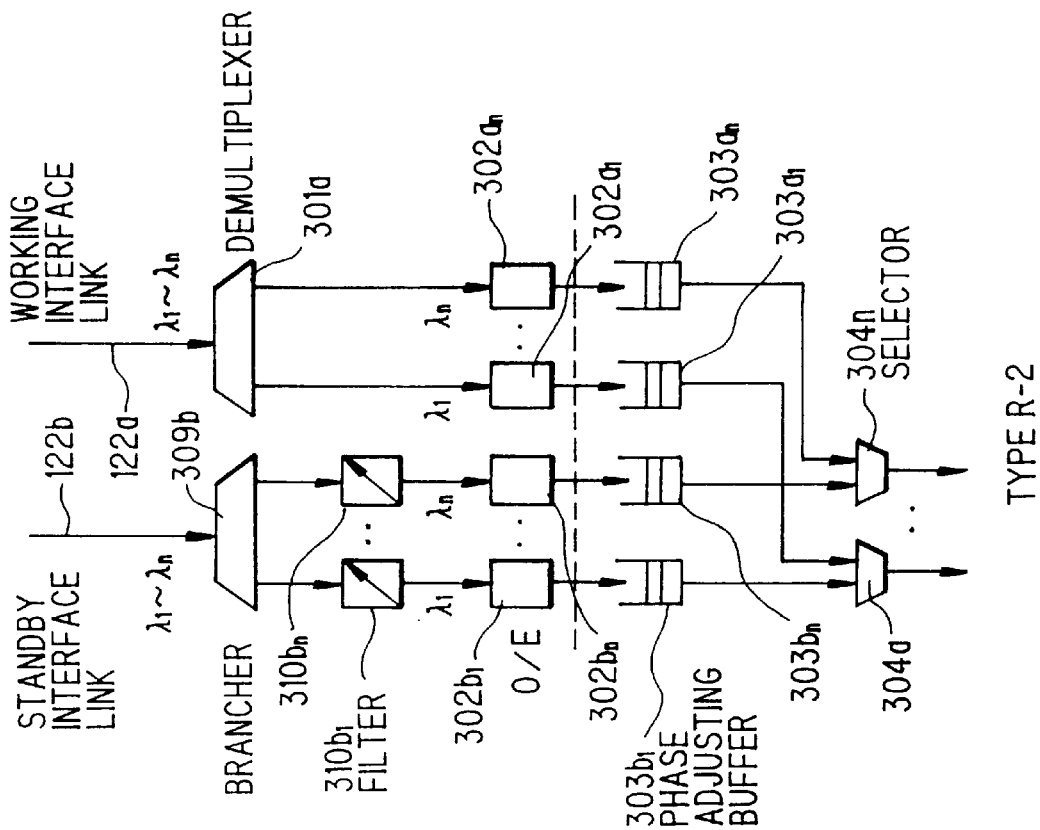
FIGS. 25A and 25B are diagrams showing the architecture on the receiving side of an electrical cross-connect device.
Figure 25A:
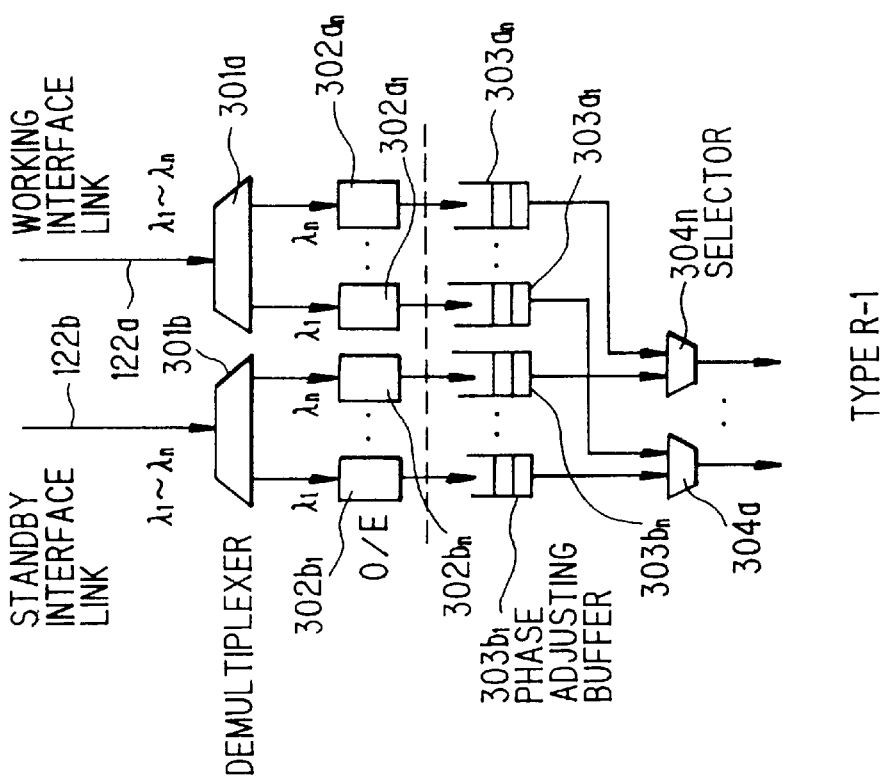

FIGS. 25A and 25B are diagrams showing the architecture on the receiving side of the electrical cross-connect device 201. FIGS. 25A and 25B show two reception types R1 and R2.

(d-1) First reception type R-1

The first reception type R-1 has demultiplexers $301a$, $301b$ for demultiplexing wavelength-division-multiplexed optical signals, which have been sent from the optical path cross-connect device 101 via the working and standby interface links $122a$, $122b$, to optical signals of individual wavelengths $\lambda_1$~$\lambda_n$, a plurality of opto-electric converters (O/E converters) $302a_1$~$302a_n$, $302b_1$~$302b_n$ for converting the optical signals of the working and standby systems to electric signals, phase adjusting buffers $303a_1$~$303a_n$, $303b_1$~$303b_n$, which are connected to respective ones of the opto-electric converter outputs, for performing a phase adjustment electrically in such a manner that the signal phases of the working and standby systems will coincide, and selectors $304a_1$~$304a_n$ for switching the optical signals of the working and standby systems and entering the optical signals into an ATM switch, not shown.

The first reception type R-1 is applicable to the wavelength-division-multiplexed optical transmission systems of all of the types A through E.

(d-2) Second reception type R-2

The second reception type R-2 has the demultiplexer $301a$ for demultiplexing wavelength-division-multiplexed optical signals, which have entered from the optical path cross-connect device 101 via the working interface link $122a$, to optical signals of individual wavelengths $\lambda_1$~$\lambda_n$, a brancher $309b$ for branching wavelength-division-multiplexed optical signals, which have entered from the optical path cross-connect device 101 via the standby interface link $122b$, variable-wavelength filters $310b_1$~$310b_n$ for extracting optical signals of prescribed wavelengths $\lambda_1$~$\lambda_n$ from the wavelength-division-multiplexed optical signals branched from the brancher $309b$, the plurality of opto-electric converters (O/E converters) $302a_1$~$302a_n$, $302b_1$~$302b_n$ for converting the optical signals of the working and standby systems to electric signals, the phase adjusting buffers $303a_1$~$303a_n$, $303b_1$~$303b_n$, which are connected to respective ones of the opto-electric converter outputs, for performing a phase adjustment electrically in such a manner that the signal phases of the working and standby systems will coincide, and the selectors $304a_1$~$304a_n$ for switching the optical signals of the working and standby systems and entering the optical signals into an ATM switch, not shown.

Basically, the first reception type R-1 is applicable as the arrangement on the receiving side of the electrical cross-connect device 201 in the wavelength-division-multiplexed optical transmission systems (FIGS. 17~21) of all types A~E. However, in a case where the fourth transmission type S-4 is used on the transmitting side, there are instances where the wavelengths of the optical signals which the optical path cross-connect device 101 sends to the working and standby systems differ (i.e., instances where, when it is attempted to make a transmission to the standby system at a wavelength the same as that at which a transmission was made to the working system, this wavelength is already being used in the standby system).

In such instances, blocking can be prevented by using the second transmission type R-2. In other words, the variable-wavelength filters $310b_1$~$310b_n$, extract and output optical signals of prescribed wavelengths from the respective wavelength-division-multiplexed optical signals of the standby system. As a result, the optical signals of the standby system are photoelectrically converted correctly by the opto-electric converters $302b_1$~$302b_n$ and are not blocked.

(e) Configurations in which transmission types and reception types can be applied FIG. 26 is a table for describing the relationship among the types A~E of the optical path cross-connect device OPXC, optical paths (WP-type/VWP-type) and the transmission types S-1~S-4 and reception types R-1~R-2 in the electrical cross-connect device EXC.

The types of transmitting and receiving sections applied to the electrical cross-connect device EXC differ depending upon the difference in the types A~E of the optical path cross-connect device OPXC and the difference in the kind of optical path (WP or VWP).

(e-1) Configurations in which transmission types are applicable

In the wavelength-division-multiplexed optical systems of types C, D and E (FIGS. 19, 20 and 21, respectively), it is unnecessary for wavelength-division-multiplexed optical signals to be sent from the electrical cross-connect device EXC to the standby system. Accordingly, transmission type S-1 or S-2 is used as the transmitting section of the electrical cross-connect device EXC. In this case, the wavelength at which an optical signal is transmitted depends upon the status of the network at the particular time. Therefore, when use is made of the WP-based optical path cross-connect device OPXC, which does not perform a wavelength conversion, it is required that the E/O converter of the transmitting section have a wavelength converting function. This means that the transmission type S-2 is used. On the other hand, when use is made of the VWP-based optical path cross-connect device OPXC, which performs the wavelength conversion, it is not required that the E/O converter of the transmitting section have a wavelength converting function; hence, the transmission type S-1 is used.

With the wavelength-division-multiplexed optical transmission systems of types A and B (FIGS. 17 and 18, respectively), it is necessary for the wavelength-division-multiplexed optical signals to be sent from the electrical cross-connect device EXC to both the working and standby systems. Accordingly, transmission type S-3 or S-4 is used as the transmitting section of the electrical cross-connect device EXC. Further, for the reasons set forth above, the transmission type S-4 having the wavelength converting function is used in the E/O converter of the transmitting section in the case of the WP scheme, and the transmission type S-3 not having the wavelength converting function is used in the E/O converter of the transmitting section in the case of the VWP scheme.

(e-2) Configurations in which reception types are applicable Basically, the receiving section applied to the electrical cross-connect device EXC in the wavelength-division-multiplexed optical transmission systems of types A~E may be the reception type R-1. When the transmission type S-4 is used in the transmitting section, however, there are cases where the wavelengths of the optical signals sent to the working and standby systems differ, as mentioned above. In such cases blocking can be prevented by using the reception type R-2.

(f) Configuration of wavelength-division-multiplexed optical transmission system A total of 12 types of configurations of the wavelength-division-multiplexed optical system are conceivable from combinations of the transmission and reception types, as will be appreciated from the table of FIG. 26.

The first wavelength-division-multiplexed optical transmission system is in accordance with the VWP scheme of type A (see FIG. 17), and this is a case in which the transmission type is S-3 and the reception type is R-1.

The second wavelength-division-multiplexed optical transmission system is in accordance with the WP scheme of type A, and this is a case in which the transmission type is S-4 and the reception type is R-1.

The third wavelength-division-multiplexed optical transmission system is in accordance with the WP scheme of type A, and this is a case in which the transmission type is S-4 and the reception type is R-2.

The fourth wavelength-division-multiplexed optical transmission system is in accordance with the VWP scheme of type B (see FIG. 18), and this is a case in which the transmission type is S-3 and the reception type is R-1.

The fifth wavelength-division-multiplexed optical transmission system is in accordance with the WP scheme of type B, and this is a case in which the transmission type is S-4 and the reception type is R-1.

The sixth wavelength-division-multiplexed optical transmission system is in accordance with the WP scheme of type B, and this is a case in which the transmission type is S-4 and the reception type is R-2.

The seventh wavelength-division-multiplexed optical transmission system is in accordance with the VWP scheme of type C (see FIG. 19), and this is a case in which the transmission type is S-1 and the reception type is R-1.

The eighth wavelength-division-multiplexed optical transmission system is in accordance with the WP scheme of type C, and this is a case in which the transmission type is S-2 and the reception type is R-1.

The ninth wavelength-division-multiplexed optical transmission system is in accordance with the VWP scheme of type D (see FIG. 20), and this is a case in which the transmission type is S-1 and the reception type is R-1.

The tenth wavelength-division-multiplexed optical transmission system is in accordance with the WP scheme of type D, and this is a case in which the transmission type is S-1 and the reception type is R-1.

The 11th wavelength-division-multiplexed optical transmission system is in accordance with the VWP scheme of type E (see FIG. 21), and this is a case in which the transmission type is S-1 and the reception type is R-1.

The 12th wavelength-division-multiplexed optical transmission system is in accordance with the WP scheme of type E, and this is a case in which the transmission type is S-2 and the reception type is R-1.

(f-1) Operation of first wavelength-division-multiplexed optical system

Figure 27:
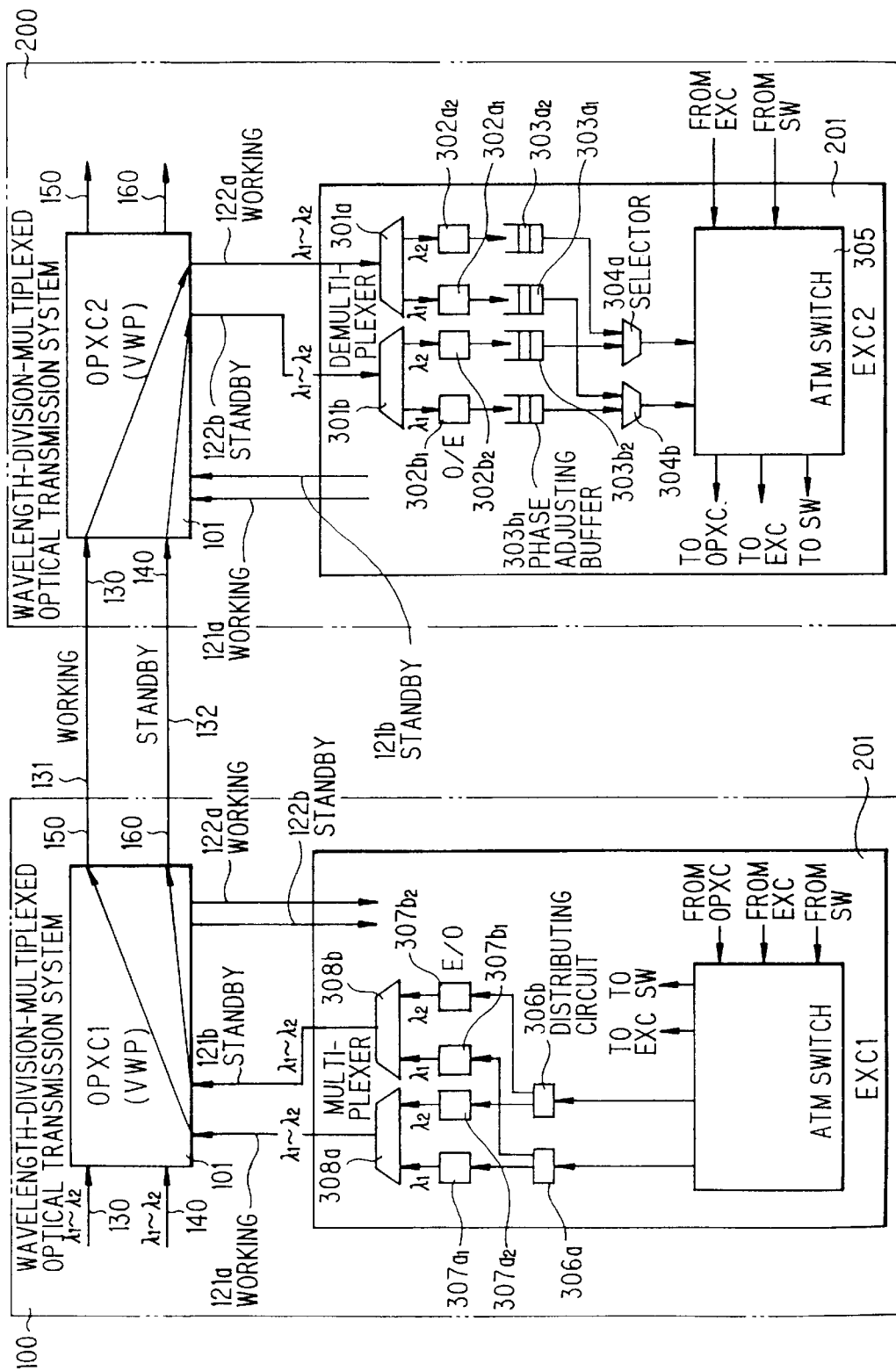
FIG. 27 is a diagram for describing the operation of a first wavelength-division-multiplexed optical transmission system.

FIG. 27 is a diagram for describing the operation of the first wavelength-division-multiplexed optical transmission system. Numerals 100, 200 denote the wavelength-division multiplexing optical transmission systems, each having the type A (FIG. 17) architecture of the VWP scheme as the optical path cross-connect device OPXC and the transmission type S-3 and reception type R-1 as the electrical cross-connect device EXC.

The wavelength-division multiplexing optical transmission systems 100, 200 each have the optical path cross-connect device 101 (OPXC1, OPXC2) and electrical cross-connect device 201 (EXC1, EXC2) and are interconnected by the working and standby wavelength-division-multiplexed optical transmission lines 131, 132.

Each of the optical path cross-connect devices 101 (OPXC1, OPXC2) has the VWP architecture shown in FIG. 23 and accommodates the plurality of working optical transmission lines 130, 150 for wavelength-division-multiplexed optical signal input/output, the plurality of input and output standby optical transmission lines 140, 160 for wavelength-division-multiplexed optical signals, the plurality of working interface links 121*a*, 122*a* provided between the optical path cross-connect device and the electrical cross-connect device 201 for wavelength-division-multiplexed optical signal input/output, and the plurality of standby interface links 121*b*, 122*b* provided between the optical path cross-connect device and the electrical cross-connect device 201 for wavelength-division-multiplexed optical signal input/output.

The electrical cross-connect device 201 has the demultiplexers 301*a*, 301*b* for demultiplexing wavelength-division-multiplexed optical signals $\lambda_1 \sim \lambda_n$ (n=2 in FIG. 27), which have entered from the working and standby interface links 122*a*, 122*b*, to optical signals of individual wavelengths k1, X2, the opto-electric converters 302$a_1$~302$a_2$, 302$b_1$~302$b_2$ for converting the wavelength signals to electric signals, wherein the demultiplexers 301*a*, 301*b* and opto-electric converters 302$a_1$~302$a_2$, 302$b_1$~302$b_2$ are provided on the receiving sides of the working and standby systems, respectively, the phase adjusting buffers $303a_1$~$303a_2$, $303b_1$~$303b_2$ for performing a phase adjustment electrically in such a manner that the signal phases of the working and standby systems will coincide, selectors 304a, 304b for switching the optical signals of the working and standby systems outputted by the optoelectric converters of the working and standby systems, an ATM switch 305 for routing an ATM cell, which enters from the optical path cross-connect device (OPXC), from another electrical cross-connect device (EXC) and from a switch (SW), to a prescribed outgoing line, the distributing circuits 306a, 306b for distributing electric signals, which are to be sent to the optical path cross-connect device, to the working and standby systems, the fixed-output-wavelength electro-optic converters $307a_1$~$307a_2$, $307b_1$~$307b_2$ for converting the distributed electric signals of the working and standby systems to optical signals of wavelengths $\lambda_1$~$\lambda_2$ respectively, and the optical multiplexers 308a, 308b for multiplexing the optical signals outputted by the working electro-optic converters and the optical signals outputted by the standby electro-optic converters, respectively, and sending the multiplexed signals to the working and standby interface links 121a, 121b, respectively.

It should be noted that the electrical cross-connect devices EXC1, EXC2 are identically constructed but only the architecture on the transmitting side of the electrical cross-connect device EXC1 is shown and only the architecture on the receiving side of the electrical cross-connect device EXC2 is shown.

The optical path cross-connect device 101 (1) routes wavelength-division-multiplexed optical signals that have entered from the working optical transmission lines 130 to the working optical transmission lines 150 or working interface links 122a wavelength by wavelength, (2) routes wavelength-division-multiplexed optical signals that have entered from the standby optical transmission lines 140 to the standby optical transmission lines 160 or standby interface links 122b wavelength by wavelength, (3) routes wavelength-division-multiplexed optical signals that have entered from the working interface links 121a to the working optical transmission lines 150 wavelength by wavelength, and (4) routes wavelength-division-multiplexed optical signals that have entered from the standby interface links 121b to the standby optical transmission lines 160 wavelength by wavelength. On the basis of a switching command, the electrical cross-connect device 201 switches the working and standby transmission lines by the selectors 304a, 304b without momentary disconnect. The optical path cross-connect device 101 executes wavelength conversion as necessary.

By way of example, in a case where optical signals are transmitted from the electrical cross-connect device (EXC1) of the first optical transmission system 100 to the electrical cross-connect device (EXC2) of the second optical transmission system 200, the electrical cross-connect device (EXC1) distributes the wavelength-division-multiplexed optical signals of the working/standby systems to the working/standby interface links 121a, 121b, the optical path cross-connect device OPXC1 routes the optical signals, which have entered from the working interface links 121a, to the working optical transmission lines 131 and routes the optical signals, which have entered from the standby interface links 121b, to the standby optical transmission lines 132. The optical path cross-connect device OPXC2 of the second optical transmission system 200 routes the optical signals, which have entered from the working optical transmission lines 131, to the working interface links 122a and routes the optical signals, which have entered from the standby optical transmission lines 132, to the standby interface links 122b, thereby entering these optical signals into the electrical cross-connect device EXC2. The selectors 304a, 304b of the electrical cross-connect device EXC2 select the wavelength-division-multiplexed signals that have entered from the working interface links 122a and route the signals to the desired outgoing lines by way of the ATM switch 305.

If signals flowing through the working optical transmission lines 131 are switched to signals in the standby system and signals flowing through the standby optical transmission lines 132 are switched to signals in the working system under these conditions, then, on the basis of the switching command, the selectors 304a, 304b of the electrical cross-connect device EXC2 of the second optical transmission system 200 select the wavelength-division-multiplexed signals that have entered from the standby interface links 122b and route these signals to a desired outgoing line by way of the ATM switch 305. In this case, a phase adjustment is carried out in the phase adjusting buffers $303a_1$~$303a_2$, $303b_2$~$303b_2$ in such a manner that the signal phases in the working and standby systems coincide at all times. As a result, it is possible to switch between the working and standby systems without momentary disconnect and without loss of cells.

FIG. 27 is for a case in which the electrical cross-connect device EXC1 of one of the adjacent optical transmission systems 100 and 200 transmits signals to the electrical cross-connect device EXC2 of the other optical transmission system. However, even if the arrangement is one in which another optical transmission system exists between the first and second optical transmission systems 100 and 200, the phase adjusting buffers $303a_1$~$303a_2$, $303b_1$~$303b_2$ of the electrical cross-connect device on the signal receiving side always perform the phase adjustment in such a manner that the signal phases of the working and standby systems will coincide. Accordingly, regardless of the optical transmission lines switched between working and standby, the working/standby changeover can be performed in the manner described above without momentary disconnect and loss of cells.

Thus, the optical path cross-connect device 101 is not required to perform switching without momentary disconnect but need only establish working and standby paths in such a manner that the electrical cross-connect device 201 can perform switching without momentary disconnect. As a result, it is unnecessary for the optical path cross-connect device to have an optical phase adjusting function and to perform a high-speed switching operation.

Figure 28:
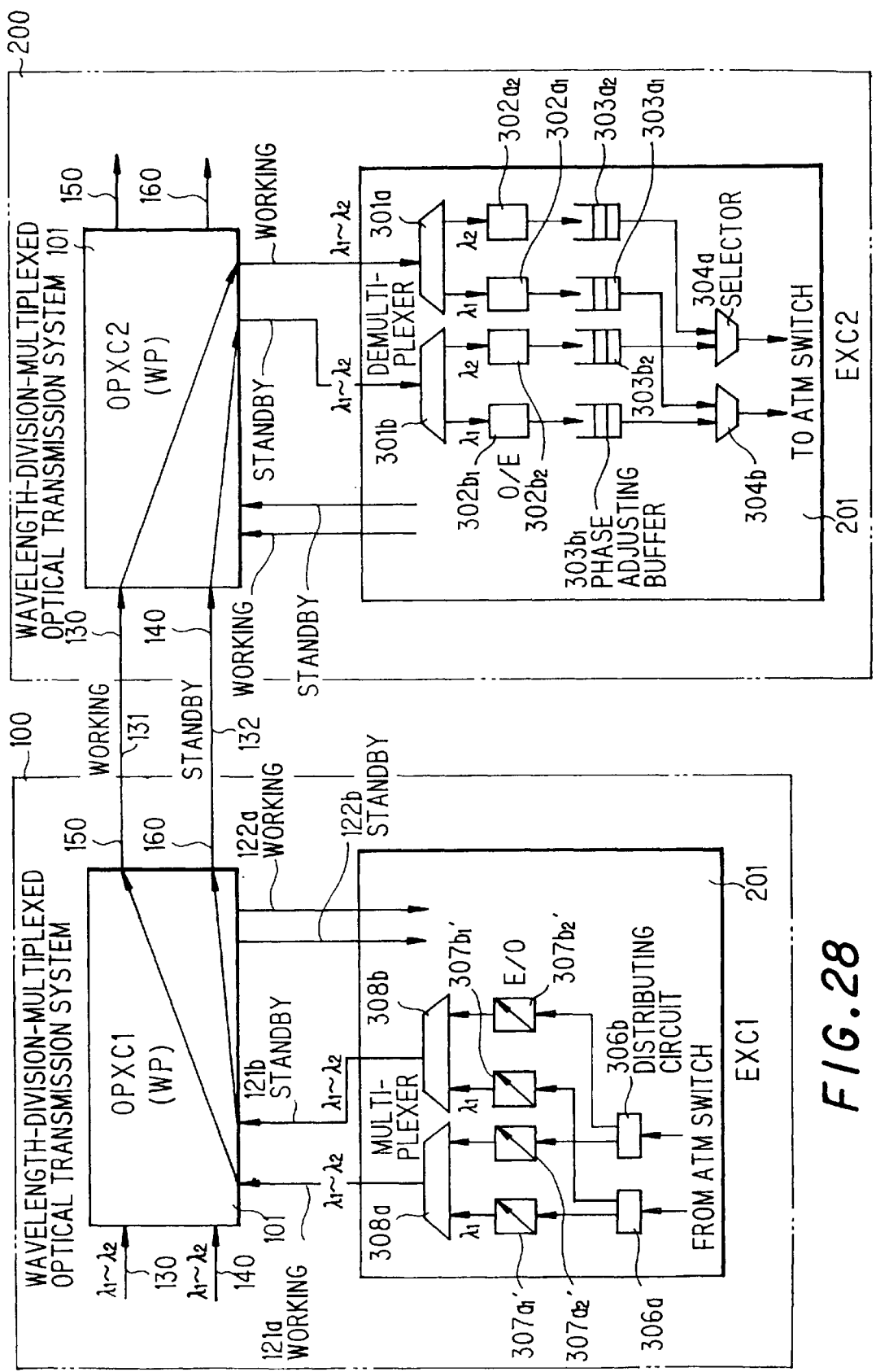
FIG. 28 is a diagram for describing the operation of a second wavelength-division-multiplexed optical transmission system.

(f-2) Operation of second wavelength-division-multiplexed optical system FIG. 28 is a diagram for describing the operation of the second wavelength-division-multiplexed optical transmission system. Elements the same as those shown in FIG. 27 are designated by like reference characters. The wavelength-division multiplexing optical transmission systems 100, 200 each have the type A (FIG. 17) architecture of the WP scheme as the optical path cross-connect device OPXC and the transmission type S-4 and reception type R-1 as the electrical cross-connect device EXC.

Operation is the same as that described in connection with FIG. 27 except for the fact that electric signals distributed by the distributing circuits 306a, 306b of the electrical cross-connect device 201 are transmitted upon being converted to optical signals of prescribed wavelengths by the variable-wavelength electro-optic converters (E/O converters) $307a_1'$~$307a_2'$, $307b_1'$~$307b_2'$.

(f-3) Operation of third wavelength-division-multiplexed optical system

Figure 29:
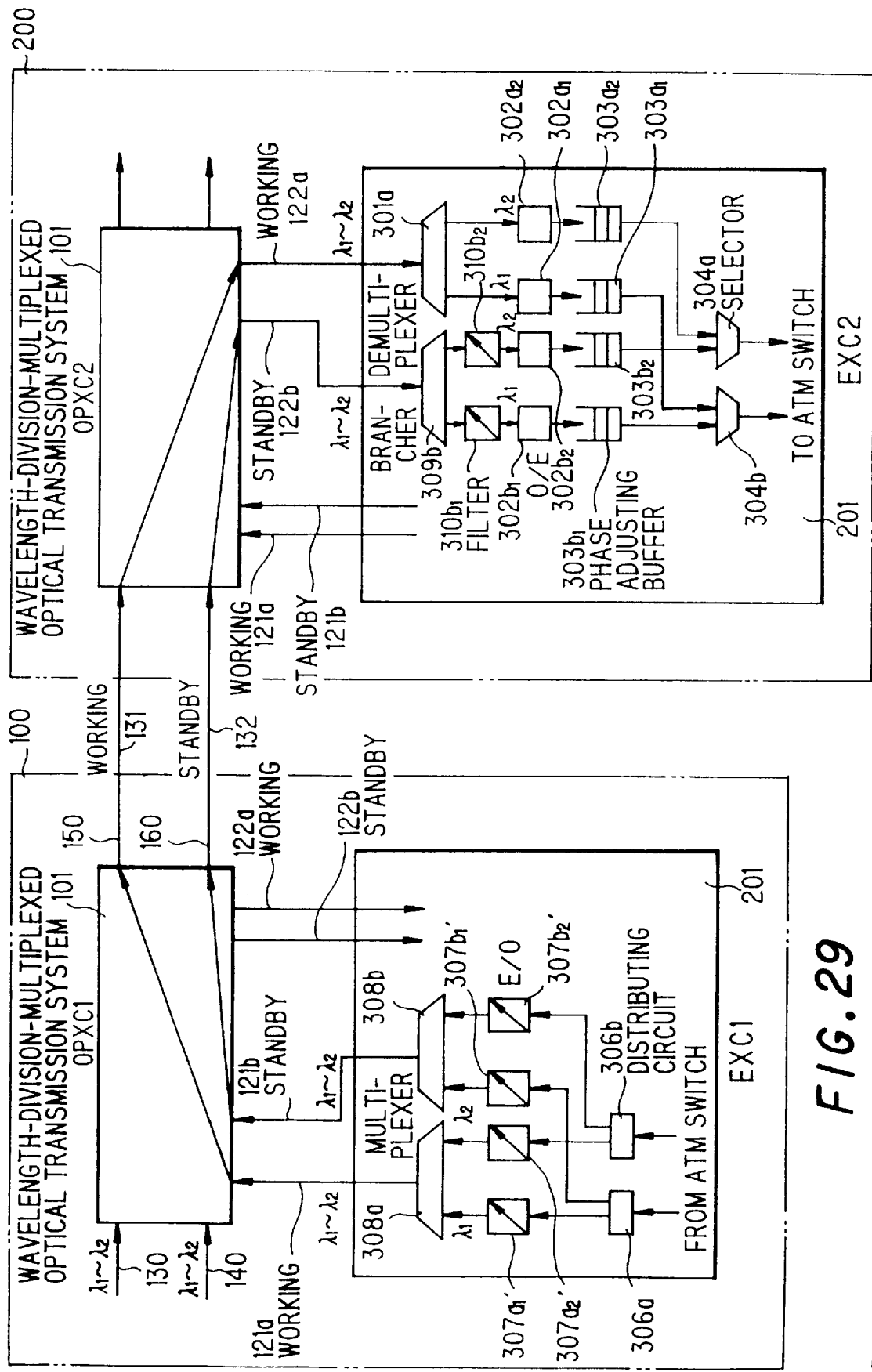
FIG. 29 is a diagram for describing the operation of a third wavelength-division-multiplexed optical transmission system.

FIG. 29 is a diagram for describing the operation of the third wavelength-division-multiplexed optical transmission system. Elements the same as those shown in FIG. 27 are designated by like reference characters. The wavelength-division multiplexing optical transmission systems 100, 200 each have the type A (FIG. 17) architecture of the WP scheme as the optical path cross-connect device OPXC and the transmission type S-4 and reception type R-2 as the electrical cross-connect device EXC.

Operation is the same as that described in connection with FIG. 27 except that (1) working and standby electric signals distributed by the distributing circuits 306a, 306b of the electrical cross-connect device 201 are transmitted upon being converted to optical signals of prescribed wavelengths by the variable-wavelength electro-optic converters (E/O converters) $307a_1'$~$307a_2'$, $307b_1'$~$307b_2'$, (2) wavelength-division-multiplexed optical signals that enter from the optical path cross-connect device 101 via the standby interface links 122b are branched by the brancher 309b, and (3) the variable-wavelength filters $310b_1$~$310b_2$ extract optical signals of prescribed wavelengths $\lambda_1$~$\lambda_2$ from the wavelength-division-multiplexed optical signals branched from the brancher 309b and enter these optical signals into the optoelectric converters $303b_1$~$303b_2$.

(f-4) Operation of fourth wavelength-division-multiplexed optical system

Figure 30:
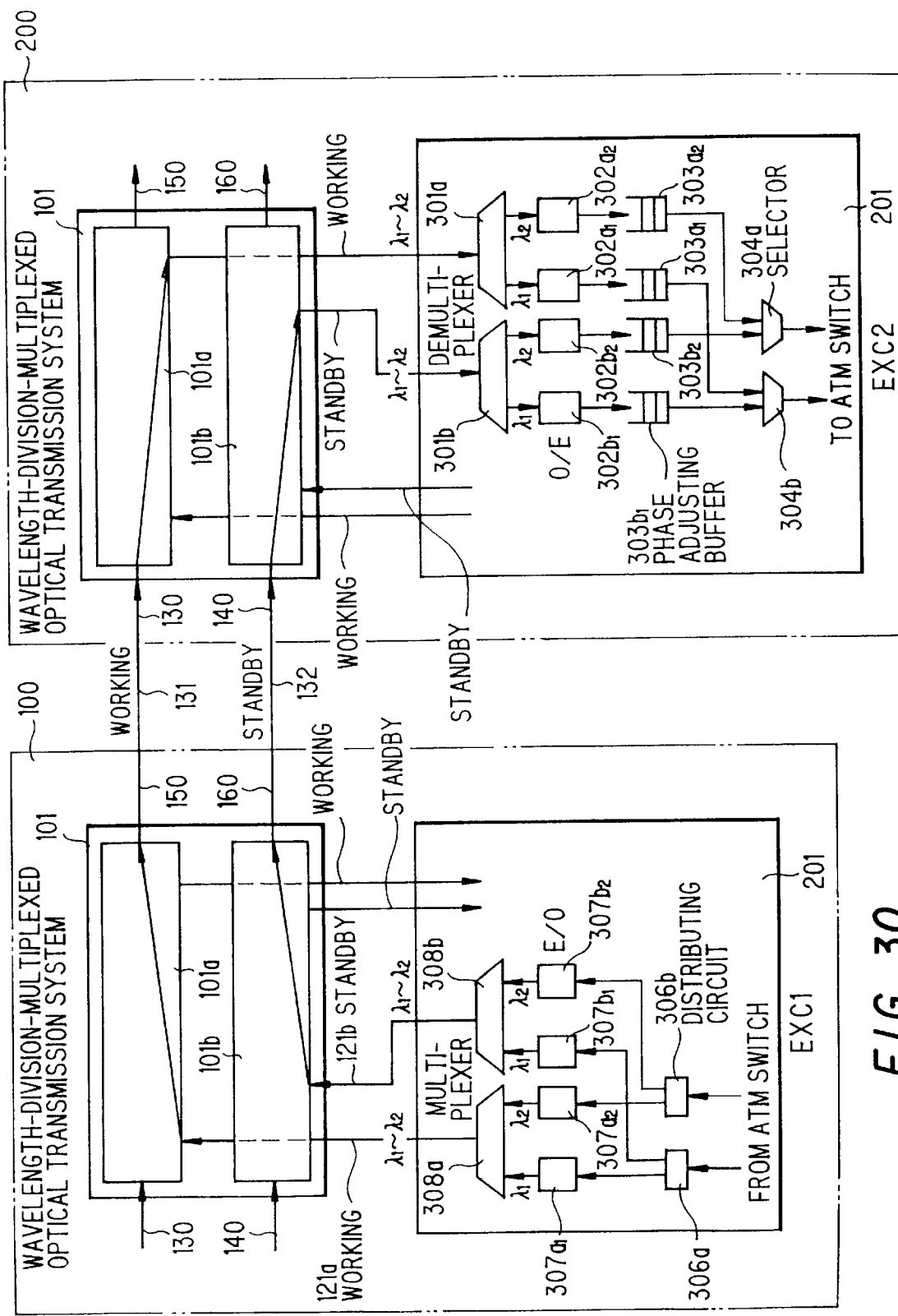
FIG. 30 is a diagram for describing the operation of a fourth wavelength-division-multiplexed optical transmission system.

FIG. 30 is a diagram for describing the operation of the fourth wavelength-division-multiplexed optical transmission system. Elements the same as those shown in FIG. 27 are designated by like reference characters. The wavelength-division multiplexing optical transmission systems 100, 200 each have the type B (FIG. 18) architecture of the VWP scheme as the optical path cross-connect device OPXC and the transmission type S-3 and reception type R-1 as the electrical cross-connect device EXC.

This system differs from the first wavelength-division-multiplexed optical transmission system of FIG. 27 in that the optical path cross-connect device 101 is divided into the working optical path cross-connect device 101a and the standby optical path cross-connect device 101b. The optical path cross-connect device 101 routes wavelength-division-multiplexed optical signals that have entered from the working optical transmission lines 130 to the working optical transmission lines 150 or working interface links 122a wavelength by wavelength. Similarly, the standby optical path cross-connect device 101 routes wavelength-division-multiplexed optical signals that have entered from the standby optical transmission lines 140 to the standby optical transmission lines 160 or standby interface links 122b wavelength by wavelength. Further, the optical path cross-connect device 101 routes wavelength-division-multiplexed optical signals that have entered from the working interface links 121a to the working optical transmission lines 150 by the optical switch 101a and routes wavelength-division-multiplexed optical signals that have entered from the standby interface links 121b to the standby optical transmission lines 160 by the optical switch 101b. In other aspects operation is the same as that described above in connection with FIG. 27.

(f-5) Operation of fifth wavelength-division-multiplexed optical system

Figure 31:
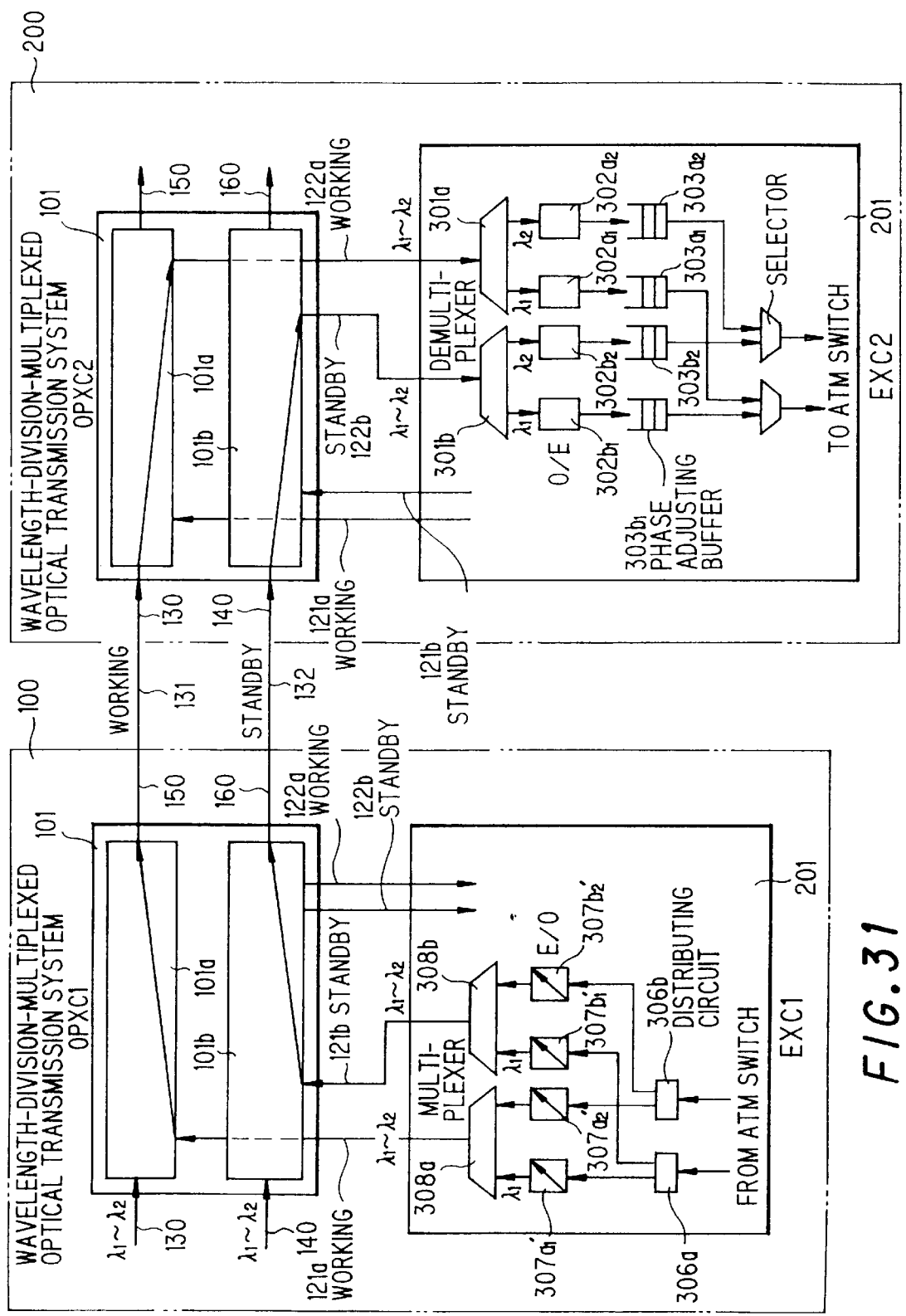
FIG. 31 is a diagram for describing the operation of a fifth wavelength-division-multiplexed optical transmission system.

FIG. 31 is a diagram for describing the operation of the fifth wavelength-division-multiplexed optical transmission system. Elements the same as those shown in FIG. 28 are designated by like reference characters. The wavelength-division multiplexing optical transmission systems 100, 200 each have the type B (FIG. 18) architecture of the WP scheme as the optical path cross-connect device OPXC and the transmission type S-4 and reception type R-1 as the electrical cross-connect device EXC.

This system differs from the second wavelength-division-multiplexed optical transmission system of FIG. 28 in that the optical path cross-connect device 101 is divided into the working optical path cross-connect device 101a and the standby optical path cross-connect device 101b. The optical path cross-connect device 101 routes wavelength-division-multiplexed optical signals that have entered from the working optical transmission lines 130 to the working optical transmission lines 150 or working interface links 122a wavelength by wavelength. Similarly, the standby optical path cross-connect device 101 routes wavelength-division-multiplexed optical signals that have entered from the standby optical transmission lines 140 to the standby optical transmission lines 160 or standby interface links 122b wavelength by wavelength. Further, the optical path cross-connect device 101 routes wavelength-division-multiplexed optical signals that have entered from the working interface links 121a to the working optical transmission lines 150 by the optical switch 101a and routes wavelength-division-multiplexed optical signals that have entered from the standby interface links 121b to the standby optical transmission lines 160 by the optical switch 101b. In other aspects operation is the same as that described above in connection with FIG. 28.

(f-6) Operation of sixth wavelength-division-multiplexed optical system

Figure 32:
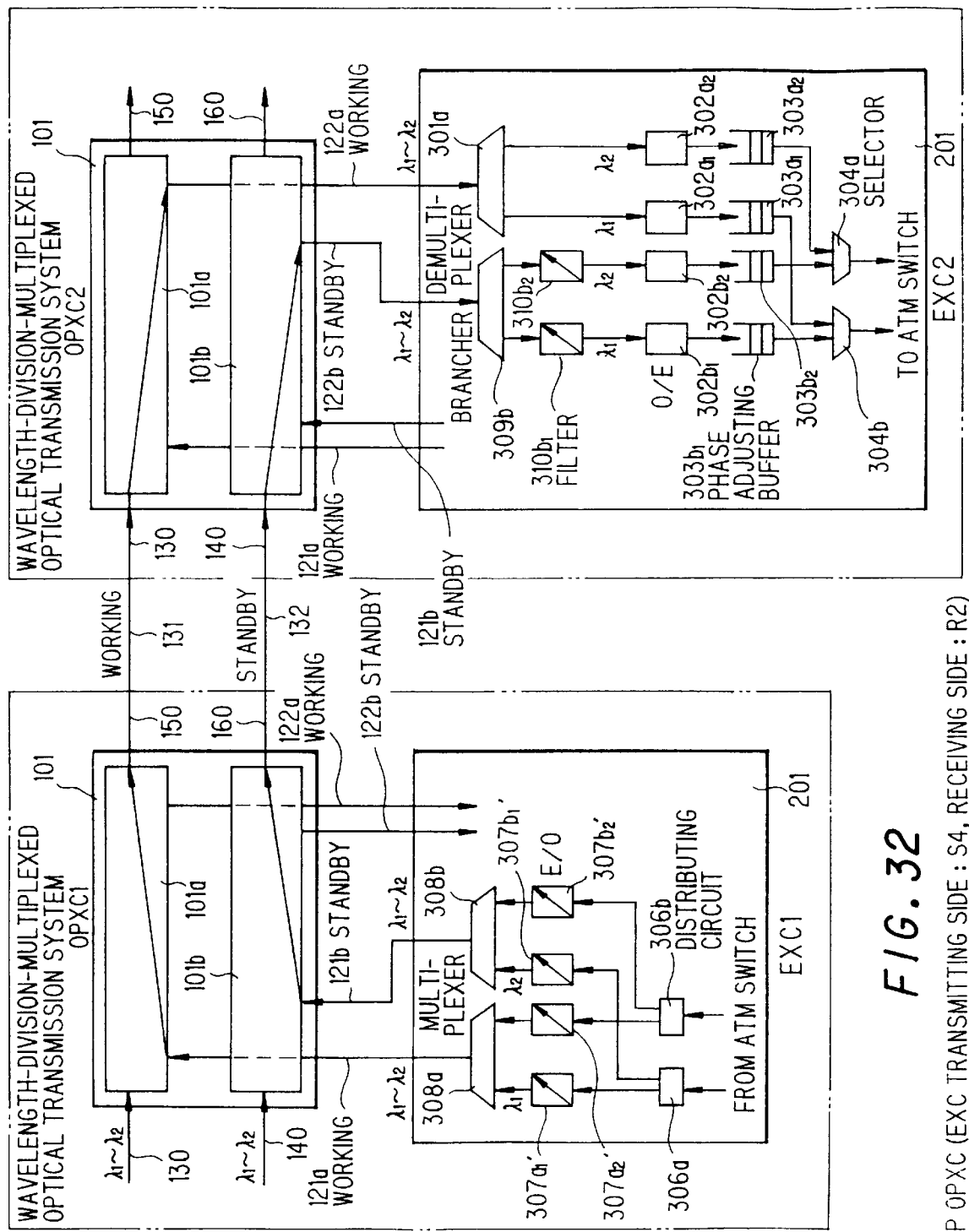
FIG. 32 is a diagram for describing the operation of a sixth wavelength-division-multiplexed optical transmission system.

FIG. 32 is a diagram for describing the operation of the sixth wavelength-division-multiplexed optical transmission system. Elements the same as those shown in FIG. 29 are designated by like reference characters. The wavelength-division multiplexing optical transmission systems 100, 200 each have the type B (FIG. 18) architecture of the WP scheme as the optical path cross-connect device OPXC and the transmission type S-4 and reception type R-2 as the electrical cross-connect device EXC.

This system differs from the third wavelength-division-multiplexed optical transmission system of FIG. 29 in that the optical path cross-connect device 101 is divided into the working optical path cross-connect device 101a and the standby optical path cross-connect device 101b. The optical path cross-connect device 101 routes wavelength-division-multiplexed optical signals that have entered from the working optical transmission lines 130 to the working optical transmission lines 150 or working interface links 122a wavelength by wavelength. Similarly, the standby optical path cross* connect device 101 routes wavelength-division-multiplexed optical signals that have entered from the standby optical transmission lines 140 to the standby optical transmission lines 160 or standby interface links 122b wavelength by wavelength. Further, the optical path cross-connect device 101 routes wavelength-division-multiplexed optical signals that have entered from the working interface links 121a to the working optical transmission lines 150 by the optical switch 101a and routes wavelength-division-multiplexed optical signals that have entered from the standby interface links 121b to the standby optical transmission lines 160 by the optical switch 101b. In other aspects operation is the same as that described above in connection with FIG. 29.

(f-7) Operation of seventh wavelength-division-multiplexed optical system

Figure 33:
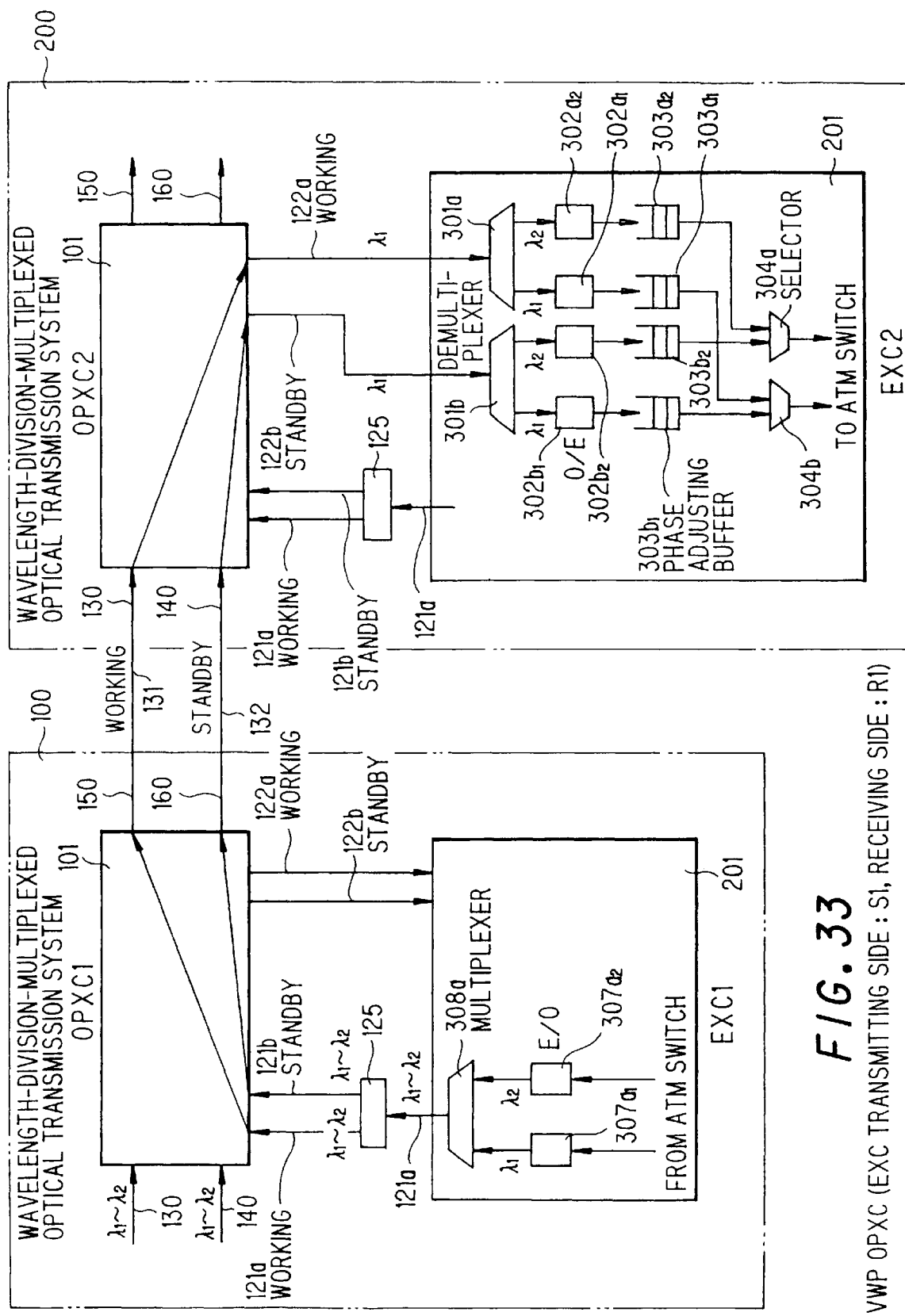
FIG. 33 is a diagram for describing the operation of a seventh wavelength-division-multiplexed optical transmission system.

FIG. 33 is a diagram for describing the operation of the seventh wavelength-division-multiplexed optical transmission system. Elements the same as those shown in FIG. 27 are designated by like reference characters. The wavelength-division multiplexing optical transmission systems 100, 200 each have the type C (FIG. 19) architecture of the VWP scheme as the optical path cross-connect device OPXC and the transmission type S-1 and reception type R-1 as the electrical cross-connect device EXC.

The optical path cross-connect device 101 (1) routes wavelength-division-multiplexed optical signals that have entered from the working optical transmission lines 130 to the working optical transmission lines 150 or working interface links 122a wavelength by wavelength, (2) routes wavelength-division-multiplexed optical signals that have entered from the standby optical transmission lines 140 to the standby optical transmission lines 160 or standby interface links 122b wavelength by wavelength, (3) routes wavelength-division-multiplexed optical signals that have entered from the working interface links 121a to the working optical transmission lines 150 wavelength by wavelength, and (4) routes wavelength-division-multiplexed optical signals that have entered from the standby interface links 121b, upon being separated by the optical distributors or optical distributing switches 125, to the standby optical transmission lines 160 wavelength by wavelength. The optical path cross-connect device 101 executes wavelength conversion as necessary. The electrical cross-connect device 201 switches the working and standby transmission lines by the selectors 304a, 304b without momentary disconnect.

By way of example, in a case where optical signals are transmitted from the electrical cross-connect device (EXC1) of the first optical transmission system 100 to the electrical cross-connect device (EXC2) of the second optical transmission system 200, the electrical cross-connect device (EXC1) sends the wavelength-division-multiplexed optical signals to the interface link 121a, and the optical distributors 125 branch the wavelength-division-multiplexed optical signals to the working and standby systems and sends them to the working and standby interface links 121a, 121b.

The optical path cross-connect device OPXC1 routes the wavelength-division-multiplexed optical signals, which have entered from the working interface links 121a, to the working optical transmission lines 131 wavelength by wavelength and routes the wavelength-division-multiplexed optical signals, which have entered from the standby interface links 121b, to the standby optical transmission lines 132 wavelength by wavelength. The optical path cross-connect device OPXC2 of the second optical transmission system 200 routes the wavelength-division-multiplexed optical signals, which have entered from the working optical transmission lines 131, to the working interface links 122a wavelength by wavelength and routes the wavelength-division-multiplexed optical signals, which have entered from the standby optical transmission lines 132, to the standby interface links 122b wavelength by wavelength, thereby entering these optical signals into the electrical cross-connect device EXC2. The selectors 304a, 304b of the electrical cross-connect device EXC2 select the wavelength-division-multiplexed signals that have entered from the working interface links 122a and route the signals to the desired outgoing line by way of the ATM switch (not shown).

If signals flowing through the working optical transmission lines 131 are switched to signals in the standby system and signals flowing through the standby optical transmission lines 132 are switched to signals in the working system under these conditions, then, on the basis of the switching command, the selectors 304a, 304b of the electrical cross-connect device EXC2 of the second optical transmission system 200 select the wavelength-division-multiplexed signals that have entered from the standby interface links 122b and route these signals to a desired outgoing line by way of the ATM switch. In this case, a phase adjustment is carried out in the phase adjusting buffers $303a_1 \sim 303a_2$, $303b_1 \sim 303b_2$ in such a manner that the signal phases in the working and standby systems coincide at all times. As a result, it is possible to switch between the working and standby systems without momentary disconnect and without loss of cells.

(f-8) Operation of eighth wavelength-division-multiplexed optical system

Figure 34:
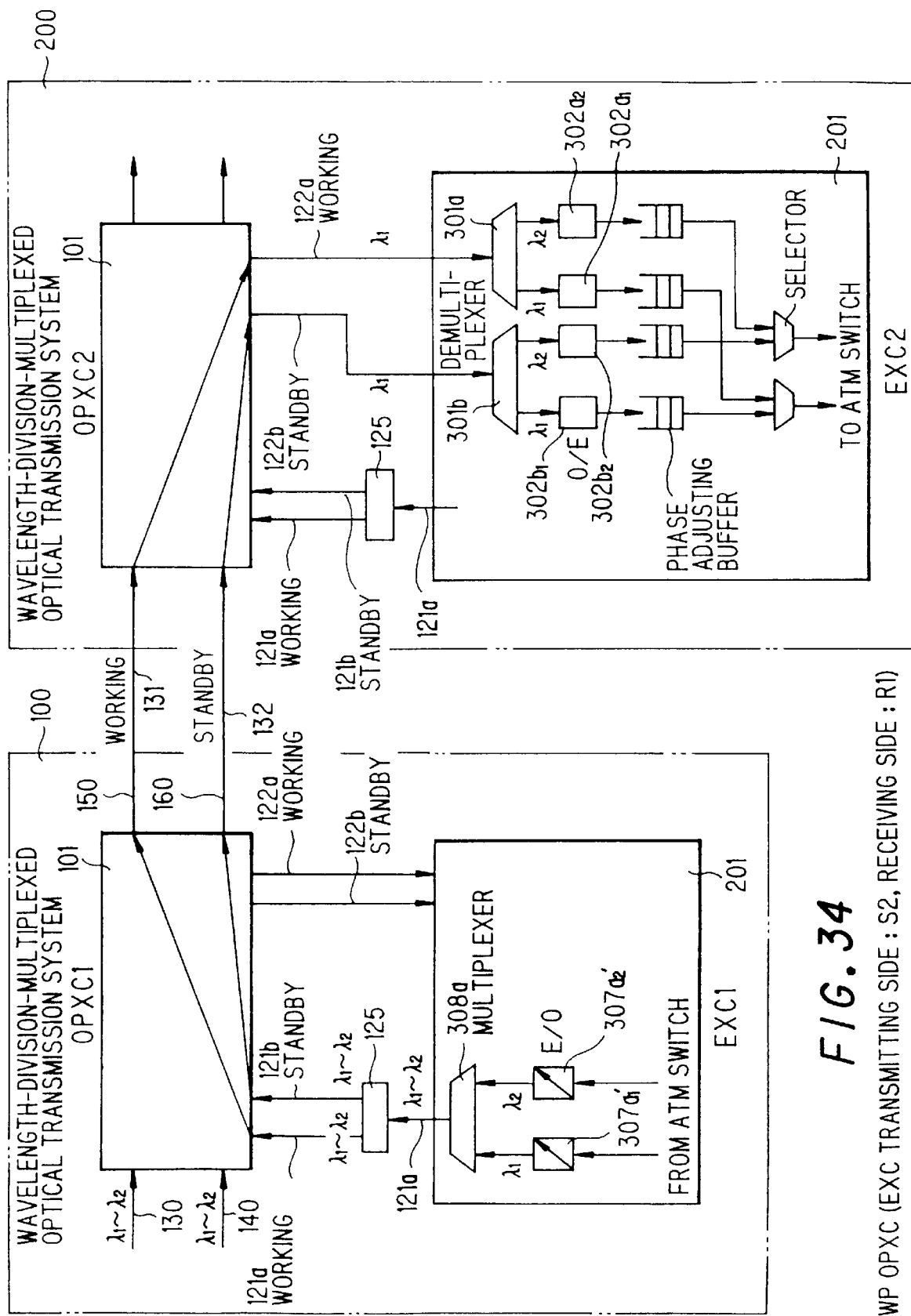
FIG. 34 is a diagram for describing the operation of a eighth wavelength-division-multiplexed optical transmission system.

FIG. 34 is a diagram for describing the operation of the eighth wavelength-division-multiplexed optical transmission system. Elements the same as those shown in FIG. 33 are designated by like reference characters. The wavelength-division multiplexing optical transmission systems 100, 200 each have the type C (FIG. 19) architecture of the WP scheme as the optical path cross-connect device OPXC and the transmission type S-2 and reception type R-1 as the electrical cross-connect device EXC.

Operation is the same as that described in connection with FIG. 33 except for the fact that electric signals outputted by the ATM switch (not shown) of the electrical cross-connect device 201 are converted to optical signals of prescribed wavelengths by the variable-wavelength electro-optic converters (E/O converters) $307a_1' \sim 307a_2'$ and the optical signals are then multiplexed by the multiplexers 308a and sent to the interface links 121a.

(f-9) Operation of ninth wavelength-division-multiplexed optical system

Figure 35:
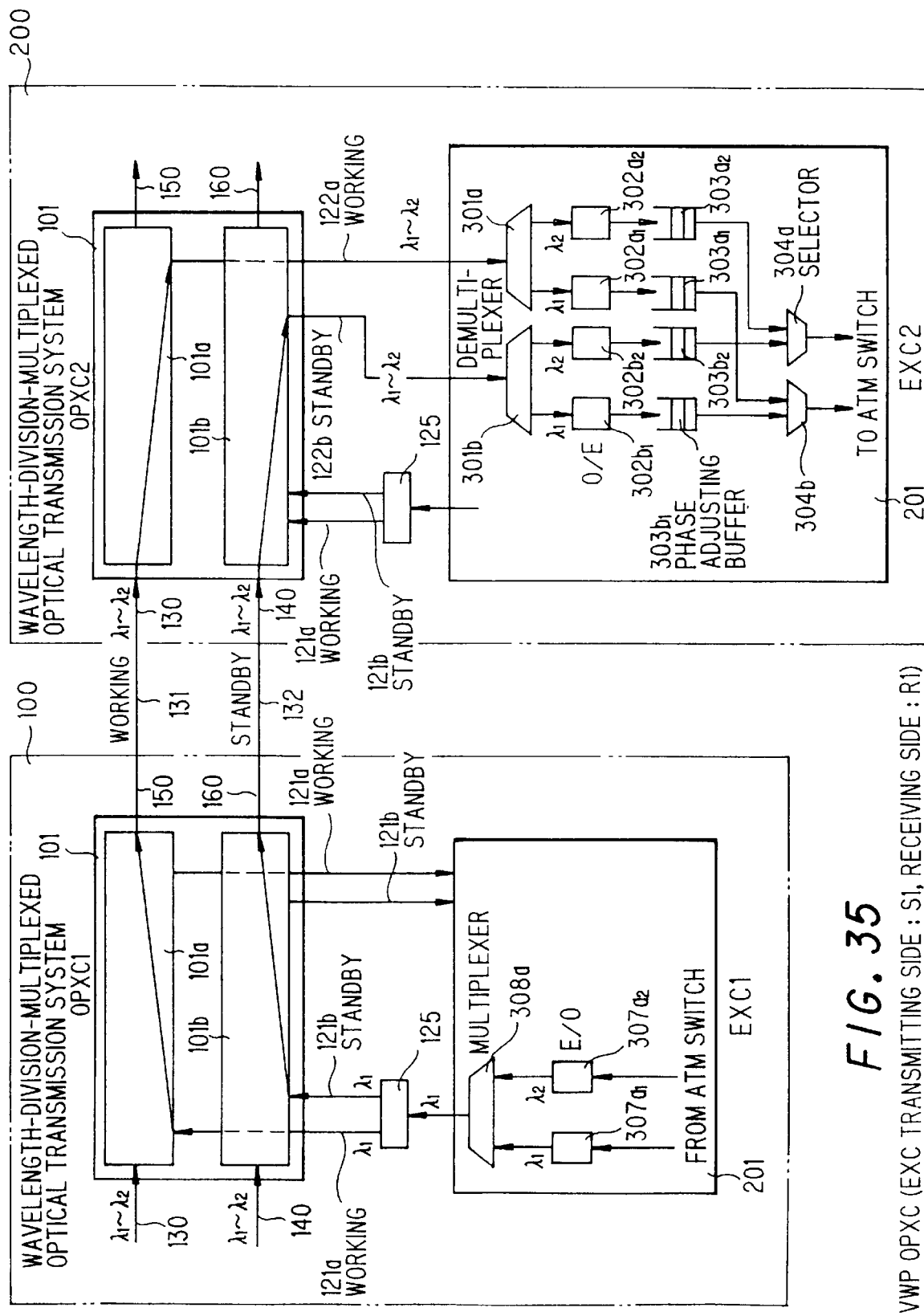
FIG. 35 is a diagram for describing the operation of a ninth wavelength-division-multiplexed optical transmission system.

FIG. 35 is a diagram for describing the operation of the ninth wavelength-division-multiplexed optical transmission system. Elements the same as those shown in FIG. 33 are designated by like reference characters. The wavelength-division multiplexing optical transmission systems 100, 200 each have the type D (FIG. 20) architecture of the VWP scheme as the optical path cross-connect device OPXC and the transmission type S-1 and reception type R-1 as the electrical cross-connect device EXC.

The system of FIG. 35 differs from that of FIG. 33 in that the optical path cross-connect device 101 is divided into the working optical path cross-connect device 101a and the standby optical path cross-connect device 101b. The optical path cross-connect device 101 routes wavelength-division-multiplexed optical signals that have entered from the working optical transmission lines 130 to the working optical transmission lines 150 or working interface links 122a wavelength by wavelength. Similarly, the standby optical path cross-connect device 101 routes wavelength-division-multiplexed optical signals that have entered from the standby optical transmission lines 140 to the standby optical transmission lines 160 or standby interface links 122b wavelength by wavelength. Further, the optical path cross-connect device 101 routes wavelength-division-multiplexed optical signals that have entered from the working interface links 121a to the working optical transmission lines 150 by the optical switch 101a and routes wavelength-division-multiplexed optical signals that have entered from the standby interface links 121b to the standby optical transmission lines 160 by the optical switch 101b. In other aspects operation is the same as that described above in connection with FIG. 33.

(f-10) Operation of tenth wavelength-division-multiplexed optical system

Figure 36:
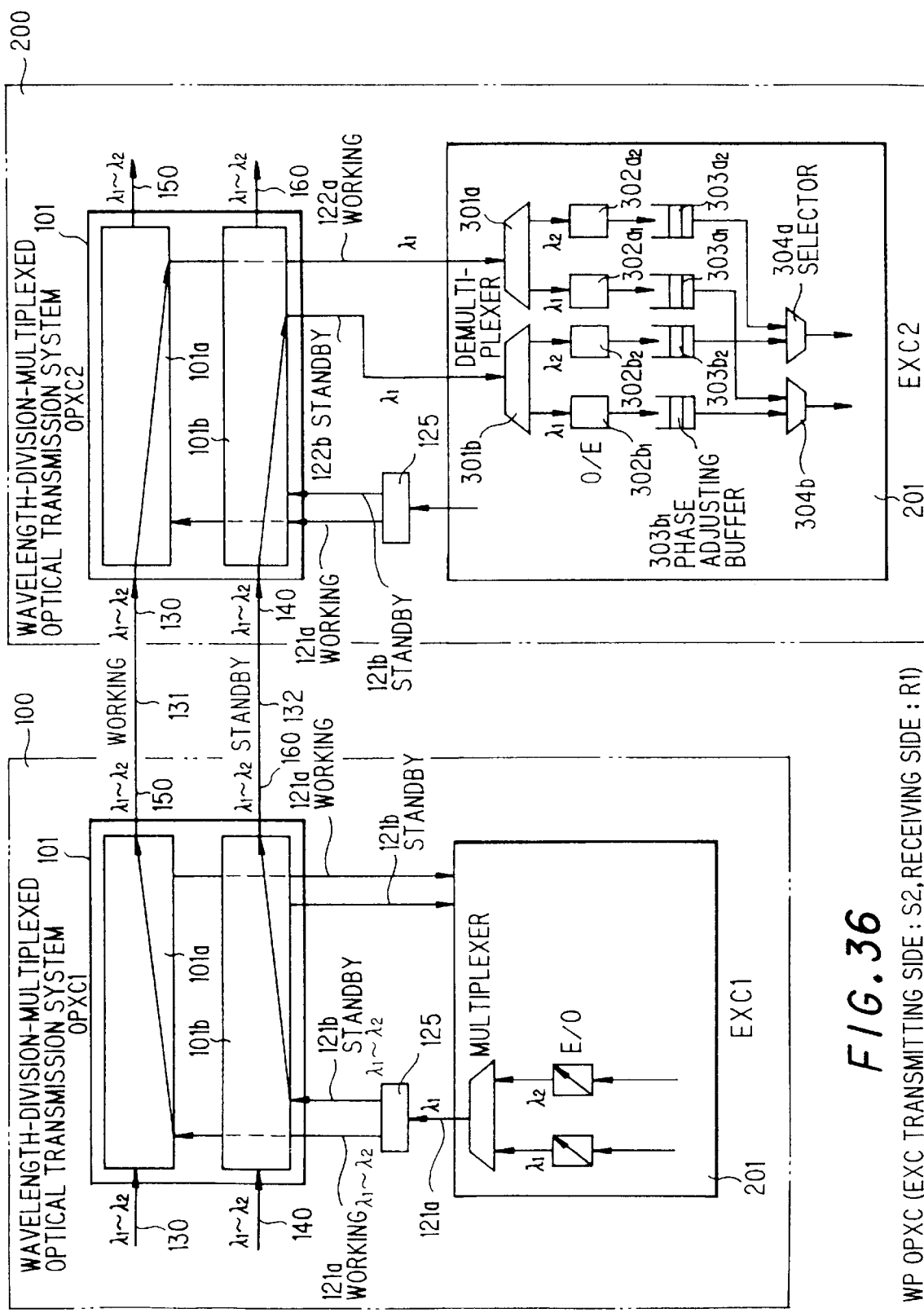
FIG. 36 is a diagram for describing the operation of a tenth wavelength-division-multiplexed optical transmission system.

FIG. 36 is a diagram for describing the operation of the tenth wavelength-division-multiplexed optical transmission system. Elements the same as those shown in FIG. 34 are designated by like reference characters. The wavelength-division multiplexing optical transmission systems 100, 200 each have the type D (FIG. 20) architecture of the WP scheme as the optical path cross-connect device OPXC and the transmission type S-2 and reception type R-1 as the electrical cross-connect device EXC.

The system of FIG. 36 differs from that of FIG. 34 in that the optical path cross-connect device 101 is divided into the working optical path cross-connect device 101a and the standby optical path cross-connect device 101b. The optical path cross-connect device 101 routes wavelength-division-multiplexed optical signals that have entered from the working optical transmission lines 130 to the working optical transmission lines 150 or working interface links 122a wavelength by wavelength. Similarly, the standby optical path cross-connect device 101 routes wavelength-division-multiplexed optical signals that have entered from the standby optical transmission lines 140 to the standby optical transmission lines 160 or standby interface links 122b wavelength by wavelength. Further, the optical path cross-connect device 101 routes wavelength-division-multiplexed optical signals that have entered from the working interface links 121a to the working optical transmission lines 150 by the optical switch 101a and routes wavelength-division-multiplexed optical signals that have entered from the standby interface links 121b to the standby optical transmission lines 160 by the optical switch 101b. In other aspects operation is the same as that described above in connection with FIG. 34.

(f-11) Operation of 11th wavelength-division-multiplexed optical system

Figure 37:
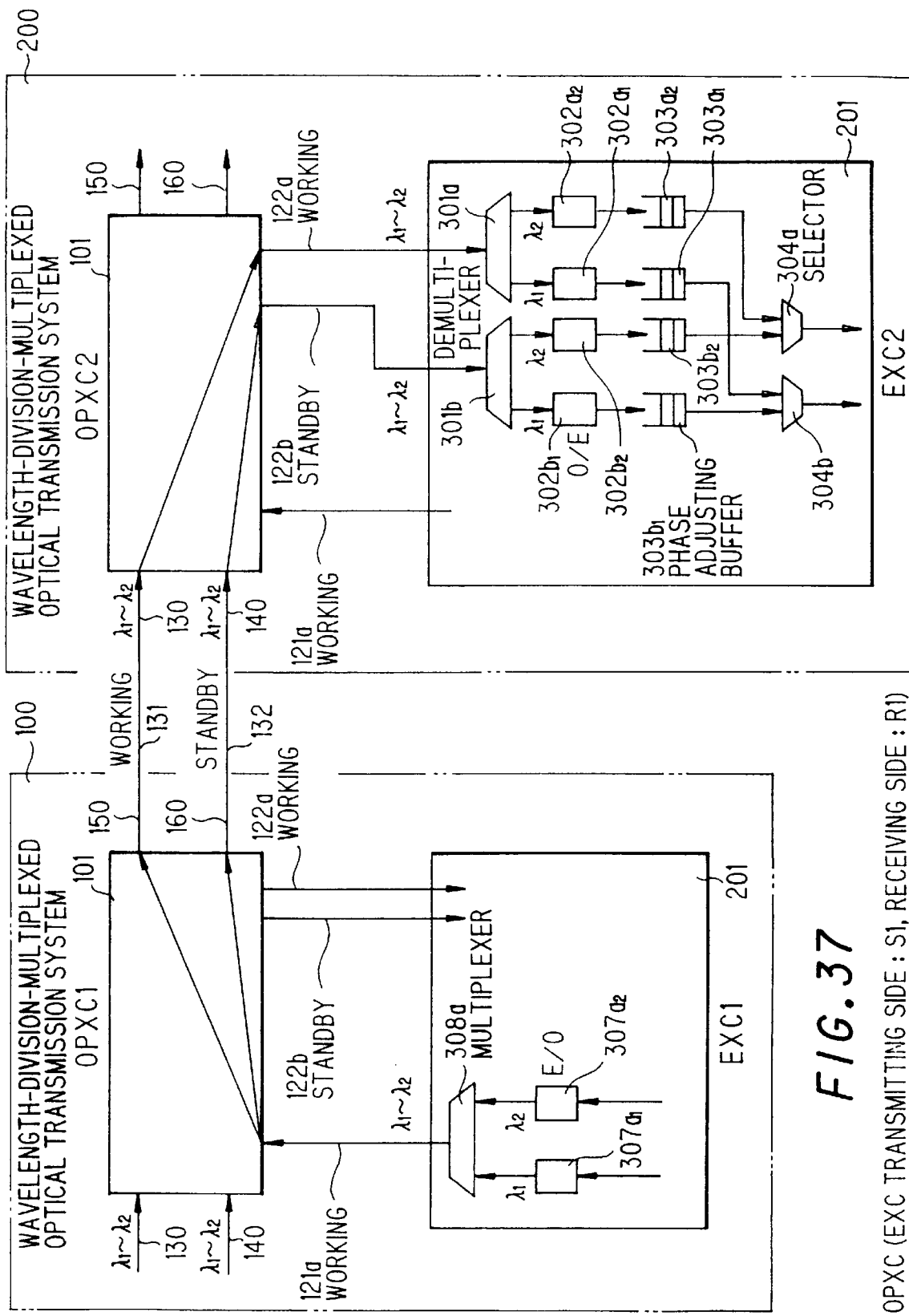
FIG. 37 is a diagram for describing the operation of an 11th wavelength-division-multiplexed optical transmission system.

FIG. 37 is a diagram for describing the operation of the 11th wavelength-division-multiplexed optical transmission system. Elements the same as those shown in FIG. 27 are designated by like reference characters. The wavelength-division multiplexing optical transmission systems 100, 200 each have the type E (FIG. 21) architecture of the VWP scheme as the optical path cross-connect device OPXC and the transmission type S-1 and reception type R-1 as the electrical cross-connect device EXC.

The optical path cross-connect device 101 (1) routes wavelength-division-multiplexed optical signals that have entered from the working optical transmission lines 130 to the working optical transmission lines 150 or working interface links 122a wavelength by wavelength, (2) routes wavelength-division-multiplexed optical signals that have entered from the standby optical transmission lines 140 to the standby optical transmission lines 160 or standby interface links 122b wavelength by wavelength, (3) routes wavelength-division-multiplexed optical signals that have entered from the working interface links 121a to the working optical transmission lines 150 and standby optical transmission lines 160 wavelength by wavelength by the distribution function. The optical path cross-connect device 101 executes wavelength conversion as necessary. On the basis of the switching command, the electrical cross-connect device 201 switches the working and standby transmission lines by the selectors 304a, 304b without momentary disconnect.

For example, in a case where optical signals are transmitted from the electrical cross-connect device (EXC1) of the first optical transmission system 100 to the electrical cross-connect device (EXC2) of the second optical transmission system 200, the electrical cross-connect device (EXC1) sends the wavelength-division-multiplexed optical signals to the interface link 121a. By way of the distribution function, the optical path cross-connect device OPXC1 routes the wavelength-division-multiplexed optical signals, which have entered from the working interface links 121a, to the working optical transmission lines 131 and standby optical transmission lines 132 wavelength by wavelength. The optical path cross-connect device OPXC2 of the second optical transmission system 200 routes the wavelength-division-multiplexed optical signals, which have entered from the working optical transmission lines 131, to the working interface links 122a wavelength by wavelength and routes the wavelength-division-multiplexed optical signals, which have entered from the standby optical transmission lines 132, to the standby interface links 122b wavelength by wavelength, thereby entering these optical signals into the electrical cross-connect device EXC2. The electrical cross-connect device EXC2 selects the wavelength-division-multiplexed signals that have entered from the working interface links 122a and routes the signals to the desired outgoing line by way of the ATM switch (not shown).

If signals flowing through the working optical transmission lines 131 are switched to signals in the standby system and signals flowing through the standby optical transmission lines 132 are switched to signals in the working system under these conditions, then, on the basis of the switching command, the selectors 304a, 304b of the electrical cross-connect device EXC2 of the second optical transmission system 200 select the wavelength-division-multiplexed signals that have entered from the standby interface links 122b and route these signals to a desired outgoing line by way of the ATM switch. In this case, a phase adjustment is carried out in the phase adjusting buffers $303a_1 \sim 303a_2$, $303b_1 \sim 303b_2$ in such a manner that the signal phases in the working and standby systems coincide at all times. As a result, it is possible to switch between the working and standby systems without momentary disconnect and without loss of cells.

(f-12) Operation of 12th wavelength-division-multiplexed optical system

Figure 38:
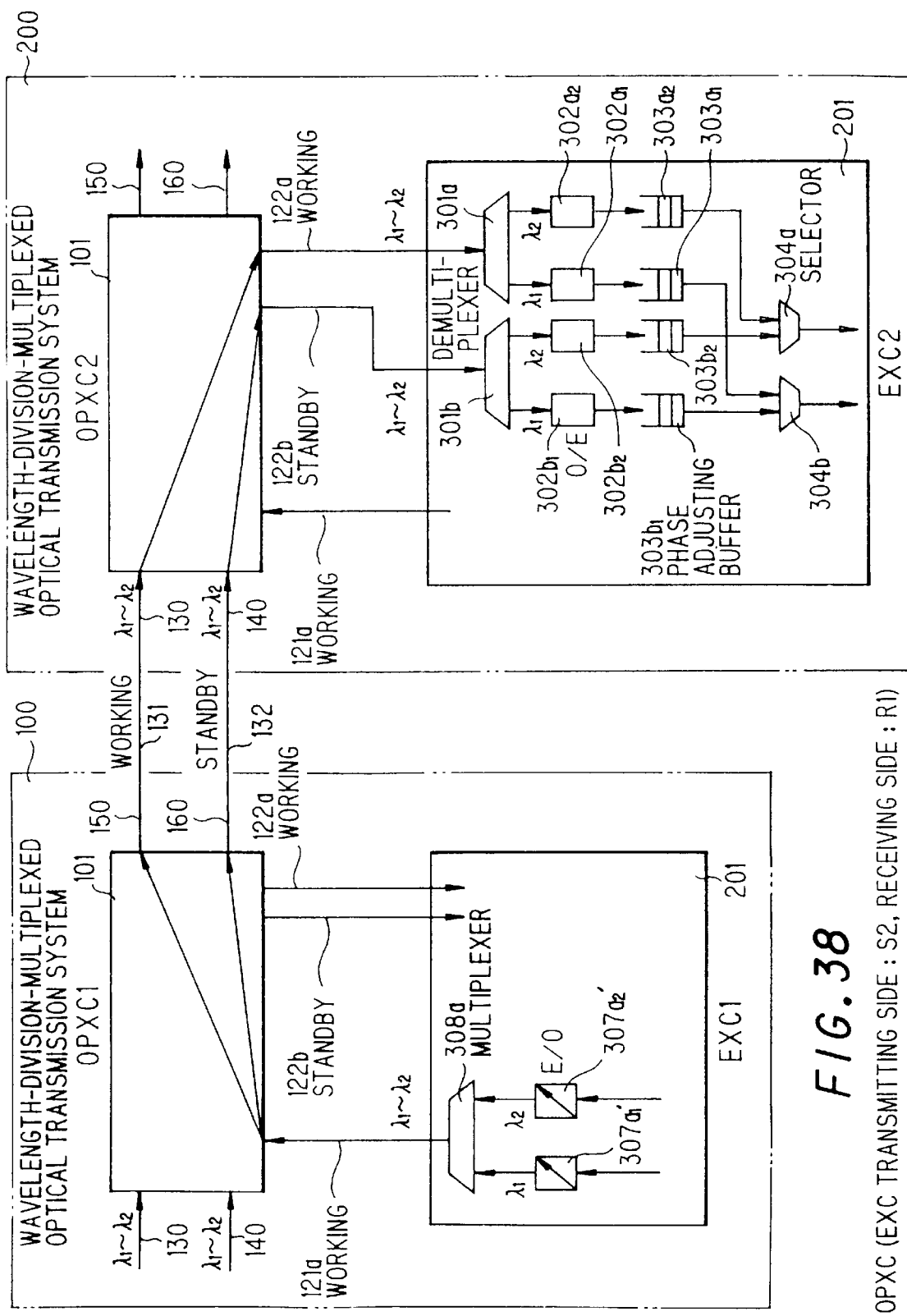
FIG. 38 is a diagram for describing the operation of a 12th wavelength-division-multiplexed optical transmission system.

FIG. 38 is a diagram for describing the operation of the 12th wavelength-division-multiplexed optical transmission system. Elements the same as those shown in FIG. 37 are designated by like reference characters. The wavelength-division multiplexing optical transmission systems 100, 200 each have the type E (FIG. 21) architecture of the WP scheme as the optical path cross-connect device OPXC and the transmission type S-2 and reception type R-1 as the electrical cross-connect device EXC.

Operation is the same as that described in connection with FIG. 38 except for the fact that electric signals outputted by the ATM switch (not shown) of the electrical cross-connect device 201 are converted to optical signals of prescribed wavelengths by the variable-wavelength electro-optic converters (E/O converters) $307a_1' \sim 307a_2'$ and the optical signals are then multiplexed by the multiplexers 308a and sent to the interface links 121a.

Uninterrupted switching between working and standby systems is described above. However, the invention is applicable also to working/standby switching control at the time of maintenance and control for switchback from the standby system to the working system after recovery from a transmission line failure.

(D) Third embodiment
(a) Structure of optical communication system

The structure for controlling the operation of setting/changing over a path of the optical path cross-connect device or the electrical cross-connect device is not clearly shown in the first and second embodiments. In a third embodiment, a structure for controlling the path setting operation and the path change-over operation is added to the first or second embodiment.

Figure 39:
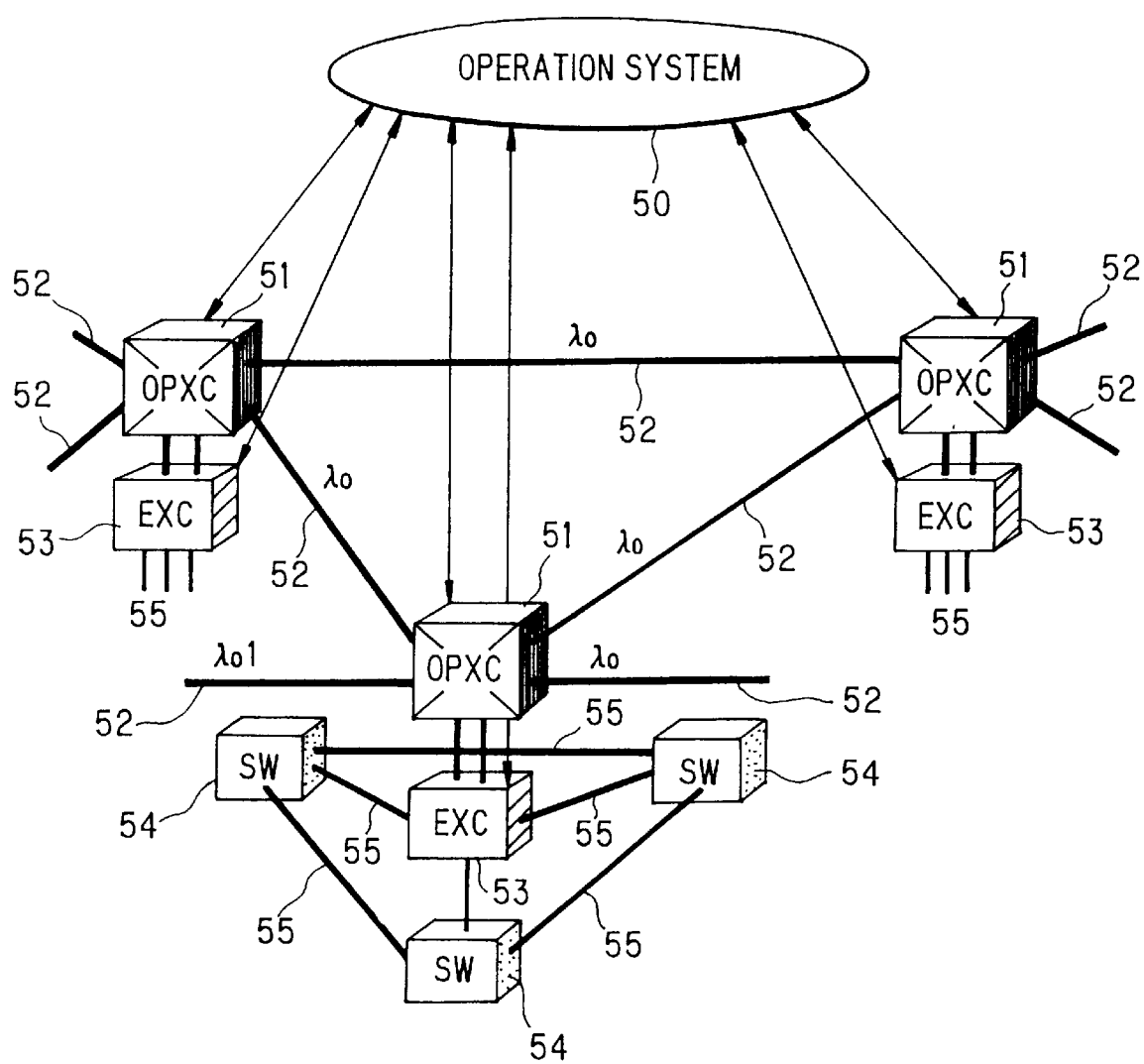
FIG. 39 is an explanatory view of an optical network provided with an operation system for outputting a path setting signal and a path change-over signal.
Figure 46:
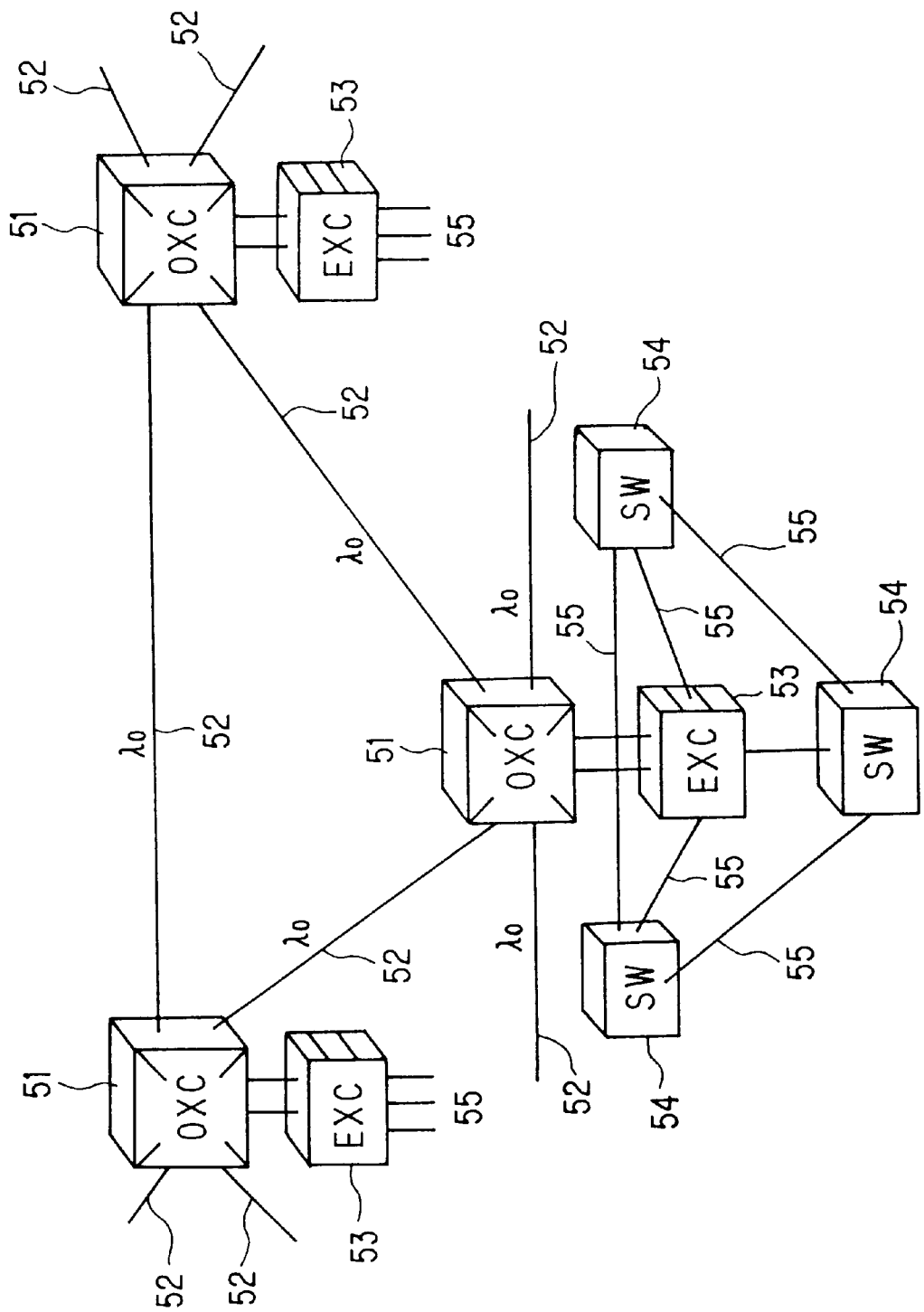
FIG. 46 is a diagram for describing an optical network.
Figure 47:
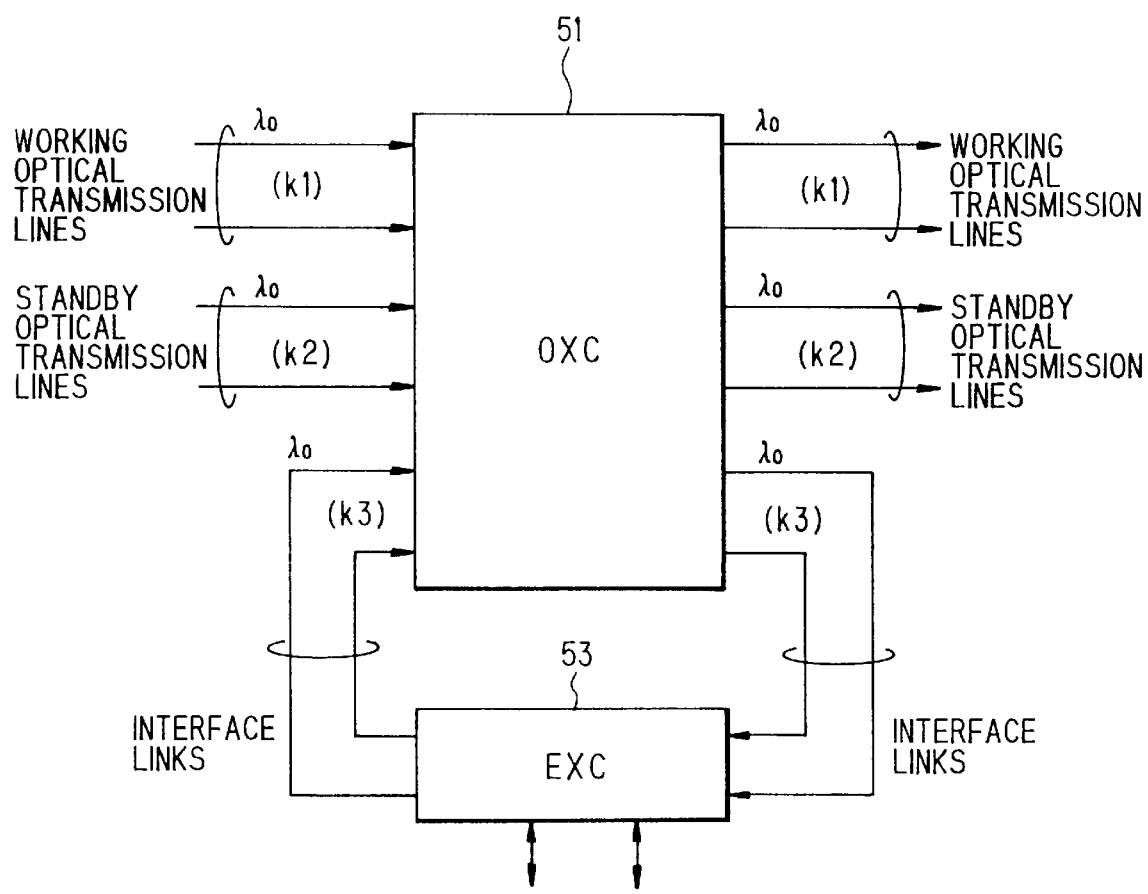
FIG. 47 is a diagram showing the connections between an OPXC and an EXC.
Figure 48:
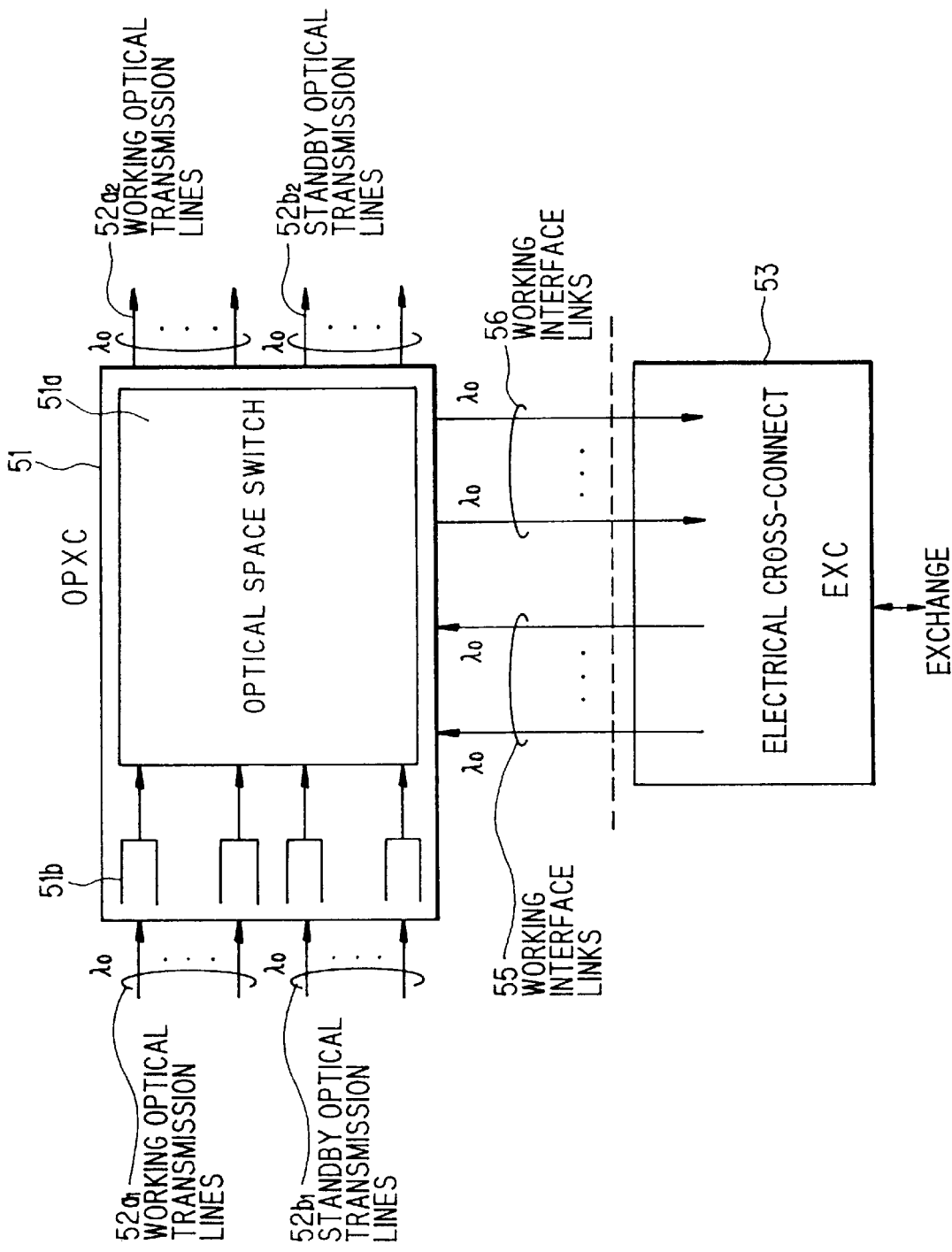
FIG. 48 is a block diagram showing an example of the architecture of a conventional optical path cross-connect device.
Figure 49:
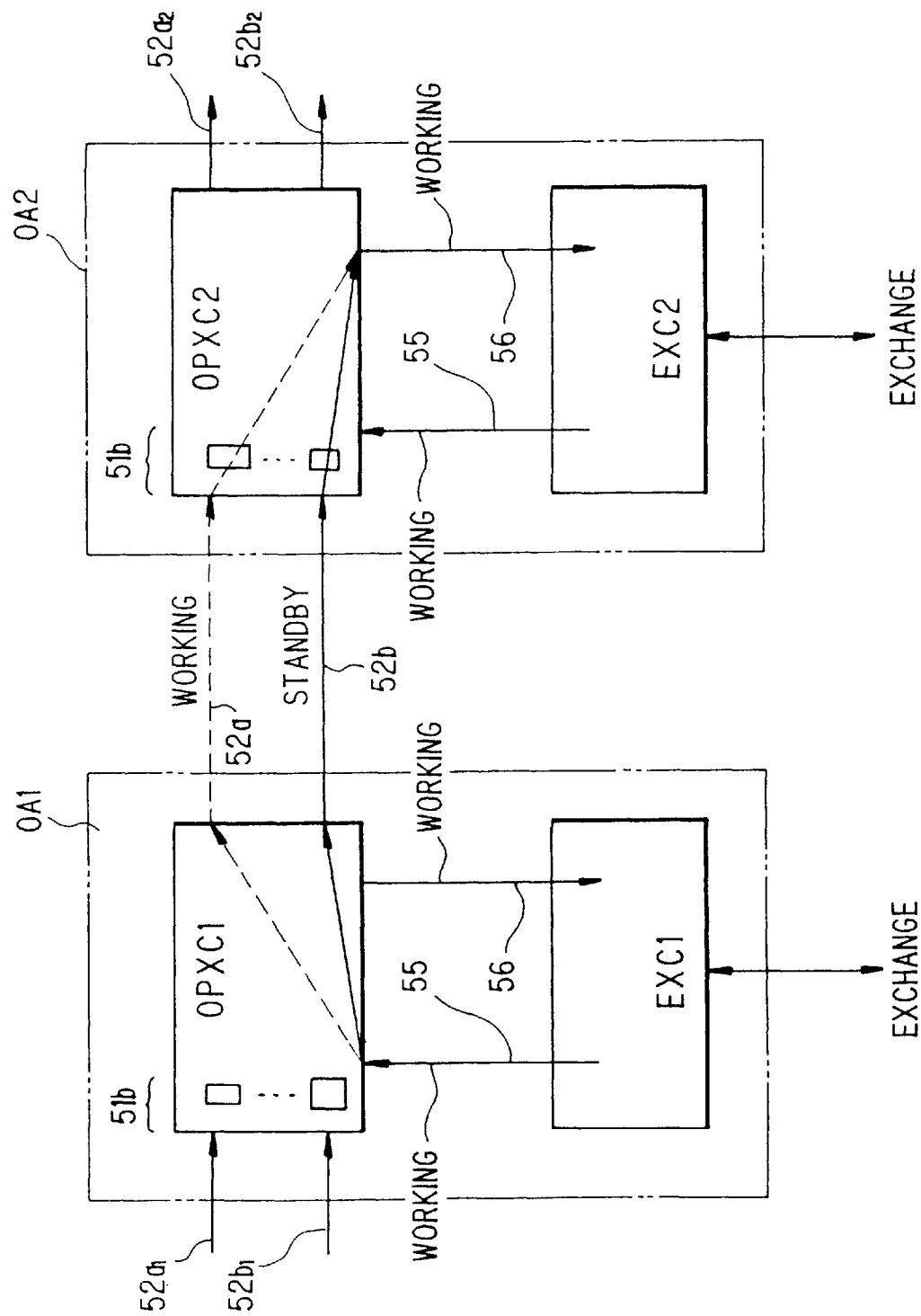
FIG. 49 is a diagram for describing the operation of the conventional optical path cross-connect device.

FIG. 39 shows the structure of an optical network provided with an operation system for controlling the path setting operation and the path change-over operation. The same reference numerals are provided for the elements which are the same as those shown in FIG. 46. In FIG. 39, the reference numeral 50 represents an operation system for controlling the path setting operation and the path change-over operation of the optical path cross-connect devices 51 and the electrical cross-connect devices 53. Each of the optical path cross-connect devices 51 and the electrical cross-connect devices 53 sets/changes over a path under instructions from the operation system 50 so as to transmit an optical/electrical signal to a predetermined route. It is also possible to transmit a wavelength-division-multiplexed optical signal through the optical transmission line 52.

(b) First example of optical transmission system
(b-1) Structure

Figure 40:
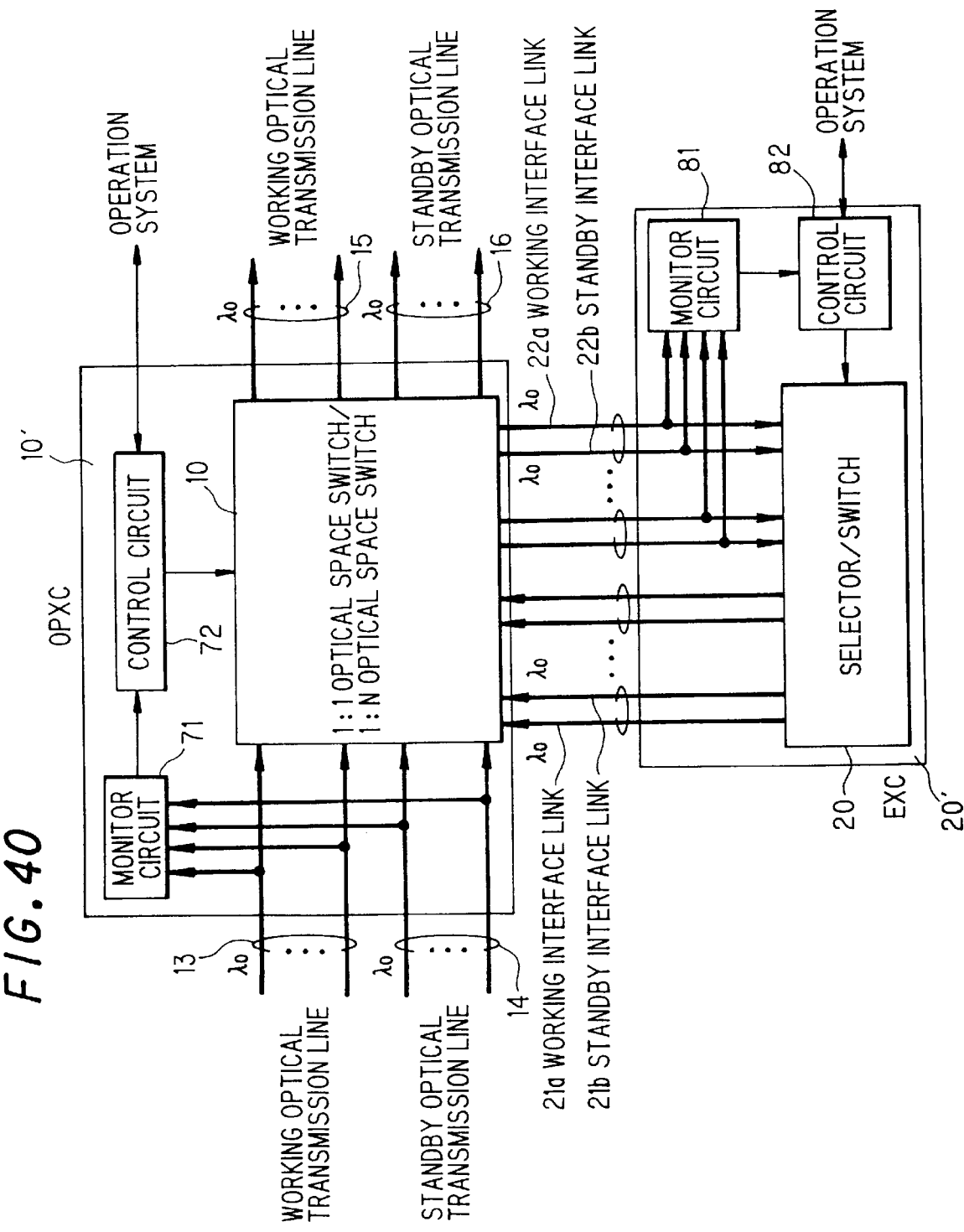
FIG. 40 shows the structure of a first example of an optical transmission system provided with a monitor for monitoring the optical transmission line so as to detect trouble and a circuit for controlling a switch and a selector.

FIG. 40 shows the structure of a first example of an optical transmission system in the third embodiment. This system is provided with a monitor circuit for monitoring the optical transmission line to detect trouble and a control circuit for controlling a switch/selector. The reference numeral 10' represents an optical path cross-connect device (OPXC), and 20' an electrical cross-connect device(EXC).

This optical transmission system is obtained by providing the optical path cross-connect device 10 and the electrical cross-connect device 20 which are the same as those in the first embodiment (see FIG. 3), with monitor circuits 71, 81 and control circuits 72, 82, respectively. In other words, the optical path cross-connect device 10' is composed of the optical path cross-connect device 10 in the first embodiment, the monitor circuit 71 and the control circuit 72, while the electrical cross-connect device 20' is composed of the electrical cross-connect device 20 in the first embodiment, the monitor circuit 81 and the control circuit 82.

The monitor circuit 71 monitors the working optical transmission line 13 and the standby optical transmission line 14 to detect trouble, and when trouble is detected, it is reported to the control circuit 72. The control circuit 72 controls the optical path cross-connect device 10 under the path setting/change-over instruction from the operation system 50 (FIG. 39) and on the basis of the report of the trouble from the monitor circuit 71.

The monitor circuit 81 monitors the working interface link 22a and the standby interface link 22b to detect trouble, and when trouble is detected, it is reported to the control circuit 82. The control circuit 82 controls the electrical cross-connect device 20 under the path setting/change-over instruction from the operation system 50 (FIG. 39) and on the basis of the report of the trouble from the monitor circuit 81.

(b-2) Operation

In the first and second embodiments, a change-over between the standby system and the working systems is executed without momentary disconnection in the electrical cross-connect device 20 both at the time of trouble and at the time of inspection for maintenance. However, when trouble is caused, since signals have already been lost, a change-over without momentary disconnection is not necessary. Therefore, in the third embodiment, (1) when a change-over without momentary disconnection is not necessary, for example, at the time of trouble, a change-over between the standby system and the working system is executed in the optical path cross-connect device 10', while (2) when a change-over without momentary disconnection is necessary, for example, at the time of inspection for maintenance, a change-over between the standby system and the working system without momentary disconnection is executed in the electrical cross-connect device 20'.

Change-over between standby and working systems at the time of trouble

Figure 41A:
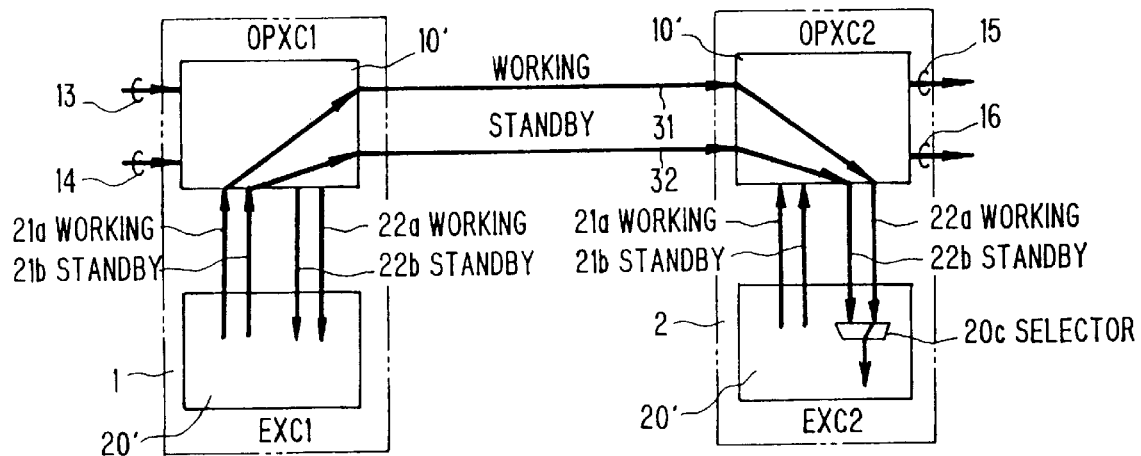
FIGS. 41A, 41B and 41C explain the path change-over operation at the time of trouble in the optical transmission system shown in FIG. 40.
Figure 41B:
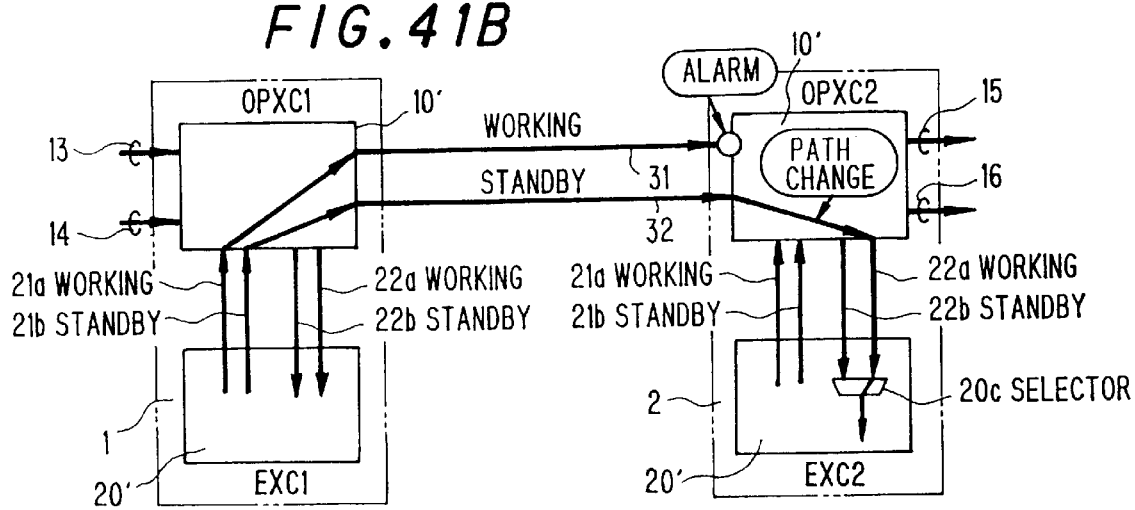
Figure 41C:
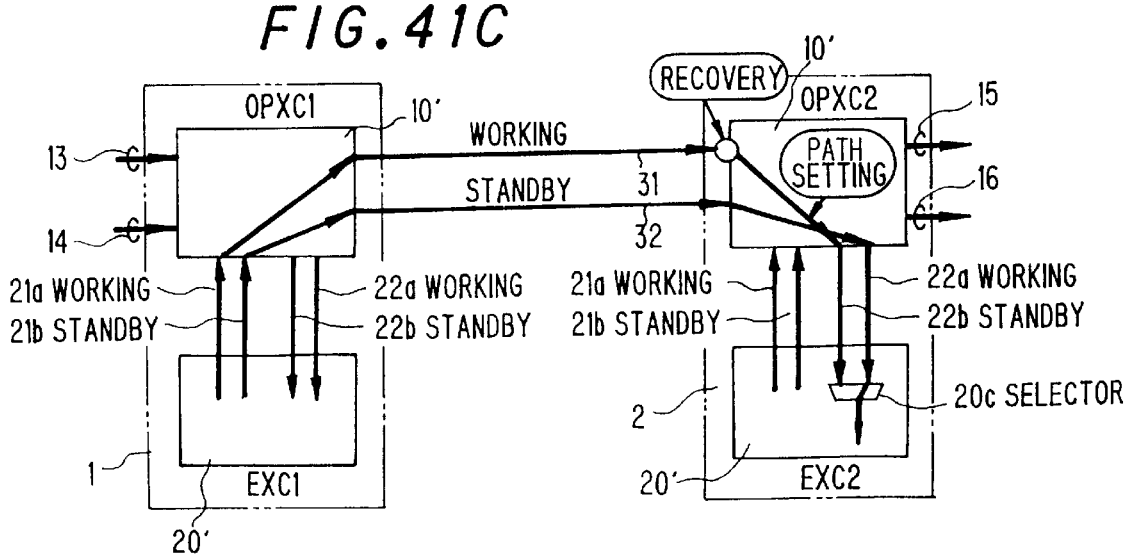

FIGS. 41A to 41C explain the change-over operation between the working and standby systems at the time of trouble in the optical transmission line. The same reference numerals are provided for the elements which are the same as those shown in FIG. 40.

As indicated with the solid lines in FIG. 41A, signals are transmitted from the electrical cross-connect device (EXC1) of a first optical transmission system 1 to the electrical cross-connect device (EXC2) of a second optical transmission system 2 through the working optical transmission line 31. If trouble is caused in the working optical transmission line 31 in this state, the monitor circuit 71 (FIG. 40) of the optical path cross-connect device (OPXC2) detects the trouble and reports it to the control circuit 72. When the trouble in the working optical transmission line 31 is reported, the control circuit 72 controls the optical switch 10 so as to connect the standby optical transmission line 32 to the working interface link 22a, as shown in FIG. 41B thereby executing a change-over between the working/standby systems.

Thereafter, signals are transmitted by the route shown in FIG. 41B. When the optical transmission line 31 is restored to the normal state, the monitor circuit 71 reports it to the control circuit 72. When the control circuit 72 receives the report, it connects the optical transmission line 31 to the standby interface link 22b, as shown in FIG. 41C. Change-over between standby and working systems at the time of inspection for maintenance FIGS. 42A to 42C explain the change-over operation between the standby and working systems at the time of inspection for maintenance in the optical transmission system. The same reference numerals are provided for the elements which are the same as those shown in FIG. 40.

Figure 42A:
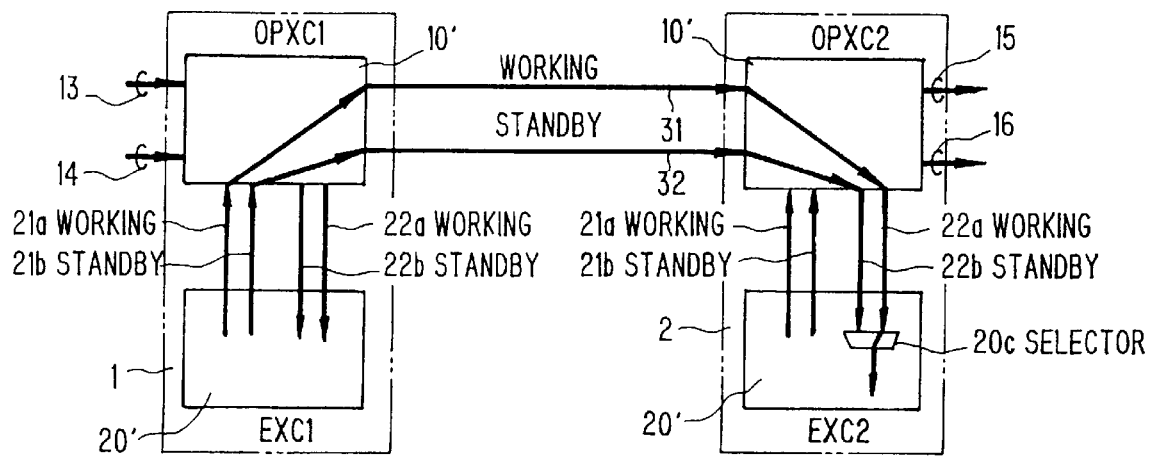
FIGS. 42A, 42B and 42C explain the change-over operation without momentary disconnection at the time of inspection for maintenance in the optical transmission system shown in FIG. 40.
Figure 42B:
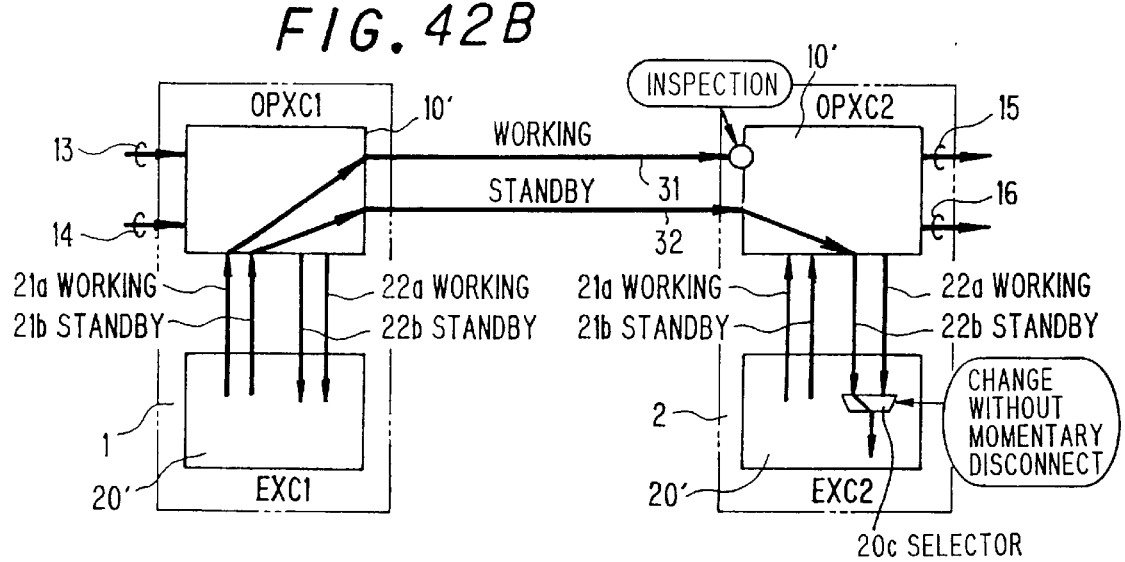

As indicated with the solid lines in FIG. 42A, signals are transmitted from the electrical cross-connect device (EXC1) of a first optical transmission system 1 to the electrical cross-connect device (EXC2) of a second optical transmission system 2 through the working optical transmission line 31. When inspection for maintenance of the optical transmission line 31 is necessary in this state, the operation system 50 (FIG. 39) instructs the control circuits 72, 82 (FIG. 40) to change over the system due to the inspection for maintenance. The control circuit 82 of the electrical cross-connect device (EXC2) then controls the selector 20c so as to execute a change-over between the standby system and the working system without momentary disconnection, as shown in FIG. 42B. The control circuit 72 thereafter cuts the connection between the working optical transmission line 31 and the working interface link 22a.

Figure 42C:
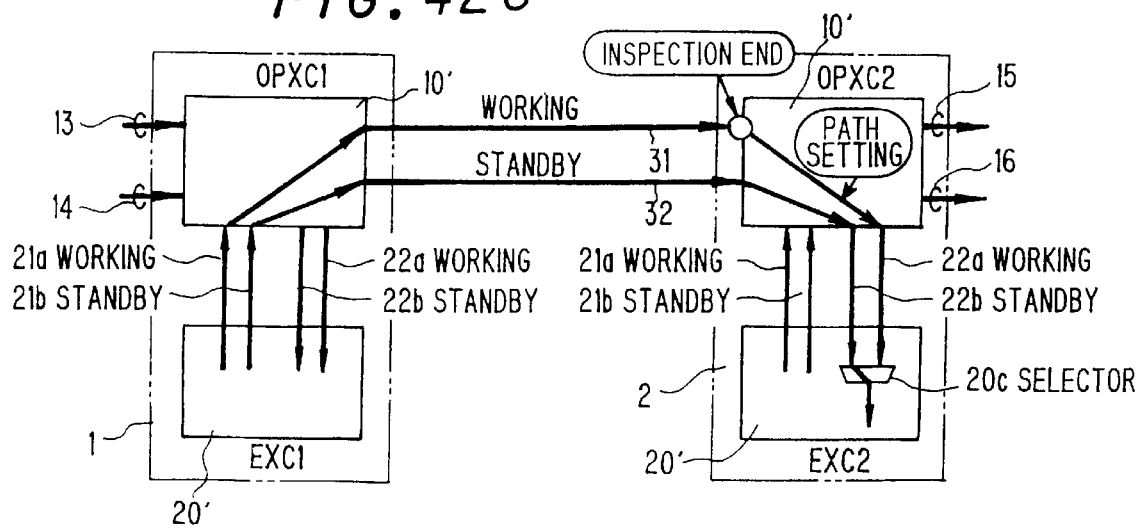

When the inspection for maintenance of the optical transmission line 31 is finished, the operation system 50 reports the end of inspection to the control circuit 72. When the control circuit 72 receives the report, it controls the optical switch 10 so as to connect the optical transmission line 31 to the interface link 22a, as shown in FIG. 42C.

(c) Second example of optical transmission system (c-1) Structure

Figure 43:
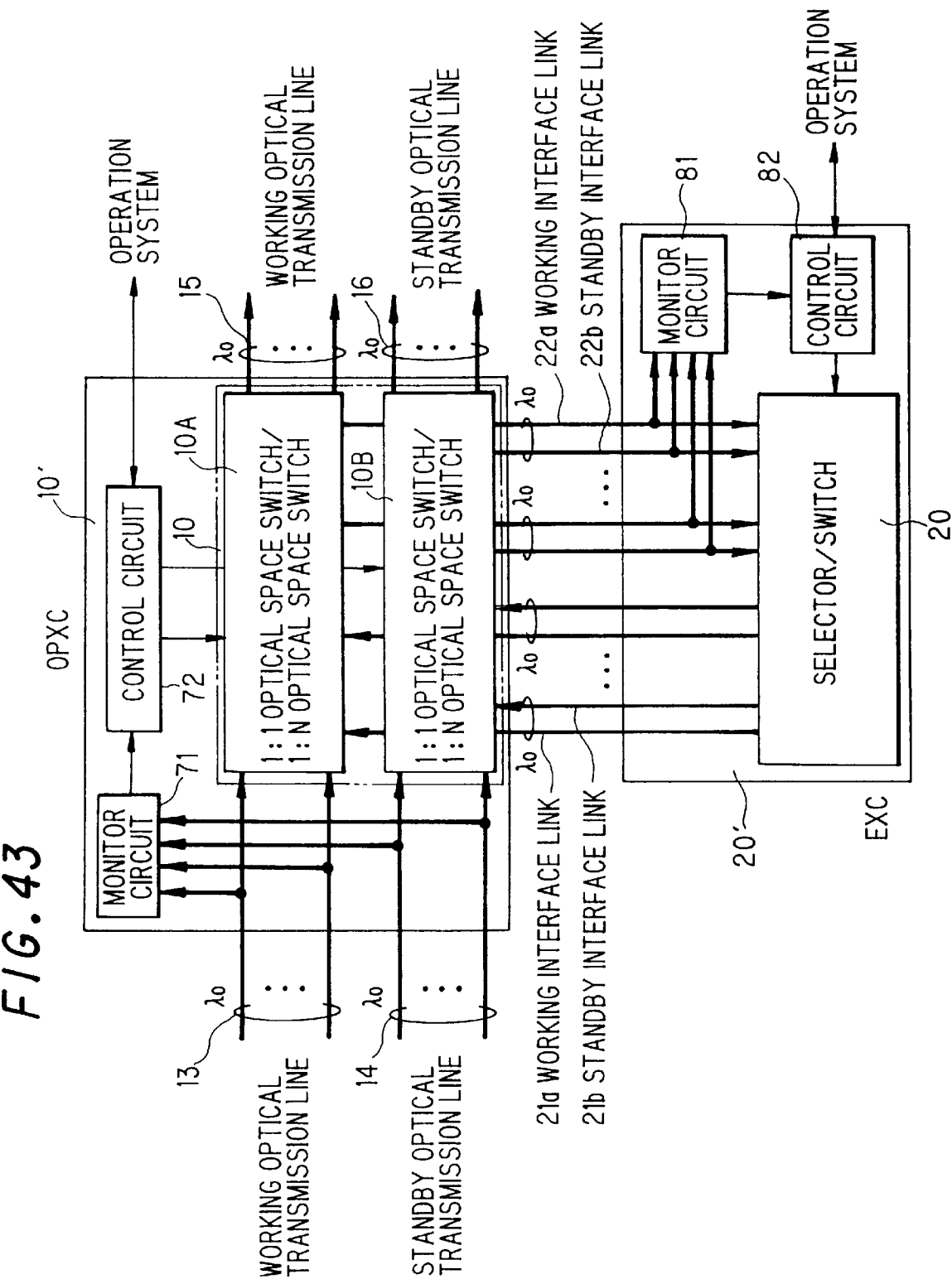
FIG. 43 shows the structure of a second example of an optical transmission system provided with a monitor for monitoring the optical transmission line so as to detect trouble and a circuit for controlling a switch and a selector.

FIG. 43 shows the structure of a second example of an optical transmission system in the third embodiment. The reference numeral 10' represents an optical path cross-connect device (OPXC), and 20' an electrical cross-connect device (EXC). This optical transmission system is obtained by providing the optical path cross-connect device 10 and the electrical cross-connect device 20 which are the same as those in the first modification (see FIG. 8) of the first embodiment with monitor circuits 71, 81 and control circuits 72, 82, respectively. In other words, the optical path cross-connect device 10' is composed of the optical path cross-connect device 10 in the first modification, the monitor circuit 71 and the control circuit 72, while the electrical cross-connect device 20' is composed of the electrical cross-connect device 20 in the first modification, the monitor circuit 81 and the control circuit 82.

The monitor circuit 71 monitors the working optical transmission line 13 and the standby optical transmission line 14 to detect trouble, and when trouble is detected, it is reported to the control circuit 72. The control circuit 72 controls the optical switches 10A, 10B under the path setting/change-over instruction from the operation system 50 (FIG. 39) and on the basis of the report of the trouble from the monitor circuit 71.

The monitor circuit 81 monitors the working interface link 22a and the standby interface link 22b to detect trouble, and when trouble is detected, it is reported to the control circuit 82. The control circuit 82 controls the electrical cross-connect device 20 under the path setting/change-over instruction from the operation system 50 (FIG. 39) and on the basis of the report of the trouble from the monitor circuit 81.

(c-2) Operation

Figure 44A:
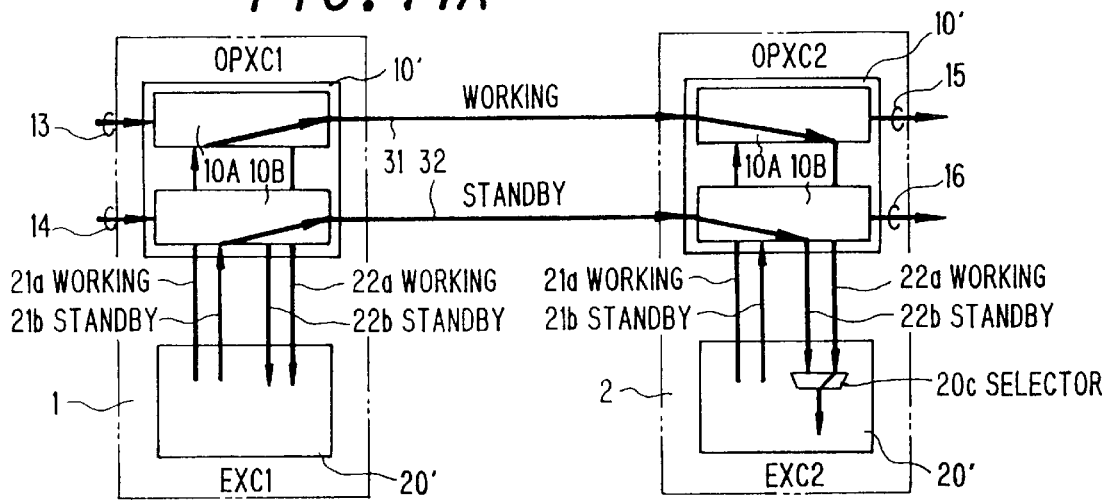
FIGS. 44A, 44B and 44C explain the path change-over operation at the time of trouble in the optical transmission system shown in FIG. 43.
Figure 44B:
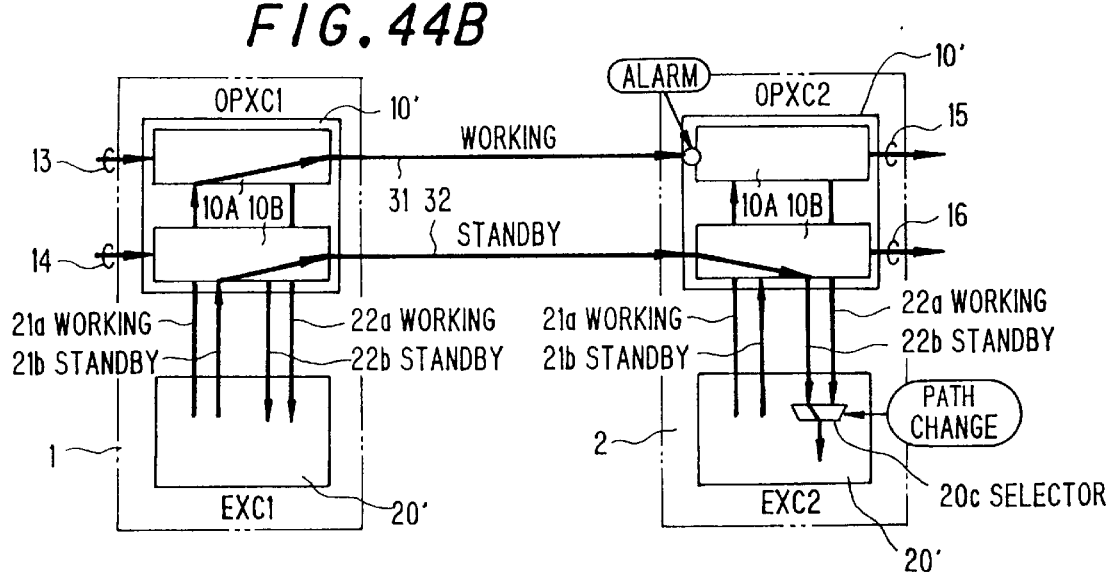
Figure 44C:
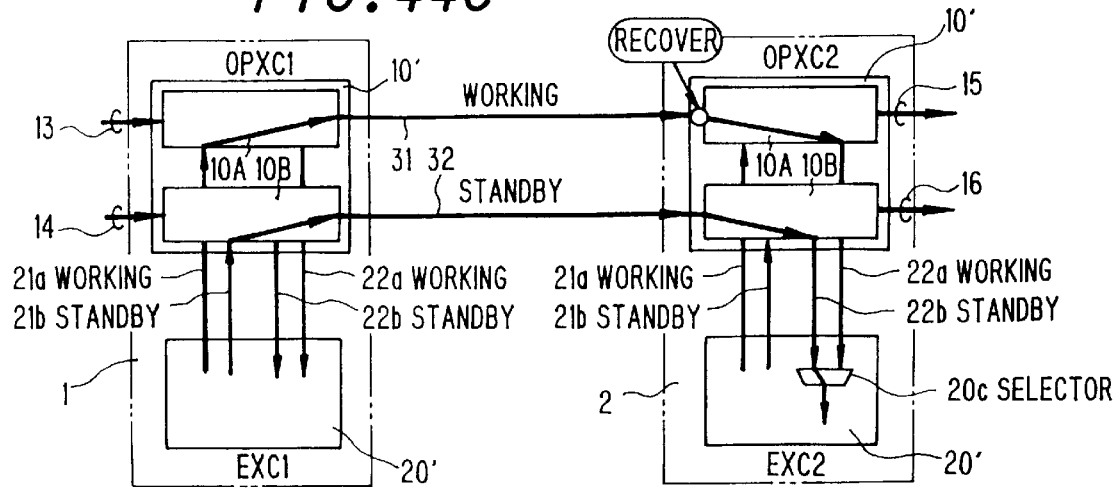

Change-over between standby and working systems at the time of trouble FIGS. 44A to 44C explain the change-over operation between the working and standby systems at the time of trouble in the optical transmission line. The same reference numerals are provided for the elements which are the same as those shown in FIG. 43.

As indicated with the solid lines in FIG. 44A, signals are transmitted from the electrical cross-connect device (EXC1) of a first optical transmission system 1 to the electrical cross-connect device (EXC2) of a second optical transmission system 2 through the working optical transmission line 31. If trouble is caused in the working optical transmission line 31 in this state, the monitor circuit 71 (FIG. 43) of the optical path cross-connect device (OPXC2) detects the trouble and reports it to the control circuit 72.

The control circuit 72 controls the optical switch 10A so as to cut the connection between the optical transmission line 31 and the working interface link 22a, as shown in FIG. 44B. The control circuit 72 also reports the trouble in the working optical transmission line 31 to the operation system 50. When the operation system 50 receives the report, it instructs the control circuit 82 (FIG. 43) of the electrical cross-connect device (EXC2) to change over the system. Under the instruction, the control circuit 82 controls the selector 20c so as to execute a change-over between the working system and the standby system.

Thereafter, signals are transmitted by the route shown in FIG. 44B. When the optical transmission line 31 is restored to the normal state, the monitor circuit 71 reports it to the control circuit 72. When the control circuit 72 receives the report, it controls the optical switch 10A so as to connect the optical transmission line 31 to the working interface link 22a, as shown in FIG. 44C.

Figure 45A:
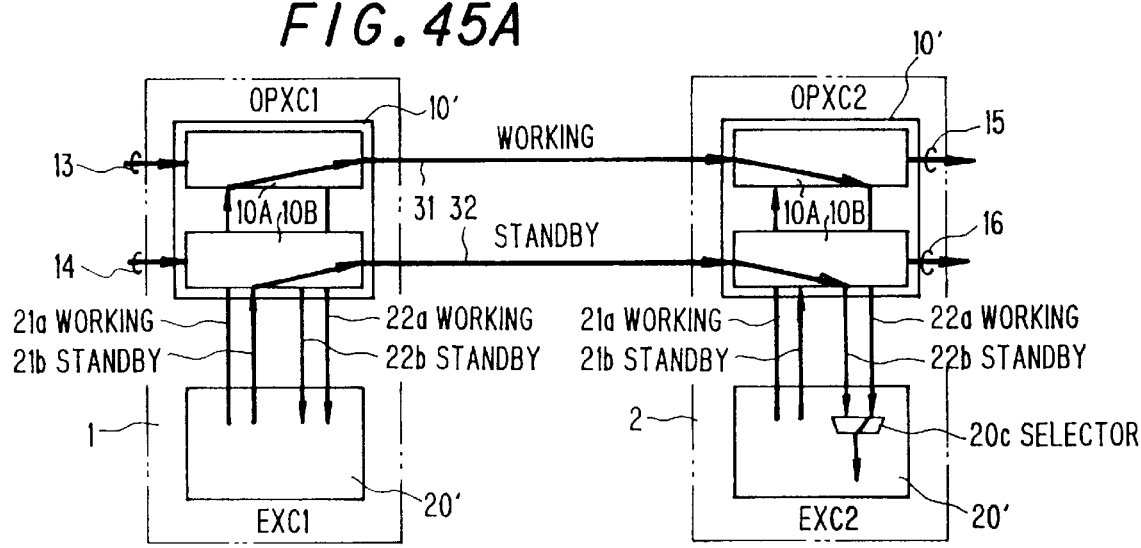
FIGS. 45A, 45B and 45C explain the change-over operation without momentary disconnection at the time of inspection for maintenance in the optical transmission system shown in FIG. 43.
Figure 45B:
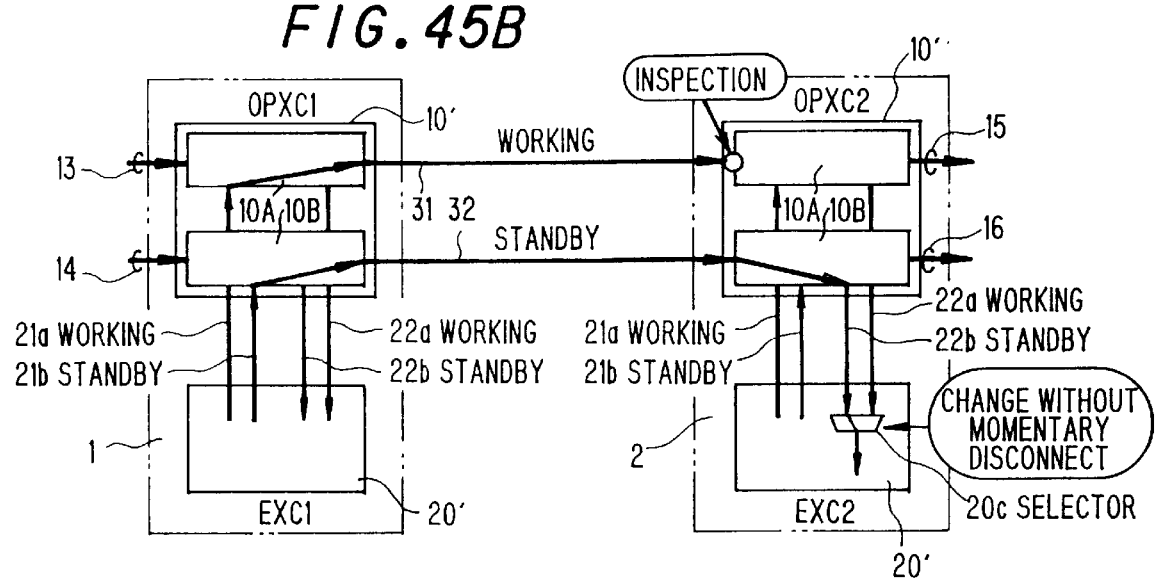
Figure 45C:
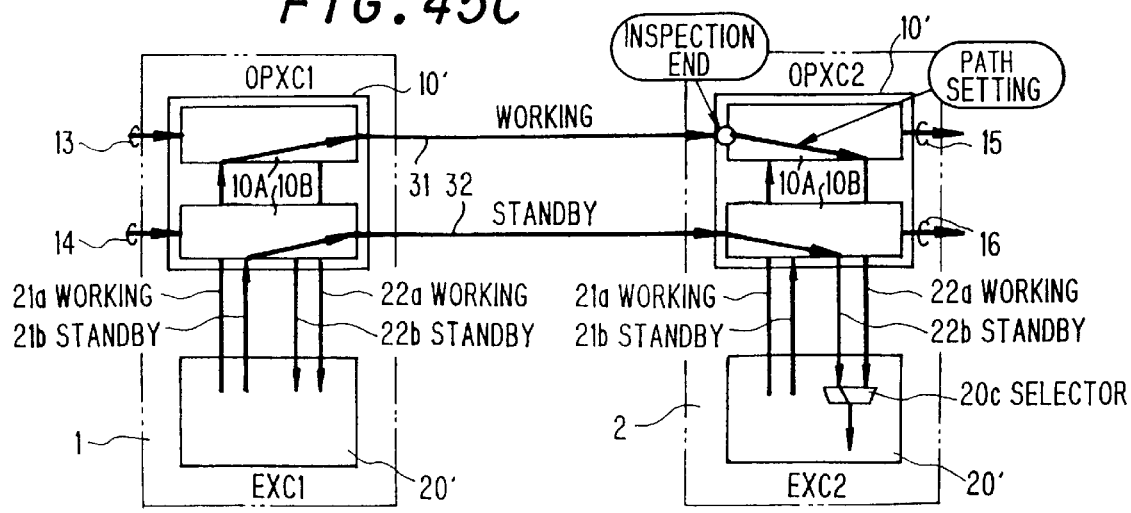

Change-over between standby and working systems at the time of inspection for maintenance FIGS. 45A to 45C explain the change-over operation between the working and standby systems at the time of inspection for maintenance in the optical transmission system. The same reference numerals are provided for the elements which are the same as those shown in FIG. 43.

As indicated with the solid lines in FIG. 45A, signals are transmitted from the electrical cross-connect device (EXC1) of a first optical transmission system 1 to the electrical cross-connect device (EXC2) of a second optical transmission system 2 through the working optical transmission line 31. When inspection for maintenance of the optical transmission line 31 is necessary in this state, the operation system 50 (FIG. 39) instructs the control circuits 72, 82 (FIG. 43) to change over the system due to the inspection for maintenance. The control circuit 82 of the electrical cross-connect device (EXC2) then controls the selector 20c so as to execute a change-over between the standby system and the working system without momentary disconnection, as shown in FIG. 45B. The control circuit 72 thereafter controls the optical switch 10A so as to cut the connection between the working optical transmission line 31 and the working interface link 22a.

When the inspection for maintenance of the optical transmission line 31 is finished, the operation system 50 reports the end of inspection to the control circuit 72. When the control circuit 72 receives the report, it controls the optical switch 10A so as to connect the optical transmission line 31 to the interface link 22a, as shown in FIG. 45C.

(d) Modifications

In the optical transmission systems described above, monitor circuits and control circuits are added to the transmission system (FIG. 3) in the first embodiment and the transmission system (FIG. 8) in the first modification of the first embodiment, respectively. It is also possible to control the path setting operation and the path change-over operation at the time of trouble/inspection by adding monitor circuits and control circuits to the optical transmission systems in the other modifications (see FIGS. 10, 13 and 15) of the first embodiment in a similar way.

In addition, it is also possible to control the path setting operation and the path change-over operation at the time of trouble/inspection by adding monitor circuits and control circuits to each of the optical transmission systems (FIGS. 17 to 21) in the second embodiment in a similar way. When an optical signal is a wavelength-division-multiplexed optical signal, it is necessary to provide monitor circuits corresponding in number to the number of multiplexed wavelengths.

In accordance with the present invention, an optical path cross-connect device and an electrical cross-connect device are connected by a plurality of input/output interface links in working and standby systems, optical signals of respective working and standby systems are entered from the optical path cross-connect device to the electrical cross-connect device via output interface links of the working and standby systems, and switching of working and standby transmission lines without momentary disconnect is performed by the electrical cross-connect device. As a result, optical transmission lines can be switched by electrical processing without causing momentary disconnect. Moreover, the optical path cross-connect device need only establish working and standby paths in such a manner that switching without momentary disconnect can be carried out. As a result, it is unnecessary for the optical path cross-connect device to have an optical phase adjusting function and to perform a high-speed switching operation.

In accordance with the present invention, the optical path cross-connect device is constituted by an optical space switch and the optical space switch is divided into working and standby systems. As a result, the number of switch elements in the optical path cross-connect device can be reduced.

In accordance with the invention, an arrangement may be adopted in which, rather than the optical signals being distributed to the working and standby systems via the electrical cross-connect device, the interface links are provided with optical distributors or optical distribution switches whereby optical signals are distributed to the working and standby interface links. This makes it possible to simplify the architecture of the electrical cross-connect device.

In accordance with the invention, an arrangement may be adopted in which, rather than the optical signals being distributed to the working and standby systems via the electrical cross-connect device, the optical path cross-connect device is constructed by an optical space switch having a distribution function so that optical signals which have entered from the electrical cross-connect device may be routed to the working and standby optical transmission lines simultaneously by means of the distributing function of this optical space switch. This makes it possible to reduce the number of interface links between the electrical cross-connect device and the optical path cross-connect device.

In accordance with the present invention, interface links between the electrical cross-connect device and optical path cross-connect device are interconnected using working and standby systems even in a case where optical signals are subjected to wavelength-division multiplexing. As a result, optical transmission lines can be switched by electrical processing without causing momentary disconnect, and the optical path cross-connect device need not have an optical phase adjusting function and need not perform a high-speed switching operation. This makes a major contribution to an improvement in the performance of a wavelength-division-multiplexed optical transmission system that uses this optical path cross-connect device.

As many apparently widely different embodiments of the present invention can be made without departing from the spirit and scope thereof, it is to be understood that the invention is not limited to the specific embodiments thereof except as defined in the appended claims.

What is claimed is:

1. An optical transmission system comprising:
    an optical path cross-connect device, and
    an electrical cross-connect device; wherein c
    said optical path cross-connect device and said electrical cross-connect device are connected by a plurality of working interface links for input/output and a plurality of standby interface links for input/output;
    said electrical cross-connect device includes a switching means for performing uninterrupted switching of working and standby transmission lines; and
    optical signals in the working and standby systems are entered from said optical path cross-connect device into said electrical cross-connect device via a working output interface link and a standby output interface link, respectively, and uninterrupted switching of working and standby transmission lines are performed by said switching means in the electrical cross-connect device.

2. The system according to claim 1, wherein said switching means in the electrical cross-connect device has:
    an opto-electric converter for converting an optical signal in the working system and an optical signal in the standby system that enter via the working and standby output interface links to respective electric signals;
    a phase adjuster for performing a phase adjustment electrically in such a manner that signal phases of the working and standby systems will coincide; and
    selecting means for selecting one of a phase-adjusted signal in the working system and a phase-adjusted signal in the standby system and switching between the working system and the standby system.

3. The system according to claim 1, wherein said optical cross-connect device has an optical space switch and accommodates a plurality of working optical transmission lines for input/output, a plurality of standby optical transmission lines for input/output, a plurality of working interface links for input/output provided between said optical path cross-connect device and said electrical cross-connect device, and a plurality of standby interface links for input/output provided between said optical path cross-connect device and said electrical cross-connect device;
    said optical path cross-connect device routing an optical signal that has entered from a working input optical transmission line to a working output optical transmission line or a working output interface link, routing an optical signal that has entered from a standby input optical transmission line to a standby output optical transmission line or a standby output interface link, routing an optical signal that has entered from the working input interface link to the working output optical transmission line, and routing an optical signal that has entered from the standby input interface link to the standby output optical transmission line.

4. The system according to claim 3, wherein the optical space switch constructing said optical path cross-connect device is divided into a working system and a standby system.

5. The system according to claim 1, wherein the output interface link of said electrical cross-connect device is provided with an optical distributor or an optical distribution switch for distributing optical signals to the working and standby systems; and
    said optical cross-connect device has an optical space switch and accommodates a plurality of working optical transmission lines for input/output, a plurality of standby optical transmission lines for input/output, a plurality of working and standby interface links for outputs to said electrical cross-connect device, and a plurality of working and standby interface links for inputs connected to the optical distributor or optical distribution switch;
    said optical path cross-connect device routing an optical signal that has entered from a working input optical transmission line to a working output optical transmission line or a working output interface link, routing an optical signal that has entered from a standby input optical transmission line to a standby output optical transmission line or a standby output interface link, routing an optical signal that has entered from a working input interface link, which is connected to said optical distributor or said optical distribution switch, to the working output optical transmission line, and routing an optical signal that has entered from a standby input interface link, which is connected to said optical distributor or said optical distribution switch, to the standby output optical transmission line.

6. The system according to claim 5, wherein the optical space switch constructing said optical path cross-connect device is divided into a working system and a standby system.

7. The system according to claim 1, wherein said optical cross-connect device has an optical space switch and accommodates a plurality of working optical transmission lines for input/output, a plurality of standby optical transmission lines for input/output, a plurality of working interface links for input/output provided between said optical path cross-connect device and said electrical cross-connect device, and a plurality of standby interface links for output to said electrical cross-connect device;

said optical path cross-connect device routing an optical signal that has entered from a working input optical transmission line to a working output optical transmission line or a working output interface link, routing an optical signal that has entered from a standby input optical transmission line to a standby output optical transmission line or a standby output interface link, and routing an optical signal that has entered from the working input interface link to the working and standby output optical transmission lines.

8. An optical transmission system comprising:

an optical path cross-connect device, and an electrical cross-connect device;

said optical path cross-connect device including:
- a demultiplexer for demultiplexing wavelength-division-multiplexed optical signals into optical signals of individual wavelengths;
- an optical space switch for switching each of the demultiplexed optical signals to a prescribed outgoing line or link; and
- a multiplexer for multiplexing optical signals directed to the same outgoing line or link;

said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working interface links for input/output of wavelength-division-multiplexed optical signals provided between said optical path cross-connect device and said electrical cross-connect device, and a plurality of standby interface links for input/output of wavelength-division-multiplexed optical signals provided between said optical path cross-connect device and said electrical cross-connect device;

said electrical cross-connect device having:
- a plurality of electro-optic converters of variable output wavelength provided on a transmitting side of each of working and standby systems;
- an optical multiplexer provided on the transmitting side of each of the working and standby systems for multiplexing optical signals outputted by each of the electro-optic converters and sending the multiplexed optical signals to the working and standby input interface links;
- demultiplexers provided on a receiving side of each of the working and standby systems for demultiplexing, to optical signals of individual wavelengths, wavelength-division-multiplexed optical signals that enter from said optical path cross-connect device via the working and standby output interface links;
- a plurality of opto-electric converters provided on the receiving side of each of the working and standby systems for converting each of the optical signals to electric signals; and
- working/standby switching means for switching optical signals in the working and standby systems outputted by the opto-electric converters in the working and standby systems;

said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, 3) routing wavelength-division-multiplexed optical signals that have entered from the working input interface link to the working output optical transmission line wavelength by wavelength, and 4) routing wavelength-division-multiplexed optical signals that have entered from the standby input interface link to the standby output optical transmission line wavelength by wavelength;

said electrical cross-connect device responding to a switching command by performing uninterrupted switching of the working and standby optical transmission lines.

9. The system according to claim 8, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

10. The system according to claim 8, wherein said optical path cross-connect device is divided into working and standby systems.

11. An optical transmission system comprising:

an optical path cross-connect device, and an electrical cross-connect device;

said optical path cross-connect device including:
- a demultiplexer for demultiplexing wavelength-division-multiplexed optical signals into optical signals of individual wavelengths;
- an optical space switch for switching each of the demultiplexed optical signals to a prescribed outgoing line or link; and
- a multiplexer for multiplexing optical signals directed to the same outgoing line or link;

said optical path cross-connect device accommodating a plurality of working optical transmission lines for input/output of wavelength-division-multiplexed optical signals, standby optical transmission lines for input/output of wavelength-division-multiplexed optical signals, a plurality of working interface links for input/output of wavelength-division-multiplexed optical signals provided between said optical path cross-connect device and said electrical cross-connect device, and a plurality of standby interface links for input/output of wavelength-division-multiplexed optical signals provided between said optical path cross-connect device and said electrical cross-connect device;

said electrical cross-connect device having:
- a plurality of electro-optic converters of variable output wavelength provided on the transmitting side of each of working and standby systems;

an optical multiplexer provided on the transmitting side of each of the working and standby systems for multiplexing optical signals outputted by each of the electro-optic converters and sending the multiplexed optical signals to working and standby input interface links;

a demultiplexer provided on a receiving side of the working system for demultiplexing, to optical signals of individual wavelengths, wavelength-division-multiplexed optical signals that enter from the working output interface link;

a brancher provided on the receiving side of the standby system for branching wavelength-division-multiplexed optical signals that enter from the standby output interface link;

a plurality of variable-wavelength filters for extracting an optical signal of a prescribed wavelength from the branched wavelength-division-multiplexed optical signals; and a plurality of working and standby optoelectric converters for converting optical signals, which are outputted by said demultiplexer and said variable-wavelength filters to electric signals; and working/standby switching means for switching optical signals in the working and standby systems outputted by the opto-electric converters in the working and standby systems;

said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, 3) routing wavelength-division-multiplexed optical signals that have entered from the working input interface link to the working output optical transmission line wavelength by wavelength, and 4) routing wavelength-division-multiplexed optical signals that have entered from the standby input interface link to the standby output optical transmission line wavelength by wavelength;

said electrical cross-connect device responding to a switching command by performing uninterrupted switching of the working and standby optical transmission lines.

12. The system according to claim 11, wherein said optical path cross-connect device is divided into working and standby systems.

13. An optical transmission system comprising:
an optical path cross-connect device, and
an electrical cross-connect device;
said optical path cross-connect device including:
  a demultiplexer for demultiplexing wavelength-division-multiplexed optical signals into optical signals of individual wavelengths;
  an optical space switch for switching each of the demultiplexed optical signals to a prescribed outgoing line or link;
  a wavelength converter for converting the wavelength of a switched optical signal to a prescribed wavelength; and
  a multiplexer for multiplexing optical signals directed to the same outgoing line or link;

said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working interface links for input/output of wavelength-division-multiplexed optical signals provided between said optical path cross-connect device and said electrical cross-connect device, and a plurality of standby interface links for input/output of wavelength-division-multiplexed optical signals provided between said optical path cross-connect device and said electrical cross-connect device;

said electrical cross-connect device having:
  a plurality of electro-optic converters of fixed output wavelength provided on a transmitting side of each of the working and standby systems;
  an optical multiplexer provided on the transmitting side of each of the working and standby systems for multiplexing optical signals outputted by each of the electro-optic converters and sending the multiplexed optical signals to the working and standby input interface links;
  demultiplexers provided on a receiving side of each of the working and standby systems for demultiplexing, to optical signals of individual wavelengths, wavelength-division-multiplexed optical signals that enter from said optical path cross-connect device via the working and standby output interface links;
  a plurality of opto-electric converters provided on the receiving side of each of the working and standby systems for converting each of the optical signals to electric signals; and
  working/standby switching means for switching optical signals in the working and standby systems outputted by the opto-electric converters in the working and standby systems;

said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, 3) routing wavelength-division-multiplexed optical signals that have entered from the working input interface link to the working output optical transmission line wavelength by wavelength, and 4) routing wavelength-division-multiplexed optical signals that have entered from the standby input interface link to the standby output optical transmission line wavelength by wavelength;

said electrical cross-connect device responding to a switching command by performing uninterrupted switching of the working and standby optical transmission lines.

14. The system according to claim 13, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

15. The system according to claim 13, wherein said optical path cross-connect device is divided into working and standby systems.

16. An optical transmission system comprising:
an optical path cross-connect device, and
an electrical cross-connect device;
said optical path cross-connect device including:
   a demultiplexer for demultiplexing wavelength-division-multiplexed optical signals into optical signals of individual wavelengths;
   an optical space switch for switching each of the demultiplexed optical signals to a prescribed outgoing line or link; and
   a multiplexer for multiplexing optical signals directed to the same outgoing line;
said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working and standby interface links for output of wavelength-division-multiplexed optical signals provided between said optical path cross-connect device and said electrical cross-connect device, and a plurality of working and standby interface links, for input of wavelength-division-multiplexed optical signals, connected to an optical distributor or optical distribution switch;
said electrical cross-connect device having:
   a plurality of electro-optic converters of variable output wavelength provided on the optical-signal transmitting side of the working system;
   an optical multiplexer provided on the optical-signal transmitting side of the working system for multiplexing optical signals outputted by each of the electro-optic converters and sending the multiplexed optical signals to said optical distributor or said optical distribution switch;
   a demultiplexer provided on the optical-signal receiving side for demultiplexing, to optical signals of individual wavelengths, wavelength-division-multiplexed optical signals in the working and standby systems that enter from the optical path cross-connect device via the working and standby output interface links;
   a plurality of opto-electric converters provided on the optical-signal receiving side for converting each of the optical signals to electric signals; and
   working/standby switching means for switching optical signals in the working and standby systems outputted by the opto-electric converters in the working and standby systems;
said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, 3) routing wavelength-division-multiplexed optical signals that have entered from the working input interface link to the working output optical transmission line wavelength by wavelength, and 4) routing wavelength-division-multiplexed optical signals that have entered from the standby input interface link to the standby output optical transmission line wavelength by wavelength;
said electrical cross-connect device responding to a switching command by performing uninterrupted switching of the working and standby optical transmission lines.

17. The system according to claim 16, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

18. The system according to claim 16, wherein said optical path cross-connect device is divided into working and standby systems.

19. An optical transmission system comprising:
an optical path cross-connect device, and
an electrical cross-connect device;
said optical path cross-connect device including:
   a demultiplexer for demultiplexing wavelength-division-multiplexed optical signals into optical signals of individual wavelengths;
   an optical space switch for switching each of the demultiplexed optical signals to a prescribed outgoing line or link;
   a wavelength converter for converting the wavelength of a switched signal to a prescribed wavelength; and
   a multiplexer for multiplexing optical signals directed to the same outgoing line or link;
said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working and standby interface links for output of wavelength-division-multiplexed optical signals provided between said optical path cross-connect device and said electrical cross-connect device, and a plurality of working and standby interface links, for input of wavelength-division-multiplexed optical signals, connected to an optical distributor or optical distribution switch;
said electrical cross-connect device having:
   a plurality of electro-optic converters of fixed output wavelength provided on the optical-signal transmitting side of the working system;
   an optical multiplexer provided on the optical-signal transmitting side of the working system for multiplexing optical signals outputted by each of the electro-optic converters and sending the multiplexed optical signals to said optical distributor or said optical distribution switch;
   a demultiplexer provided on the optical-signal receiving side for demultiplexing, to optical signals of individual wavelengths, wavelength-division-multiplexed optical signals in the working and standby systems that enter from the optical path cross-connect device via the working and standby output interface links;
a plurality of opto-electric converters provided on the optical-signal receiving side for converting each of the optical signals to electric signals; and
working/standby switching means for switching optical signals in the working and standby systems outputted by the opto-electric converters in the working and standby systems;
said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, 3) routing wavelength-division-multiplexed optical signals that have entered from the working input interface link to the working output optical transmission line wavelength by wavelength, and 4) routing wavelength-division-multiplexed optical signals that have entered from the standby input interface link to the standby output optical transmission line wavelength by wavelength;
said electrical cross-connect device responding to a switching command by performing uninterrupted switching of the working and standby optical transmission lines.

20. The system according to claim 19, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

21. The system according to claim 19, wherein said optical path cross-connect device is divided into working and standby systems.

22. An optical transmission system comprising:
an optical path cross-connect device, and
an electrical cross-connect device;
said optical path cross-connect device including:
a demultiplexer for demultiplexing wavelength-division-multiplexed optical signals into optical signals of individual wavelengths;
an optical space switch, which has a distribution function, for switching each of the demultiplexed optical signals to a prescribed outgoing line or link; and
a multiplexer for multiplexing optical signals directed to the same outgoing line or link;
said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working and standby interface links for output of wavelength-division-multiplexed optical signals provided between said optical path cross-connect device and said electrical cross-connect device, and a plurality of working interface links, for input of wavelength-division-multiplexed optical signals provided between said optical path cross-connect device and said electrical cross-connect device;
said electrical cross-connect device having:
a plurality of electro-optic converters of variable output wavelength provided on the optical-signal transmitting side;
an optical multiplexer provided on the optical-signal transmitting side for multiplexing optical signals outputted by each of the electro-optic converters and sending the multiplexed optical signals to the plurality of working input interface links;
a demultiplexer provided on the optical-signal receiving side for demultiplexing, to optical signals of individual wavelengths, wavelength-division-multiplexed optical signals in the working and standby systems that enter from the optical path cross-connect device via the working and standby output interface links;
a plurality of opto-electric converters provided on the optical-signal receiving side for converting each of the optical signals to electric signals; and
working/standby switching means for switching optical signals in the working and standby systems outputted by the opto-electric converters in the working and standby systems;
said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, and 3) routing wavelength-division-multiplexed optical signals that have entered from the working input interface link to the working and standby output optical transmission lines wavelength by wavelength;
said electrical cross-connect device responding to a switching command by performing uninterrupted switching of the working and standby optical transmission lines.

23. The system according to claim 22, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

24. An optical transmission system comprising:
an optical path cross-connect device, and
an electrical cross-connect device;
said optical path cross-connect device including:
a demultiplexer for demultiplexing wavelength-division-multiplexed optical signals into optical signals of individual wavelengths;
an optical space switch, which has a distribution function, for switching each of the demultiplexed optical signals to a prescribed outgoing line or link;

a wavelength converter for converting the wavelength of a switched signal to a prescribed wavelength; and a multiplexer for multiplexing optical signals directed to the same outgoing line or link;

said optical path cross-connect device accommodating a plurality of working optical transmission lines for input/output of wavelength-division-multiplexed optical signals, a plurality of standby optical transmission lines for input/output of wavelength-division-multiplexed optical signals, a plurality of working and standby interface links for output of wavelength-division-multiplexed optical signals provided between said optical path cross-connect device and said electrical cross-connect device, and a plurality of working interface links for input of wavelength-division-multiplexed optical signals provided between said optical path cross-connect device and said electrical cross-connect device;

said electrical cross-connect device having:

a plurality of electro-optic converters of fixed output wavelength provided on the optical-signal transmitting side;

an optical multiplexer provided on the optical-signal transmitting side for multiplexing optical signals outputted by each of the electro-optic converters and sending the multiplexed optical signals to the plurality of working input interface links;

a demultiplexer provided on the optical-signal receiving side for demultiplexing, to optical signals of individual wavelengths, wavelength-division-multiplexed optical signals in the working and standby systems that enter from the optical path cross-connect device via the working and standby input interface links;

a plurality of opto-electric converters provided on the optical-signal receiving side for converting each of the optical signals to electric signals; and working/standby switching means for switching optical signals in the working and standby systems outputted by the opto-electric converters in the working and standby systems;

said optical path cross-connect device 1) routing wavelength-division-multiplexed optical signals that have entered from the working input optical transmission line to the working output optical transmission line or working output interface link wavelength by wavelength, 2) routing wavelength-division-multiplexed optical signals that have entered from the standby input optical transmission line to the standby output optical transmission line or standby output interface link wavelength by wavelength, and 3) routing wavelength-division-multiplexed optical signals that have entered from the working input interface link to the working and standby output optical transmission lines wavelength by wavelength;

said electrical cross-connect device responding to a switching command by performing uninterrupted switching of the working and standby optical transmission lines.

25. The system according to claim 24, wherein phase adjusters for performing a phase adjustment electrically in such a manner that signal phases of the working and standby systems will coincide are provided between said working and standby opto-electric converters and said working/standby switching means and said working/standby switching means selects either of phase adjusted signals in the working system and phase adjusted signals in the standby system and switches between the working system and the standby system.

26. An optical network system comprising:

a multiplicity of optical transmission systems each including an optical path cross-connect device (OPXC) provided with a space optical switch and an electrical cross-connect device (EXC);

an operation system for controlling path setting/change operation of said optical path cross-connect device and said electrical cross-connect device in each of said optical transmission systems;

working and standby optical transmission lines for connecting said optical path cross-connect devices; and working and standby input/output interface links for connecting said optical path cross-connect device and said electrical cross-connect device;

wherein said optical path cross-connect device includes a monitor circuit for monitoring said working and standby optical transmission lines to detect trouble, and a control circuit for controlling said space optical switch so as to execute a change-over between a working system and a standby system on the basis of the detection of the trouble in said optical transmission line and path change-over instruction from said operation system; and said electrical cross-connect device includes optoelectric converter for converting a working optical signal input through said working input interface link and a standby optical signal input through said standby input interface link into respective electrical signals, a phase adjuster for electrically adjusting the phases of working and standby signals to the same phase, a change-over portion for selecting either of said phase-adjusted working signal and said phase-adjusted standby signal and executing a change-over between said working system and said standby system, a switch for switching the signal input from said change-over portion, a monitor circuit for monitoring said interface links so as to detect trouble, and a control circuit for controlling said change-over portion so as to execute a change-over between said working system and said standby system on the basis of the detection of the trouble in said optical transmission line and path change-over instruction from said operation.

27. An optical network system according to claim 26, wherein said control circuit of said optical path cross-connect device controls said space optical switch so as to execute a change-over between said working system and said standby system when trouble in said working optical transmission line is detected.

28. An optical network system according to claim 26, wherein, at the time of change-over without momentary disconnection, said operation system instructs said control circuit of said electrical cross-connect device to execute a change-over without momentary disconnection, and said control circuit of said electrical cross-connect device controls said changeover portion so as to execute a change-over between said working system and said standby system without momentary disconnection.

29. An optical network system according to claim 26, wherein said monitor circuits are provided corresponding in number to the number of multiplexed wavelengths when said optical signal is a wavelength-division-multiplexed optical signal.

* * * * *